US012647228B2

(12) United States Patent
Rodriguez

(10) Patent No.: US 12,647,228 B2
(45) Date of Patent: Jun. 2, 2026

(54) AUDIO SYSTEM CONFIGURED FOR AUDIO PERFORMANCE ENVIRONMENTS REQUIRING LOW AUDIO LATENCY AND HIGH SCALABILITY

(71) Applicant: SHURE ACQUISITION HOLDINGS, INC., Niles, IL (US)

(72) Inventor: Michael Rodriguez, Arlington Heights, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 416 days.

(21) Appl. No.: 18/124,221

(22) Filed: Mar. 21, 2023

(65) Prior Publication Data

US 2023/0308235 A1 Sep. 28, 2023

Related U.S. Application Data

(60) Provisional application No. 63/269,812, filed on Mar. 23, 2022.

(51) Int. Cl.
 *H04L 5/00* (2006.01)
 *H04R 1/10* (2006.01)
(52) U.S. Cl.
 CPC .......... H04L 5/0048 (2013.01); H04L 5/0007 (2013.01); H04R 1/1091 (2013.01); *H04R 2420/07* (2013.01)
(58) Field of Classification Search
 CPC ... H04L 5/0048; H04L 5/0007; H04L 65/403; H04L 65/80; H04R 1/1091;

(Continued)

(56) References Cited

U.S. PATENT DOCUMENTS

2005/0113021 A1 5/2005 Gosieski et al.
2014/0105076 A1* 4/2014 Yang ..................... H04J 3/1694
370/280

(Continued)

FOREIGN PATENT DOCUMENTS

CN 111684753 A * 9/2020 ....... H04L 27/26025
GB 2424155 A 9/2006

OTHER PUBLICATIONS

Professional Live Audio Production: A Highly Synchronized Use Case for 5G URLLC Systems; Pilz et al.; Apr. 2018.*

(Continued)

*Primary Examiner* — Jay P Patel
(74) *Attorney, Agent, or Firm* — Banner & Witcoff, Ltd.

(57) ABSTRACT

Described are in-ear monitoring (IEM) systems configured for audio performance environments requiring low audio latency and high scalability. IEM systems can include an audio channel allocation device that determines audio channel allocation for transmitting audio payload to IEM devices. Audio payload may be allocated to a radio frame based on, e.g., bit rate, modulation and coding scheme, latency/fidelity requirements, etc. IEM devices can include audio driver(s) configured to generate an audio output, a circuit configured to control audio output generation by the driver(s), in-ear portion(s), and a bodypack receiver. IEM devices can receive the audio allocation information, configure its circuit accordingly, receive audio payload carried in a carrier wave based on the allocation information, and generate the audio output based on the audio payload.

24 Claims, 28 Drawing Sheets

(58) Field of Classification Search

CPC .............. H04R 2420/07; H04R 25/554; H04R 1/1016; H04R 27/00; G10H 2240/115; G10H 1/0083; H04H 60/04

See application file for complete search history.

(56) References Cited

U.S. PATENT DOCUMENTS

| | | | | |
|---|---|---|---|---|
| 2015/0351091 | A1* | 12/2015 | Yang ...................... | H04W 72/21 |
| | | | | 370/329 |
| 2015/0358122 | A1* | 12/2015 | Yang ...................... | H04W 72/21 |
| | | | | 370/280 |
| 2015/0358125 | A1* | 12/2015 | Yang ...................... | H04L 1/1854 |
| | | | | 370/329 |
| 2017/0251454 | A1* | 8/2017 | Yang ................... | H04W 52/146 |
| 2017/0310439 | A1* | 10/2017 | Yang ...................... | H04L 5/0032 |
| 2018/0376500 | A1* | 12/2018 | Yang ...................... | H04W 72/20 |
| 2019/0158342 | A1* | 5/2019 | Lee ...................... | H04L 27/3438 |
| 2019/0215782 | A1* | 7/2019 | Lee ....................... | H04L 5/0048 |
| 2020/0288506 | A1* | 9/2020 | Lei .................... | H04W 74/0833 |
| 2020/0351849 | A1* | 11/2020 | Yang ................... | H04W 52/146 |
| 2023/0006712 | A1 | 1/2023 | Mamola et al. | |
| 2023/0327707 | A1* | 10/2023 | Mamola .............. | H04R 25/554 |
| | | | | 455/41.3 |

OTHER PUBLICATIONS

ISA/220—Notification of Transmittal or Search Report and Written Opinion of the ISA, or the Declaration Mailed on Jun. 30, 2023 for WO Application No. PCT/US23/015819, 20 page(s).

Pilz et al., Professional Live Audio Production: A Highly Synchronized Use Case for 5G URLLC Systems, IEEE Network, vol. 32, No. 2, Mar. 1, 2018 (pp. 85-91).

* cited by examiner

800

Bandwidth

High-Fidelity Channel 1 — 804a

High-Fidelity Channel 2 — 804b

High-Fidelity Channel 3 — 804c

High-Fidelity Channel 4 — 804d

WMAS frame duration

| Voice Channel 704g | Voice Channel 704f | Voice Channel 704e |
| Voice Channel 704j | Voice Channel 704i | Voice Channel 704h |
| Voice Channel 704m | Voice Channel 704l | Voice Channel 704k |
| Voice Channel 704p | Voice Channel 704o | Voice Channel 704n |

802a

1600 receiving, from one or more audio capture devices, captured audio

1601 generating an audio signal comprising one or more audio payload resource blocks comprising audio information indicative of said captured audio

1602 allocating the one or more audio payload resource blocks orthogonally within a time dimension and a frequency dimension of the audio signal

1603

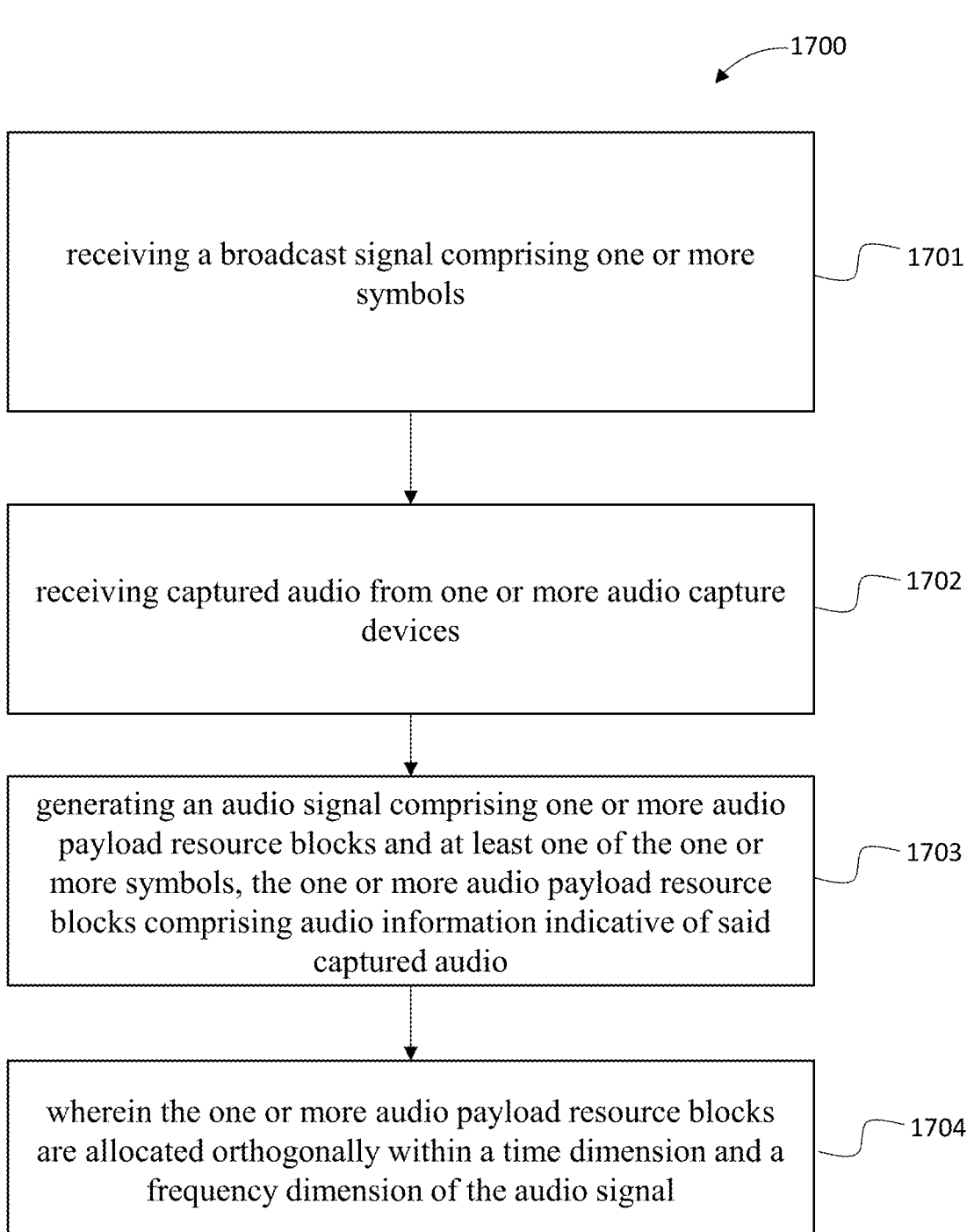

1700 receiving a broadcast signal comprising one or more symbols — 1701 receiving captured audio from one or more audio capture devices — 1702 generating an audio signal comprising one or more audio payload resource blocks and at least one of the one or more symbols, the one or more audio payload resource blocks comprising audio information indicative of said captured audio — 1703 wherein the one or more audio payload resource blocks are allocated orthogonally within a time dimension and a frequency dimension of the audio signal — 1704

FIG. 22

AUDIO SYSTEM CONFIGURED FOR AUDIO PERFORMANCE ENVIRONMENTS REQUIRING LOW AUDIO LATENCY AND HIGH SCALABILITY

CROSS-REFERENCE TO RELATED APPLICATIONS

This application claims priority to, and the benefit of, U.S. Provisional Application Ser. No. 63/269,812, filed Mar. 23, 2022 and entitled "Scalable Wideband Multiuser Audio System and Method," the entire disclosure of which is hereby incorporated herein by reference in its entirety for all purposes.

TECHNOLOGICAL FIELD

Embodiments of the present disclosure relate generally to in-ear monitoring (IEM) systems, and more particularly to IEM systems configured for audio performance environments requiring low audio latency and high scalability.

BACKGROUND

Audio systems can include multiple audio devices, such as intercom devices, monitors, speakers, microphones, instruments, and/or the like, that are connected to one or more central audio mixing/capture devices. Wireless audio devices may be used to provide mobility and flexibility to users of the system. Audio may be captured by a microphone or the like and transmitted to the central audio mixing/capture device(s), which can filter and/or mix the audio from one or more different sound sources for playback or recording. Radio signals can be used to transmit audio and/or other information between the audio devices and the central audio mixing/capture device(s). Wireless audio devices are often used in interferer-laden environments, which can contribute to the radio signals experiencing interference, signal fading, and distortion. When this occurs, the quality of captured, mixed, transmitted, or played back audio can deteriorate.

BRIEF DESCRIPTION OF THE DRAWINGS

The description of the illustrative embodiments can be read in conjunction with the accompanying figures. It will be appreciated that, for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 22 illustrates a simplified block diagram of a method for facilitating low latency audio transmission in a multiuser audio system, according to an embodiment of the present disclosure;

DETAILED DESCRIPTION

Figure 1A:
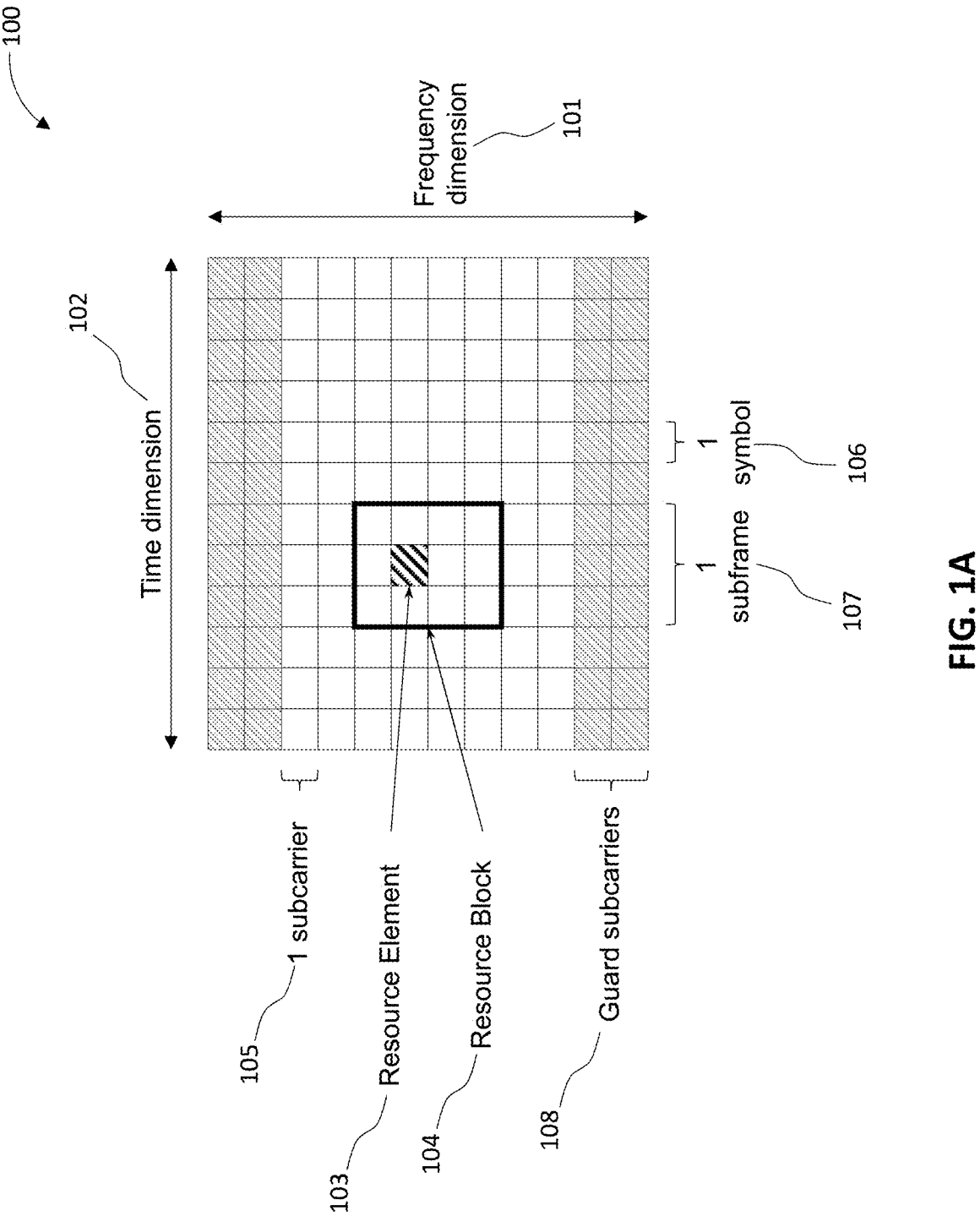
FIG. 1A illustrates an example frame architecture for transmitting audio payload in an example audio system, according to an embodiment of the present disclosure.

It should be understood at the outset that although illustrative implementations of some embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Musicians, singers, broadcasters, newscasters, performers, conference speakers, radio hosts, podcasters, and other audio system users often use microphones or audio sensors to capture audio and/or in-ear monitors (IEMs) to hear the audio captured by their microphone or audio sensor, or a mixture of audio from multiple sound sources (e.g., a stereo mix, another user's microphone, etc., in near real-time. Users of such audio devices are typically mobile in such an environment during use of the audio devices and therefore the audio must be transmitted and/or received wirelessly between the audio devices and an access point. An access point may comprise an antenna, mixing equipment, recording equipment, a transmitter, a computing device, an audio rack, or the like. Audio systems which are configured to handle multiple audio devices can be configured to connect to some or all of these devices wirelessly. An example system comprises a wideband multi-user audio system (WMAS).

Multi-user audio systems can be used at conference venues, live professional audio venues, concerts, live and/or recorded broadcast events, television newscasts, movies, sporting events, live or recorded rallies, and other types of products. In WMAS, audio can be captured using microphones, audio sensors, and/or audio pick-ups. Captured audio can then be transmitted (e.g., wirelessly) to centralized audio recording and/or mixing equipment for recording and/or mixing. Centralized mixing equipment, such as a sound mixer, mixing board, audio rack, or the like, can then transmit (e.g., wirelessly) at least a portion of the mixed audio to audio devices such as speaker(s), recording device(s), intercom(s), speaker(s), in-ear monitor (IEM) device(s), and/or the like. Such audio devices can include transceivers, wireless audio transmitters, wireless audio receivers, wireless microphones, and other wireless communication devices that include antennas for transmitting and receiving radio frequency (RF) signals. An RF signal may be used to carry audio payload to one or more audio devices in the system.

Environments where audio devices are commonly used (e.g., stages, convention centers, stadiums, outdoor pavilions, etc.) tend to be interferer laden, which means that audio for playback by an audio device typically picks up noise and distortion from such interferers in the environments during transmission to the audio device. Since the user of the audio device is typically mobile within the interferer laden environment, the audio must typically be transmitted to the audio device wirelessly, which means that the type and magnitude of signal interference on a transmitted carrier wave within the interferer laden environment is typically not static. As such, Applicant has found that analog audio devices often require that each user be associated with a distinct and different frequency within a subcarrier or resource block, as illustrated in FIG. 3, and the analog signal associated with just that user's audio payload be transmitted to/from the user's audio device. However, in order to avoid interference or intermodulation of the subcarrier by adjacent subcarriers, Applicant has found that such audio devices typically require audio payload transmission schemes that include sufficient spacing of subcarriers within a frequency dimension of the carrier wave, which typically leads to spectral inefficiency.

Digital audio systems and devices may be able to increase spectral efficiency by not requiring the same subcarrier spacing within the frequency dimension, however, digital audio systems and devices have also shown unacceptable latency, e.g., in part because of the additional synchronization and demodulation information that needs to be transmitted with audio, which occupies additional resource blocks in the time and frequency dimension and reduces the rate of audio payload units across the time dimension of the carrier wave and/or diminishes available spectrum.

In such audio systems, transmitted audio is susceptible to distortion and other quality of sound issues. Distortion, among other things, can reduce fidelity of transmitted audio. Distortion can include amplitude distortion, harmonic distortion, frequency response distortion, phase distortion, and/ or group delay distortion, among other types of distortion. Other contributors to audio quality reduction can include noise, the presence of audio artifacts, bit errors, muting, and the like. Fidelity can be described as the nearness of a reproduced sound relative to the original generated sound that was captured.

When doing a sound check with a professional musician using an audio device, such as an in-ear monitor (IEM) device, the audio qualities and characteristics may be improved by adjusting audio channel allocation, increasing sample rate, applying one or more filters, moving possible line-of-sight interferers, adjusting the power output of one or more transceivers, replacing equipment, and/or the like. Once the professional musician indicates that the sound quality in their IEM device is acceptable, the absolute values of the various audio characteristics and audio quality metrics may not matter—instead, the sound engineer may need to merely monitor the change over time of one or more characteristics or metrics in order to confirm that the perceived audio quality for the professional musician remains sufficient.

However, in some systems, the audio engineer must assign or allocate a transceiver to a particular subcarrier, configure the professional musician's IEM device to receive audio payload allocated to the subcarrier, and must manually monitor audio characteristics to determine whether an allocation or other such change needs to be made over time. In some systems, when the audio engineer or IEM engineer determines that, for example, the addition of one or more other audio transceivers to the system will unacceptably diminish the fidelity or increase latency of audio received at a professional musician's IEM device, the audio engineer or IEM engineer may need to modify the audio channel allocation scheme. In some audio systems, the audio engineer or IEM engineer, when allocating or re-allocating audio channels for wireless audio devices within the time dimension/ frequency dimension, may be faced with an optimization problem involving so many different variables and system configuration permutations that it would be virtually impossible for that person to choose an optimal or near optimal audio channel allocation scheme and/or payload/symbol scheduling scheme.

A transceiver associated with a wireless audio device may be configured to receive RF signals from transmitters or access points in the audio system. The RF signals can carry audio in select subcarriers so as to not interfere with public land mobile networks, WiFi networks, emergency response systems, and the like, which occupy increasing swaths of available spectrum. For example, a wireless audio transceiver may have a single transceiver channel so that the transceiver is able to wirelessly communicate with one wireless audio transmitter at a corresponding subcarrier frequency. As another example, a wireless audio transceiver may have multiple audio channels, where each channel can wirelessly communicate with a corresponding wireless audio transmitter or access point at a respective subcarrier frequency. As spectral resources become increasingly occupied by telecommunications networks and other essential resources, available spectrum diminishes and it becomes ever more important to increase the efficiency of resource use (e.g., bandwidth use) by wireless audio devices.

In some wireless audio systems, analog audio signals can be used to transmit audio between, e.g., wireless microphones and IEM devices. Likewise, many audio transceivers are configured to receive and transmit analog audio signals. However, it has been found that some analog audio systems are affected by noise during transmission and require hardware that is less flexible and consume more power. Also, analog systems often require a dedicated frequency be allocated to each transceiver. Re-allocation of subcarriers to different transceivers may often be difficult or not possible, or may result in an unacceptable or undesirable increase in audio latency. Audio latency, as used herein, refers to the lag between when sound is captured by an audio capture device, e.g., a microphone or instrument, and when the sound or a stereo mix of sound is transmitted over the air to a transceiver of audio devices, e.g., an IEM device or speaker. Further, analog systems can sometimes not be sufficiently user scalable for certain applications, which may mean that as additional users are added to analog audio systems, additional bandwidth must be allocated to the transceivers for those additional users, which decreases spectral efficiency of the audio system.

While analog signals are often used for certain wireless audio devices and systems, such as in-ear monitoring devices/systems, wireless microphones are often digital. As such, various systems are described herein, including wideband multi-user audio systems (WMAS) that provide for improved spectral efficiency, better in-band control, flexible bi-directional audio, and support for flexible/mixed use cases.

To address these concerns, audio being captured using a microphone or the like, or being transmitted to an in-ear monitor, speaker, or the like, can be converted to a digital signal in which audio information is encoded in audio frames. Audio channels can be signified using symbols carried in one or more subcarriers. Tones, or the like can be used to indicate synchronization information to a wireless transceiver and indicate to the transceiver the audio payload. Synchronization information can assist the wireless transceiver with synchronizing for time offset, frequency offset, signal deformation, or the like. However, digital audio systems often experience, among other issues, excessive multipath fading of RF signals, which can lead to frequency-selective fading, channel fading, and bit error rate increases, among other detrimental effects.

Additionally, in some multi-user audio systems, different subsets of users may require different audio qualities. Likewise, different applications of a multiuser audio system may require different audio qualities. For example, a professional musician or singer may have a higher fidelity requirement and lower latency requirement for in-ear monitor playback of captured audio than a speaker at a conference using the same or similar audio system. Additionally, in many multiuser audio systems, all connected wireless transceivers are treated equally, which often results in audio being transmitted to backstage crew with an unnecessarily low latency and an unnecessarily high fidelity in order to achieve a fidelity and a latency across the system or for a particular transceiver/audio device that is desired/expected by users, such as professional musicians, broadcasters, etc.

Connecting backstage transceivers to the same wireless audio system for crew members, sound booth and mixing/ recording engineers, and/or the like, can place strain on the system and reduce overall sound quality, increase latency, and/or inhibit further scalability of the system. This strain on the audio system can cause audio having an unacceptably high latency and/or an unacceptably low latency to be transmitted to certain users. The WMAS described herein flexibly allocate the available spectral resources to different audio devices based on audio quality/latency needs of various different audio devices and/or categories of audio devices. As such, a WMAS such as those described herein can be more user scalable, may lead to improved spectral efficiency, may lead to reduced path interference, and may improve audio quality across the system.

In some examples, the system can include a scheduler module or the like to allocate portions of available radio resources to different users/subscribers in order to maintain audio quality characteristics and/or other attributes of the signal or audio for certain of the subscribers/users. Audio may be transmitted in radio frames via audio payload subcarriers. Radio frames may be uplink/downlink flexible. A radio frame can include multiple subcarriers on an audio channel and/or control channel allocated or associated with a single subscriber/user. Other radio frames can include multiple subcarriers on multiple audio channels and/or control channels allocated or associated with more than one subscriber/user.

Figure 1B:
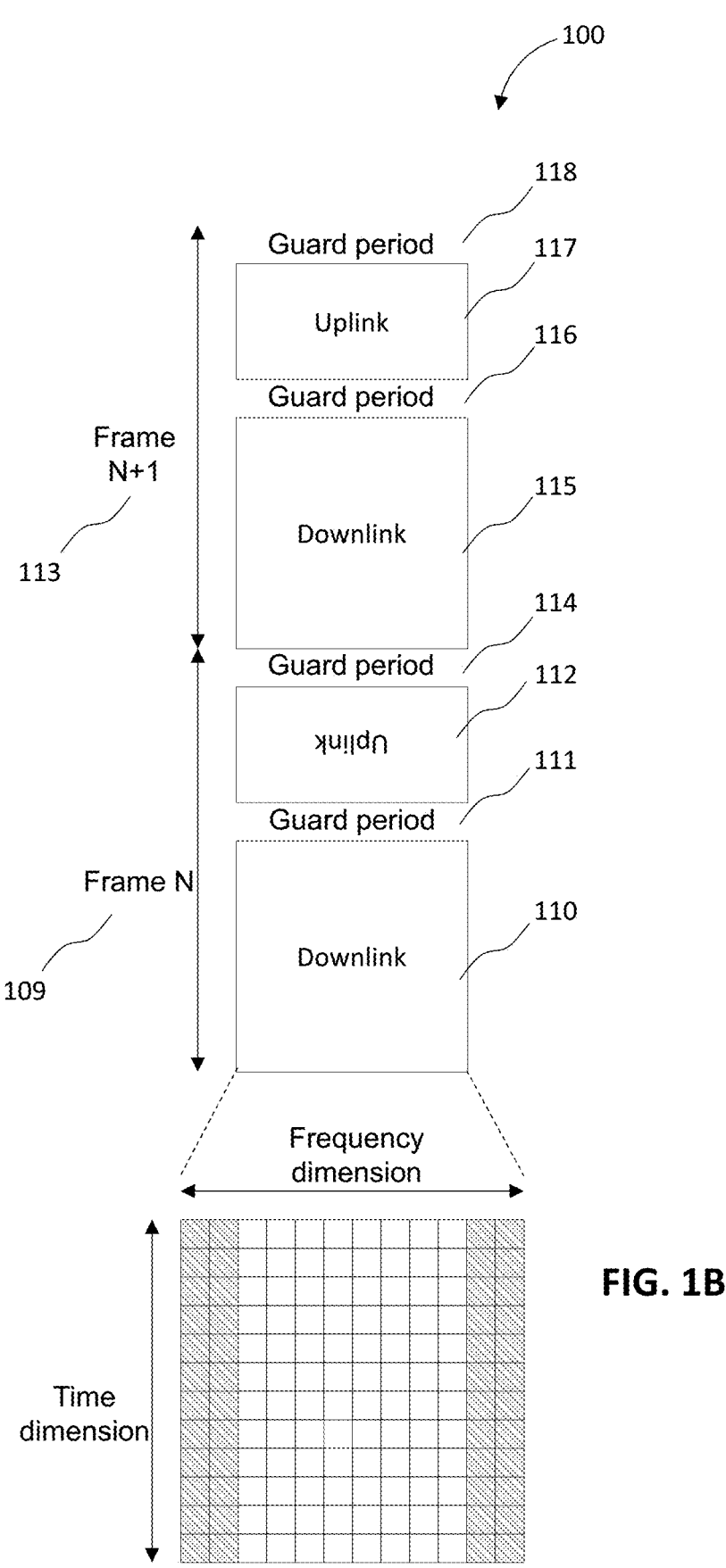
FIG. 1B illustrates an example frame architecture for transmitting audio payload in an example audio system, according to an embodiment of the present disclosure.

As illustrated in FIGS. 1A and 1B, a radio frame 100 (also known herein as 'frame') can be viewed as a 2-dimensional grid with one axis being a frequency dimension 101 and a second axis being a time dimension 102 of the radio signal. The radio frame 100 can be discretized into a plurality of resource elements 103. A subset of the resource elements 103 can form a resource block 104 that is the smallest unit of resource elements 103 that can be allocated to a user or channel. A resource element 103 can be defined as one subcarrier 105 in the frequency dimension 101 by one symbol 106 in the time dimension 102. The size and shape of the resource block 104 can be chosen based on system requirements, tradeoffs, payload data being transmitted, transceiver hardware being used, and/or the like. In some example systems, the resource block 104 can comprise between about two subcarriers 105 and about 25 subcarriers 105, and between about one symbol 106 and about ten symbols 106, and/or any other combination, or the like. Other resource block 104 configurations are contemplated. In the time dimension 102, two or more symbols 106 can comprise a subframe 107, which defines the number of symbols 106 in the time dimension 102 of the resource block 104. Guard subcarriers 108 can be formed from unused subcarriers 105 at the band edges that allow roll-off of the spectrum to meet mask requirements.

A plurality of frames 100 can be scheduled in the same subcarriers 105 across different portions of the time dimension 102. As shown in FIG. 1B, the frame 100 can be a time division duplex (TDD) frame, such as a first TDD frame 109. The first TDD frame 109 can be divided into a downlink portion 110 and an uplink portion 112, separated in the time dimension 102 by a guard period 111. A second TDD frame 113 can be separated from the first TDD frame in the same subcarriers 105 by a guard period 111. The second TDD frame 113 can also be divided into a downlink portion 115 and an uplink portion 117, separated by a guard period 116. A further guard period 118 can succeed the uplink portion 117 of the second TDD frame 113 to separate the second TDD frame 113 from any subsequent frames scheduled for the same subcarriers 105 but later in the time dimension 102. Uplink (UL) and downlink (DL) frame portions can comprise one or more subframes 107, where each subframe 107 is defined as all subcarriers 105 over the duration of one resource block 104 (across all symbols 106 in the resource block 104). Guard periods (e.g., 111, 114, 116, 118) can be inserted between downlink and uplink portions of a frame or between frames.

The duration in symbols 106 of a DL portion need not be equal to the duration in symbols 106 of a UL portion in the same frame 100. Likewise, the duration in symbols 106 of a frame 100 need not be equal to the duration in symbols 106 of other frames scheduled for the same subcarriers 105 or other subcarriers in the available spectrum. However, in other instances, the duration in symbols 106 of a frame 100 can be equal across all frames scheduled for some or all subcarriers 105 in the available spectrum. The number of resource elements 103 in a resource block 104 that can be allocated to a user or channel need not define or limit the number of subcarriers 105 used to define the guard subcarriers 108 at channel edges. Guard subcarriers 108 can be provided to allow the system to meet spectral mask requirements and reduce interference on adjacent channels. The number of resource elements 103 in a resource block 104 that can be allocated to a user or channel need not define or limit the duration of a guard period (e.g., 111, 114, 116, 118) between frames (e.g., 100, 109, 113) or between a DL portion (e.g., 110, 115) and a UL portion (e.g., 112, 117).

A frame 100 can comprise resource blocks 104 allocated to different users or audio channels. A frame 100 can comprise resource blocks 104 that are open or unused. A frame 100 can comprise resource blocks 104 in which synchronization information or the like can be scheduled. Resource blocks 104 allocated to different users or audio channels can be scheduled orthogonally in the time dimension 102 and/or in the frequency dimension 101 within the frame 100.

Select systems described in the present disclosure include a WMAS with improved spectral efficiency and improved user scalability. For example, when one or more user devices are added or removed (e.g., registered or deregistered), some audio systems are not able to scale efficiently as the number of user audio channels increases. Scalability may be based upon or limited by frame structure, total resource (e.g., bandwidth) availability, and/or audio quality requirements for the system, among other considerations. As additional subscribers or subscriber devices are registered, for example, some audio systems incur a disproportionate increase in additional resources (e.g., bandwidth) with each new subscriber/device registered. Some systems experience diminishing audio quality with each new subscriber/device registered. Some systems experience a computational complexity (and overhead requirements and latency experienced by each subscriber) that increases non-linearly with the increase in new subscribers/devices registered with the systems.

Some of the WMAS described herein are configured for ultra-low latency audio transmission even as they are scaled up or down. Many of the described WMAS are configured to achieve high fidelity audio transmission for those subscribers/devices where it is appropriate or prioritized. Many of the described WMAS are adaptable to different audio applications. In many different implementations, the system may include a variety of different subscribers/subscriber types, audio devices, audio quality requirements, and latency requirements, among other characteristics and considerations.

In Tables 1, 2, and 3 below, the subscriber type, audio device type, audio fidelity requirement, and maximum latency limits for, respectively, an example conferencing application, a live sound application, and a live broadcast application are presented.

TABLE 1

Example Subscribers, Devices, and Audio Requirements for Example Conferencing Applications

| Subscriber Type | Audio Device Type | Audio Fidelity Requirement | Maximum Latency Limit |
|---|---|---|---|
| Presenter/Panel Member | Handheld Mic, Lapel Mic, or Lavalier Mic, with Bodypack Transceiver | Mid-Mono (e.g., 64-128 kbps) | Less than about 15 ms |
| Delegate/ Attendee | Desktop or Gooseneck Mic, with Wireless Transceiver | Mid-Mono (e.g., 64-128 kbps) | Less than about 15 ms |
| Interpreter | Desktop or Gooseneck Mic with Wireless Transceiver | Mid-Mono (e.g., 64-128 kbps) | Less than about 20 ms |
| Staff/Crew | Intercom with Bodypack Transceiver | Mid-Mono (e.g., 64-128 kbps) | Less than about 20 ms |

TABLE 2

Example Subscribers, Devices, and Audio Requirements for Example Live Sound Applications

| Subscriber Type | Audio Device Type | Audio Fidelity Requirement | Maximum Latency Limit |
|---|---|---|---|
| Professional Musician (mic) | Pro-Audio Microphone with Handheld or Bodypack Transceiver | High-Mono (e.g., 175-250 kbps) | Less than about 3 ms |
| Professional Musician (IEM) | IEM Device with Bodypack Transceiver | High-Stereo (e.g., 300-500 kbps) | Less than about 3 ms |
| Staff/Crew/Security | Intercom with Bodypack Transceiver | Voice Grade (e.g., 16-32 kbps) | Less than about 20 ms |

TABLE 3

Example Subscribers, Devices, and Audio Requirements for Example Broadcasting Applications

| Subscriber Type | Audio Device Type | Audio Fidelity Requirement | Maximum Latency Limit |
|---|---|---|---|
| Live Broadcaster/Radio Personality | Pro-Audio Microphone with Handheld or Bodypack Transceiver | High-Mono (e.g., 175-250 kbps) | Less than about 3 ms |
| Live Broadcaster/Radio Personality | Interruptible Foldback Device with Bodypack Transceiver | Mid-Mono (e.g., 62-128 kbps) | Less than about 10 ms |
| Pre-recorded Broadcaster/Radio Personality | Pro-Audio Microphone with Handheld or Bodypack Transceiver | High-Mono (e.g., 175-250 kbps) | Less than about 10 ms |
| Pre-recorded Broadcaster/Radio Personality | Interruptible Foldback Device with Bodypack Transceiver | Mid-Mono (e.g., 62-128 kbps) | Less than about 15 ms |
| Staff/Crew/Security | Intercom with Bodypack Transceiver | Voice Grade (e.g., 16-32 kbps) | Less than about 20 ms |

In Tables 1, 2, and 3, example applications of WMAS are provided, including select audio devices configured to be registered within such systems and audio device/user requirements. Depending on the application, there may be a large range of acceptable or desired audio quality/fidelity and acceptable or desired maximum audio latency among the different audio devices used in these example audio systems. However, audio systems typically provide audio having the same or similar audio quality and audio latency to all audio devices. Thus, in many audio systems, depending on the application in which it is being used and/or the particular mix of audio devices being used in the system, one of two things typically occurs, either:

1) users that require high fidelity/low latency audio receive audio having insufficient fidelity or experience an audio latency that is undesirable or unacceptable for those users, or 2) the audio system is operated in a fundamentally inefficient way because all audio being transmitted to audio devices is maintained at a high fidelity and low latency, which may not be required for all users/audio devices in all applications.

In select described WMAS and associated methods, audio may be provided to different audio devices that have different, user-specific or user-category-specific fidelity/latency. The described WMAS and methods may be more scalable in terms of the number of audio devices on the system/network without introducing some or many of the inefficiencies that are inherent in many audio systems.

The described WMAS and associated methods may also enable transmission and reception of audio payload using unique pilot patterns, control channel messaging for beamforming weights, etc. In some systems, subscriber devices may be automatically configured upon network entry and assigned an audio channel. In some example systems, audio channel allocation may be more flexible to disparate and unequal subscriber/subscriber device characteristics, attributes, audio latency requirements, audio quality requirements, etc. A WMAS may comprise an access point having an access point clock that acts as a master clock, which can be reference by local clocks at disparate audio devices to facilitate timing synchronization. Such timing synchronization may eliminate the need for audio sample-rate conversion, which can often increase the effective audio latency.

In some WMASs described, transceivers of disparate audio devices can be configured to transmit and/or receive a signal or carrier wave carrying subcarriers 105 that are orthogonal to other subcarriers 105 over the frequency dimension 101 of the signal or carrier wave. The signal or carrier wave can be transmitted by the access point as a wideband signal occupying a relatively larger range of the frequency dimension 101. The signal or carrier wave can be transmitted with audio payload subcarriers, synchronization information subcarriers, beacon symbols, pilot subcarriers, and/or the like. Payload and synchronization information may be transmitted in orthogonally positioned subcarriers 105 of the frequency dimension 101 and/or orthogonally in adjacent symbols 106 across the time dimension 102. Transceivers can be configured to 'listen to' or demodulate and process only a portion of the wideband signal or carrier wave, meaning that the transceivers are configured to be tuned to particular subcarrier(s) 105 of the signal or carrier wave.

An access point, audio processor, or the like can allocate one or more subcarriers 105 for an audio channel associated with a subscriber. Without wishing to be bound by any particular theory, the scalability of such an approach may be increased, in part, by the orthogonality of subcarriers 105 in the frequency dimension within the frame, meaning that more resource blocks 104 carrying audio payload may be transmitted without increasing the total bandwidth of the signal or carrier wave, or having to allocate additional subcarriers 105 to the audio channel.

The increase in subcarrier allocation density may lead to more users or audio mixes being transmitted towards/received from more transceivers. Transceivers/access points may be configured to capture, listen to, or sample, subcarriers 105 based on, e.g., the symbol 106 found at each resource element and whether that symbol 106 is associated with or allocated to the audio channel or the subscriber. However, an implication of such a user scalable approach may be that non-payload overhead cannot or should not be shared between different transceivers. As such, in some implementations, subcarriers 105 of the signal or carrier wave to which the audio channel for a particular transceiver is mapped may comprise their own overhead in a same frame 100, in the same subframe 107, during the same symbol 106 period, and/or in the same resource block 104.

Without wishing to be bound by any particular theory, such an approach for allocation of subcarriers 105 to respective transceivers and the orthogonality of subcarriers 105 in the frequency dimension 101 may increase user scalability, but the increase in overhead may lead to decreases in latency. As such, various approaches for flexible subcarrier allocation and transmission/reception diversity are described herein that reduce the burden of increased overhead on latency.

Figure 2A:
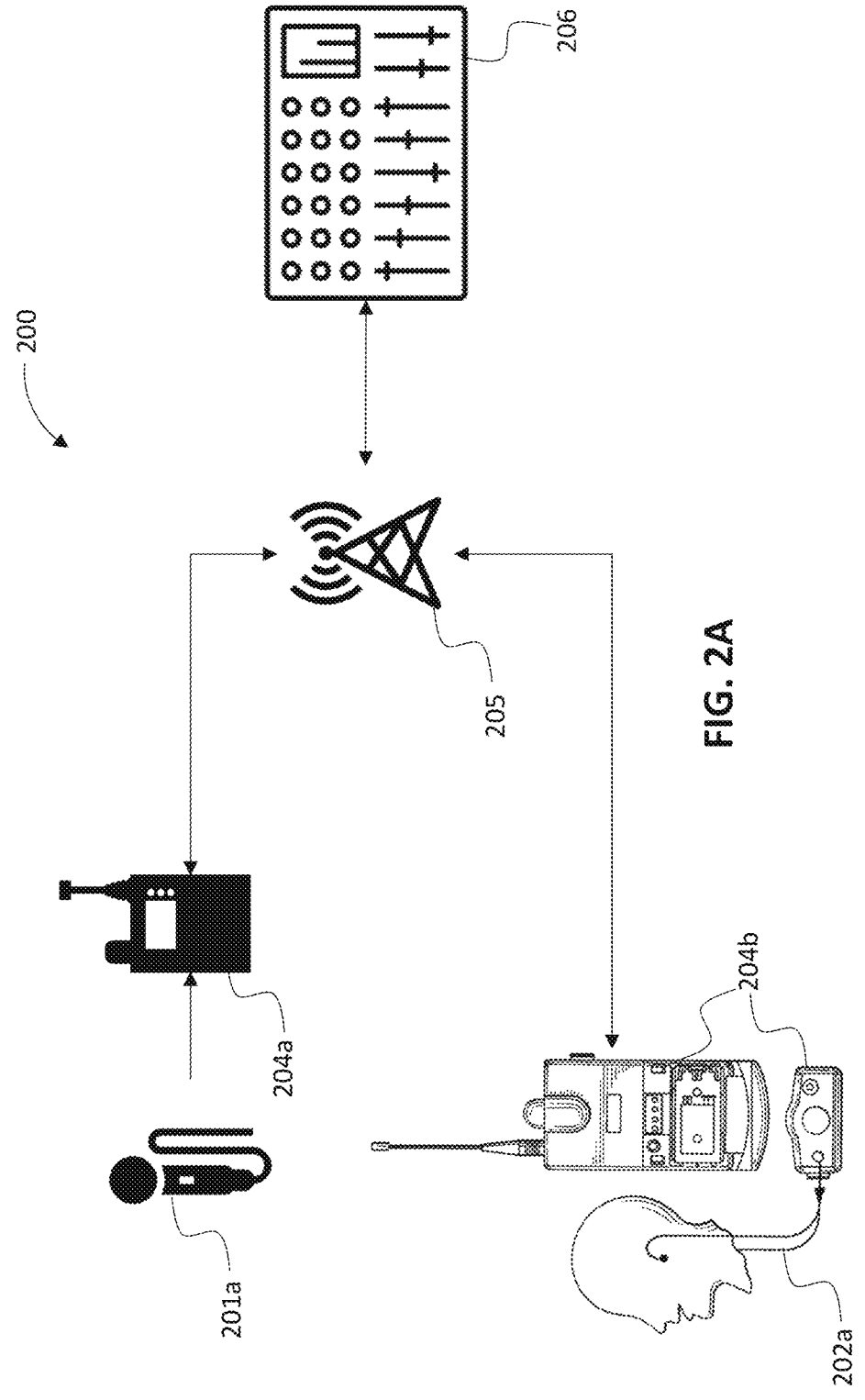
FIG. 2A illustrates an example multi-user audio system, according to an embodiment of the present disclosure.
Figure 2B:
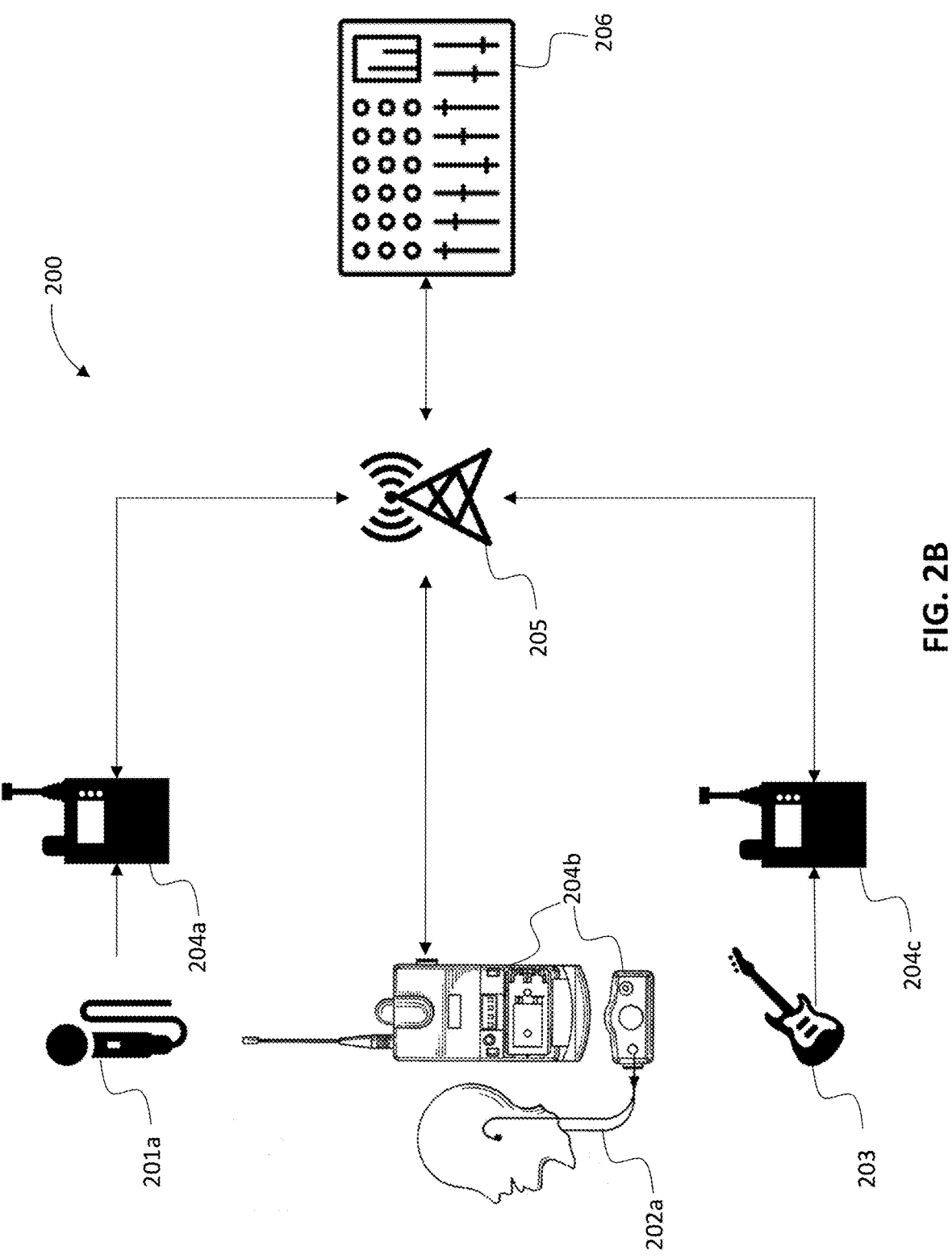
FIG. 2B illustrates an example multi-user audio system, according to an embodiment of the present disclosure.
Figure 2C:
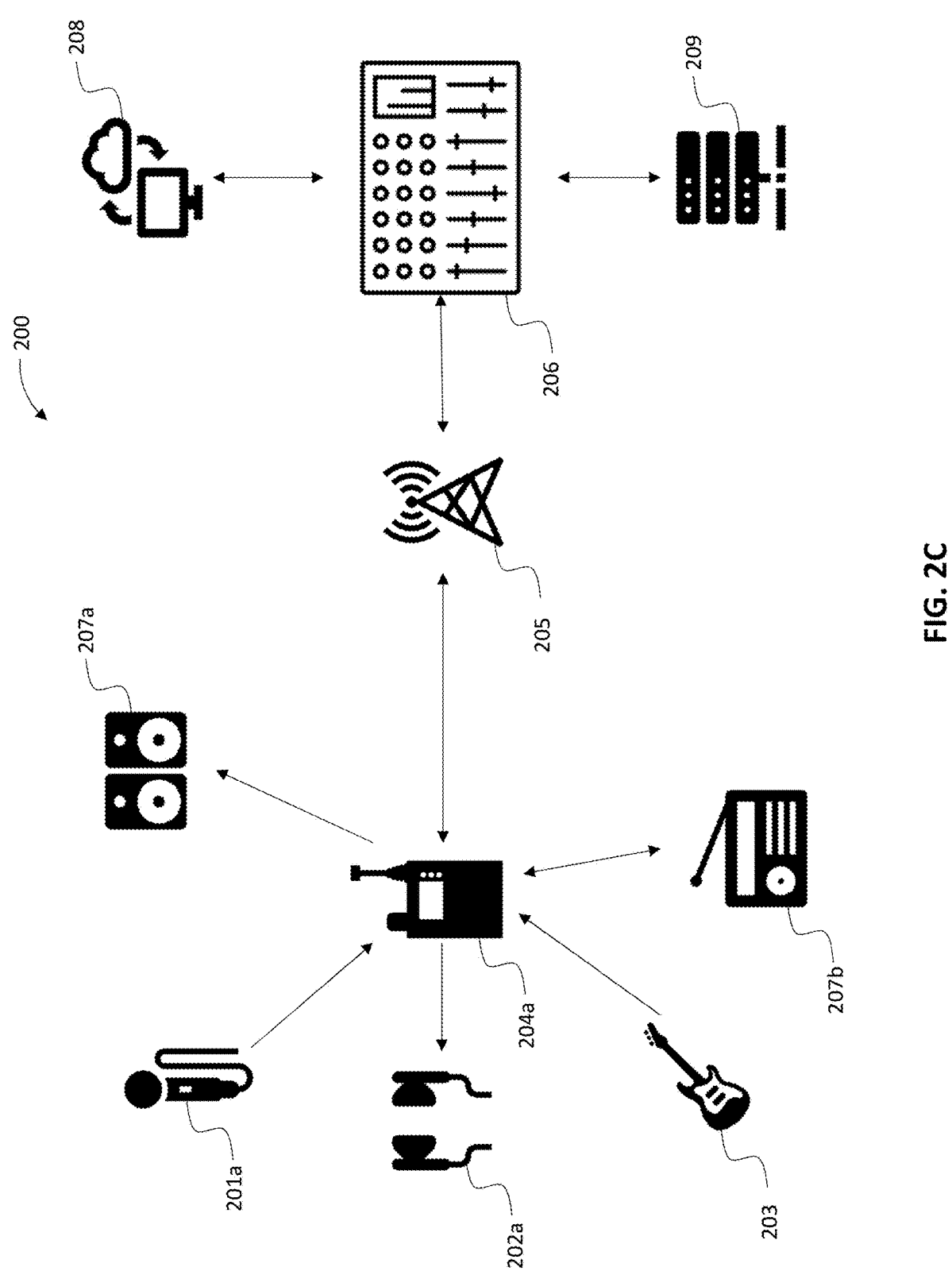
FIG. 2C illustrates an example multi-user audio system, according to an embodiment of the present disclosure.

FIGS. 2A-2C illustrate various embodiments of an example audio system. For example, FIG. 2A illustrates a wireless audio system 200 comprising a sound wave capture device 201a configured to capture sound waves generated by a user, such as speech, vocalizations, singing, sound waves generated by an instrument, or the like. The sound wave capture device 201a may be a microphone or the like.

The depicted system 200 further includes a transceiver 204a in operable communication with the sound wave capture device 201a. The transceiver 204a can be in wired communication with the sound wave capture device 201a. The transceiver 204a can alternatively be in wireless communication with the sound wave capture device 201a. The transceiver 204a can be configured to receive, from the sound wave capture device 201a, an analog audio signal, and to generate digital audio therefrom. The transceiver 204a can be configured to receive the analog audio signal and transmit the analog audio signal along for audio mixing.

The depicted system 200 further comprises an access point 205 configured to be in operable communication with the transceiver 204a. The access point 205 can receive signals from the transceiver 204a that carries audio captured by the sound wave capture device 201a. The access point 205 can be configured to transmit signals to the transceiver 204a, such as signals carrying synchronization information.

The system 200 further comprises an audio processor 206 configured to receive, from the access point 205, an analog audio signal or digital audio. The audio processor 206 can comprise a sound board, a mixing console, an audio mixer, a mixing desk, a sound mixer, a soundboard, and/or the like. The audio processor 206 can combine audio from the sound wave capture device 201a with audio from other sound wave capture devices or the like to generate a user-customized audio mixture. The mixed audio can be generated by modifying each audio signal (digital or analog) to control or enhance loudness, frequency content, dynamics, panoramic position, and other audio characteristics for each audio signal before combining the audio signals into a user-customized audio mixture.

The access point 205 can be configured to allocate audio channels for users to the frequency and time domains of a scheduled carrier wave. The access point 205 can comprise or be in operable communication with one or more audio channel allocation units (not shown) that are configured to carry out said audio channel allocation. The access point 205 can generate one or more signals, such as a broadcast signal, an audio channel allocation information signal, a synchronization signal, a control channel signal, a network access signal, and/or the like, and transmit the one or more signals to the access point 205, which in turn can transmit the one or more signals to the transceiver 204a.

The access point 205 may be configured to generate a signal comprising plural audio channels associated with plural users of the system 200, and to subdivide the signal into resource blocks carrying the audio payload on subcarriers associated with one or more audio channels.

The transceiver 204a can be configured to receive plural audio channels associated with plural users of the system 200 from the access point 205. The transceiver 204b can then be configured to subdivide the carrier wave into subcarriers allocated by audio channel to carry the user-customized audio for audio playback, mix the audio carried by those subcarriers to form the user-customized audio, and provide the user-customized audio to the audio playback device 202a.

One or more of the transceivers 204a,b,c can comprise an antenna combiner, a wireless monitor transmitter, a wireless transmitter, a dual wireless transmitter, a stationary RF transmitter, a digital IEM/IFB wireless transmitter, an AW+ band transmitter, an ultra-high frequency (UHF) transmitter, or the like. The transceivers 204*a,b,c* can be configured to receive and/or transmit signals and carrier waves having a range of frequencies, from low frequency to ultra-high frequency.

The access point 205 can be configured to provide the carrier wave to the transceiver 204*b*, which can comprise an IEM receiver, a wireless bodypack transceiver, a multi-frequency belt-pack IFB receiver, a hardwired personal monitor bodypack, a wireless RF receiver, or the like.

The user-customized audio mixture may comprise the audio captured by the sound wave capture device 201*a* and audio captured from the instrument 203, such that the user-customized audio mixture can be carried by the carrier wave and allocated for only the transceiver 204*b*. Sometimes, different users may want to hear the audio captured by the sound wave capture device 201*a* and/or the audio captured by the instrument 203, for example, as part of their respective user-customized audio mixture. In such an instance, one or more portions of the frequency and time domain of the carrier wave may be allocated for the trans-ceiver 204*b* while other portions of the frequency and time domain of the carrier wave may be allocated for other transceivers (not shown) associated with the other users.

Audio captured by different audio devices carried by different users may be mixed together to form a stereo mix. Audio from a single audio device, e.g., the sound wave capture device 201*a*, may be filtered and/or otherwise pro-cessed to form a mono mix. A stereo mix and/or mono mix associated with one or more audio capture devices used by one or more first users may be played back by one or more audio playback devices of one or more second users.

While not illustrated in FIG. 2A, according to some alternative embodiments, the audio processor 206 can com-prise the access point 205, the audio processor 206 can be configured to transmit synchronization information by devices or subsystems other than the access point 205, and/or the audio processor 206 can be configured to transmit the synchronization information to the transceiver 204*a* directly.

While not illustrated in FIG. 2A, according to some alternative embodiments, the transceiver 204*a* can be con-figured to transmit synchronization information, configura-tional information, and/or the like in the downlink direction to the sound wave capture device 201*a*.

The system 200 can further comprise an audio playback device 202*a* in operable communication with a transceiver 204*b*, which may be in operable communication with the access point 205. The transceiver 204*a* may be configured to receive captured audio from the sound wave capture device 201*a* and transmit the captured audio or digital audio converted therefrom to the access point 205. The transceiver 204*b* may be configured to receive an audio signal from the access point 205 and transmit or otherwise provide the audio signal or analog audio to the audio playback device 202*a*. The transceiver 204*b* can be configured also to transmit information, such as synchronization information, audio quality feedback, user inputs, allocation information, or the like to the access point 205.

Audio channels associated with the transceivers 204*a*, 204*b*, and/or 204*c* can be formed by the access point 205 from resource blocks that are allocated to particular users or audio devices. Audio channels can be mapped to resource blocks across subcarriers that are positioned orthogonally within the frequency dimension of the carrier wave to other subcarriers. Different resource blocks can be allocated to, or associated with, different users and respective transceivers.

Without wishing to be bound by any particular theory, the orthogonal division of the subcarriers within the frame may lead to increased efficiency of spectrum use for the same transmission of payload audio. The increased spectral effi-ciency may thereby debottleneck the system 200 and allow for additional payload in additional resource blocks to be transmitted for additional audio channels.

Various different allocation approaches and frame struc-tures may be used for transmitting audio payload informa-tion and overhead/synchronization information via a RF signal. For example, the frame structure illustrated in FIGS. 1A and 1B can be used.

The system 200 can provide for high fidelity, low latency audio transmission between audio sources (e.g., sound wave capture device 201*a*, instrument 203), the access point 205, and audio playback devices (e.g., 202*a*). The system 200 can facilitate communication between various sound sources, various audio playback devices, and the access point 205 and/or the audio processor 206. The high fidelity, low latency audio transmission may be enabled by adaptive allocation of audio channels within the carrier wave. The carrier wave is digitally modulated according to any suitable digital modulation scheme, such as orthogonal frequency-division multiple access (OFDMA). While certain examples described herein refer to the use of OFDMA for allocating resource blocks across subcarriers and resource blocks of a radio frame for a subscriber and the use of OFDMA symbols for indicating the subscriber(s) associated with each symbol period in each resource block, a person having ordinary skill in the art will readily understand that many other technolo-gies and configurations can be used, including but not limited to those mentioned above.

Based on feedback from transceivers 204*a,b,c*, the access point 205 and/or the audio processor 206 can carry out adaptive user-to-subcarrier allocation. Frames of the carrier wave can comprise bi-directional subcarriers, meaning that some of the symbols within a frame are dedicated for uplink direction transmission, while other symbols in the frame are dedicated for downlink direction transmission. In some instances, in a TDD bi-directional frame, dedicated down-link symbols and dedicated uplink symbols may be used such that uplink and downlink payload can be carried in a same subcarrier with a guard period to accommodate turn-around-time.

By way of example only, a bi-directional frame structure may be used for communications between the access point 205 and the transceiver 204*b* such that the access point 205 can provide synchronization information and audio payload to the transceiver 204*b* while the transceiver 204*b* can provide channel quality feedback or the like to the access point 205 by way of the same frame structure schema.

By way of another example, a bi-directional frame struc-ture may be used by the access point 205 such that audio provided to the access point 205 by the transceivers 204*a,c* can be transmitted to the audio processor 206 in dedicated uplink symbols of a same bi-directional frame while audio provided to the access point 205 for the audio playback device 202*a* can be transmitted to the transceiver 204*b* in dedicated downlink symbols of the same bi-directional frame. As noted above, uplink direction audio can be pro-vided to the access point 205 in the same one or more subcarriers used for providing downlink direction audio from the access point 205 or the like to, e.g., the audio playback device 202*a*.

As illustrated in FIG. 2C, according to some embodi-ments, the system 200 can further comprise other audio sources, such as an instrument 203 with a built-in or mounted pickup, and transceiver 204*c* configured to receive, from the instrument 203, analog audio or digital audio signals. The transceiver 204*c* may be configured to transmit the analog audio or digital audio signals to the access point 205 and/or directly to the audio processor 206. The transceiver 204*c* may be configured to convert analog audio to digital audio signals before transmitting the digital audio signals to the access point 205.

The access point 205 may be configured to receive audio signals from the sound wave capture device 201*a* and the instrument 203, and provide audio to the audio playback device 202*a*, via a single transceiver, such as the transceiver 204*a*, in which case the system 200 may not include or comprise the transceivers 204*b*, 204*c*. The transceiver 204*a* may be dedicated for uplink audio transmissions, and may therefore be in operable communication with the sound wave capture device 201*a* and the instrument 203, but not the audio playback device 202*a*. The transceiver 204*b* may be dedicated for downlink audio transmissions, and may therefore be in operable communication with the audio playback device 202*a*, but not the sound wave capture device 201*a* or the instrument 203.

Audio channels can be collocated in one or more adjacent subcarriers. Audio channels can be mapped to orthogonal subcarriers in one or more resource blocks of a radio frame having a relatively wide band (e.g., greater than about one (1) MHz, greater than about two (2) MHz, greater than about three (3) MHz, etc.). Audio channels can be mapped to orthogonal subcarriers in one or more resource blocks of a radio frame having a relatively narrow band (e.g., less than about one (1) MHz, less than about 900 kHz, less than about 800 kHz, etc.).

Audio channels can be designated using symbols, tones, signals, and/or the like for improved channel identification and channel estimation by the transceivers 204*a,b,c* and the access point 205.

The transceivers 204*a,b,c* and/or the access point 205 may comprise a computing device, such as a processor, a memory storing computer program instructions, a digital-to-analog converter (DAC), a combining module, a modulator, an antenna, a digital signal processor (DSP), and/or the like.

The access point 205 or the audio processor 206 can comprise a processor and a memory storing computer program instructions, for causing subdivision of a frequency-time dimension of a carrier wave in a radio frequency band into a plurality of subcarrier allocations associated with a plurality of transceivers (e.g., 204*a,b,c*), wherein respective subcarriers are orthogonal in the frequency dimension to other subcarriers. The access point 205 can be further configured to modulate the plurality of subcarrier allocations according to a plurality of modulation schemes such that respective subcarrier allocations are individually modulated. The access point 205 can be further configured to cause generation, based at least on the plurality of modulation schemes, of demodulation information for demodulating the plurality of subcarrier allocations of the frequency-domain spectrum. The access point 205 can be further configured to cause transmission of the carrier wave, the carrier wave comprising the demodulation information.

The access point 205 can be further configured to cause scrambling of the carrier wave using one or more of: block coding, block coding with error correction, convolutional encoding, selected mapping, selected list mapping, partial transmit sequence, interleaving, tone reservation, or tone injection.

The access point 205 can be further configured to cause modulation of the carrier wave using one or more of: inverse fast Fourier transform conversion, upsampling, peak windowing, envelope scaling, or clipping and filtering.

Examples of interferer laden environments in which the transceivers 204*a,b,c*, the access point 205, and/or the audio processor 206 may be used include but are not limited to concert venues, conference rooms, stadiums, radio stations, television stations, recording studios, and the like.

The transceivers 204*a,b,c* can be configured to be in short-range wireless communication with the access point 205 and/or the audio processor 206. The transceivers 204*a, b,c* can be configured to receive, in subcarriers of a carrier wave, audio payload for playback and/or synchronization information. The carrier wave can be subdivided into a plurality of subcarriers orthogonally spaced in a frequency dimension of the carrier wave. Respective subcarriers of the carrier wave can be individually modulated according to respective modulation schemes of a plurality of modulation schemes. The transceivers 204*a,b,c*, the access point 205, and/or the audio processor 206 can be configured to demodulate at least one subcarrier of a plurality of subcarriers from the carrier wave. Demodulation can be carried out using one or more characteristics of the carrier wave and/or demodulation information received with the carrier wave. The one or more characteristics of the carrier wave can comprise one or more cyclic prefixes operable to identify a first or last point of the carrier wave. The one or more characteristics of the carrier wave can comprise a framing bit, a time slot within a frame of the carrier wave, a syncword, a phase, a waveform shape, a frequency, or an amplitude.

An air interface latency can be defined as the time between a transmitting transceiver (e.g., the access point 205) and a receiving transceiver (e.g., transceiver 204*b*). The air interface latency can be less than or equal to about 15 ms, less than or equal to about 10 ms, less than or equal to about five (5) ms, or less than or equal to about three (3) ms, inclusive of all values and ranges therebetween.

The carrier wave can be configured to carry the demodulation information. The demodulation information can be used by a transceiver to demodulation the signal and sample the signal for portions of subcarriers allocated to a particular audio channel. The demodulation information can comprise one or more pilots, pilot signals, pilot subcarriers, or pilot frames at known positions in the frequency-time dimensions of the carrier wave. One or more of the transceivers 204*a,b,c* can be configured to determine waveform deformation based upon at least the one or more pilots, pilot signals, pilot subcarriers, or pilot frames. The demodulation information can comprise one or more beacon frames carrying waveform shape information, beacon interval information, or a contention window value.

One or more of the transceivers 204*a,b,c*, the access point 205, and/or the audio processor 206 can be configured to determine frequency distortion of the carrier wave based upon at least the one or more beacon frames. Demodulation can comprise at least one of: least squares (LS) based frequency dimension pilot aided channel estimation, minimum mean square error (MMSE) based frequency dimension pilot aided channel estimation, channel frequency response channel estimation, or parametric model-based channel estimation.

One or more of the transceivers 204*a,b,c*, the access point 205, and/or the audio processor 206 is/are configured to correct the carrier wave to compensate for one or more of: sampling clock offsets, imbalances due to mismatches between an in-phase signal path of the carrier wave and a quadrature signal path of the carrier wave, power fluctuations, phase noise, an integer-subcarrier frequency offset, a fractional-subcarrier frequency offset, or carrier frequency offset nonlinearities.

The carrier wave can be signal scrambled using one or more of: block coding, block coding with error correction, selected mapping, convolutional encoding, selected list mapping, partial transmit sequence, interleaving, tone reservation, or tone injection. The carrier wave can be modulated using one or more of: inverse fast Fourier transform conversion, upsampling, peak windowing, envelope scaling, or clipping and filtering.

As illustrated in FIG. 2C, the transceiver 204a can be further configured to communicate in the uplink and/or downlink direction with a local playback device 207a (e.g., speakers). The transceiver 204a can be further configured to communicate in the uplink and/or downlink direction with a remote playback device 207b (e.g., a user device such as a radio, a smartphone, or the like). The audio processor 206 may further be configured to communicate with one or more of a remote control device 208 (e.g., a cloud computing device) and/or a local control device 209 (e.g., a server, an audio rack, an audio control interface, etc.).

When the transceiver 204a is communicating audio payload in the upstream and downstream direction to a plurality of different devices which require a different and distinct mix of audio, the transceiver 204a can separate out respective portions of the total audio payload to be delivered to respective downstream or upstream devices. The manner in which the access point 205 communicates with the transceiver 204a may be dictated by the audio processor 206. The audio processor may be communicating audio payload bi-directionally between more than one access point, and the access point 205 may be communicating audio payload bi-directionally between more than one transceiver 204a.

It can be important that the audio payload is being transmitted to the correct upstream or downstream device, and that different signals between different access points and/or transceivers are not carrying competing audio payload in the same portions of the frequency dimension and time dimension. Channel fading can result in poor audio quality or audio that includes significant audio artifacts from another audio channel associated with other subscribers to the network. In such instances, the scalability of the system 200 can be limited by the quality of decision making that occurs regarding allocation of available spectral resources and the clear and sparse communication of allocation instructions to all relevant devices in the system 200.

As illustrated in FIG. 2C, decision making regarding audio channel allocation can be carried out by any suitable computing device or system, such as the remote control device 208 and/or the local control device 209. Such computing devices can be configured to provide audio channel allocation instructions or the like to the audio processor 206 in order for the audio channel allocation instructions to be communicated upstream and downstream throughout the system 200.

A digital modulation and transmission approach (e.g., OFDMA) can be used to carry audio payload and/or control messages between devices in the system 200, such as between an access point and an IEM device. The same or a different digital modulation and transmission approach may be used to carry audio payload and/or control messages between a wireless microphone and an access point. The digital modulation and transmission approach can comprise subdividing a frequency dimension of the signal or carrier wave into subcarriers. A time dimension of the signal or carrier wave can be subdivided into symbols, which may define resource elements that comprise resource blocks (RBs).

Audio payload, synchronization information, and/or control information may be carried within particular resource blocks or subcarriers within resource blocks. Subcarriers can be configured to carry symbols, pilots, synchronization information, cyclic prefixes, audio payload, and/or the like. Guard periods may be maintained between different frames, or between an uplink portion and downlink portion of the same frame. Guard subcarriers can be maintained at the channel edges in the frequency dimension by not allocating any resource blocks to those subcarriers across all symbol periods.

The resource blocks may be mapped to one or more different audio channels, where each audio channel is associated with a particular device, such as an IEM device, a wireless microphone, or the like. The manner in which audio channels are mapped to different resource blocks is a factor in whether spectral efficiency is lower or higher, and whether the effective latency and audio quality experienced by subscribers to particular audio channels is sufficient.

In order to achieve higher or optimal spectral efficiency, the audio channels can be mapped to fewer and/or a fewest possible resource blocks in the frame while still achieving sufficient audio latency and audio quality for each audio channel. Different allocations can be used for different symbols within the same set of subcarriers. However, each subscriber has different audio latency and audio quality requirements, which may change over time, and which are relative only to the current set of subscribers, which also changes over time as subscribers are added to the network or removed from the network. Accordingly, the decision making regarding allocation of spectral resources to the various subscribers, and how to handle allocation of spectral resources as subscribers are added or removed from the network, may be a complex process even with relatively few subscribers on the network. Accordingly, the allocation of resources, such as available spectrum across a time dimension of the carrier wave or signal, can be carried out by, or facilitated at least in part by, an algorithm or the like. Additionally or alternatively, scheduling may not necessarily be complex, depending on implementation preferences and operational priorities for the system.

A wideband multiuser audio system (WMAS) or network (e.g., system 200) can include one or more processors that are configured to carry out decision-making analysis, optimization, resource allocation, and/or other tasks/goals before and/or during use of the system. One example of such an approach for resource allocation is provided in FIGS. 3A-3B and discussed below.

Figure 3A:
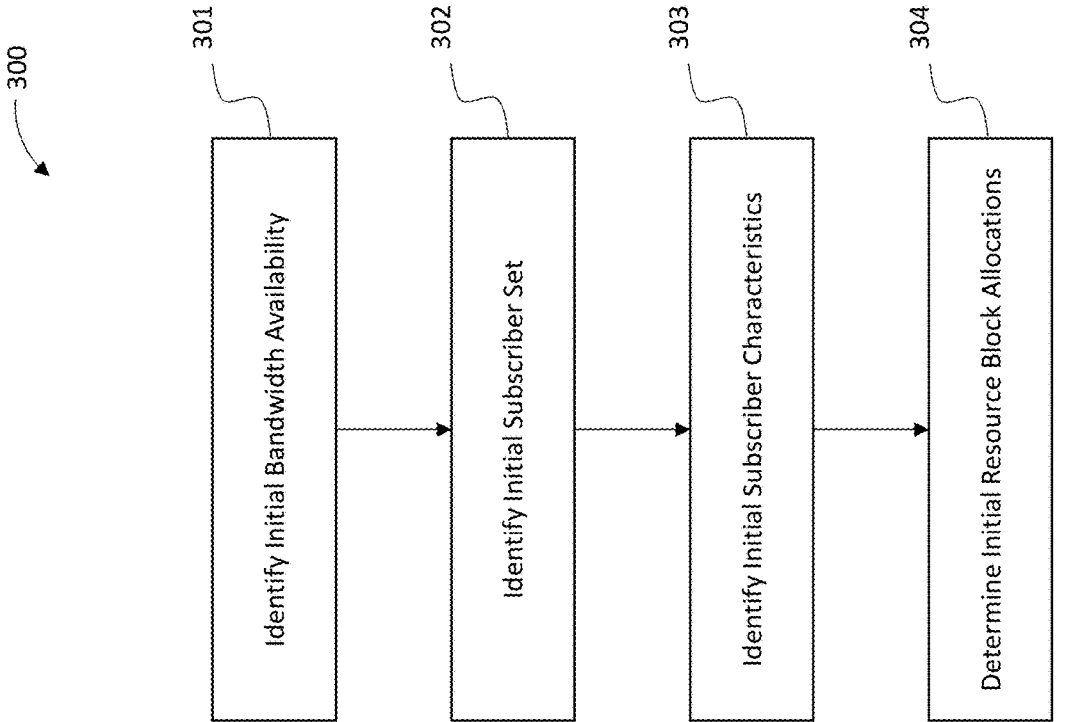
FIG. 3A illustrates an example approach for determining subcarrier allocation in an example audio system, according to embodiments of the present disclosure.

FIG. 3A illustrates an example of a resource allocation approach 300 that allocates resource blocks to various different subscribers. The approach 300 can comprise identifying information about initial bandwidth availability 301, identifying an initial subscriber set 302, identifying initial subscriber characteristics 303, and determining initial subscriber allocations 304.

By way of example only, a first device from the initial subscriber set 302 may be an in-ear monitoring device assigned to, or associated with, a lead singer of a band, while a second device from the initial subscriber set 302 may be a communications headset for a member of the lighting crew. In this example, the first device might be categorized into a first subscriber type that requires audio having ultra-low latency and a high fidelity, whereas the second device might be categorized into a second subscriber type that allows for a relatively higher latency and a relatively lower fidelity.

When an audio payload allocation unit or the like, initially determines resource block allocations 304 for the initial subscriber set 302 in this example, audio payload resource blocks mapped to a first audio channel for the first device might be allocated to one or more dedicated resource blocks while audio payload resource blocks mapped to a second audio channel for the second device might be allocated to one or more shared frequency resource blocks with other audio payload resource blocks mapped to other audio channels for other devices that are categorized as being the second resource blocks type or another resource blocks type that allows for relatively higher latency and relatively lower fidelity.

According to another example, the initial resource block allocations 304 can be generated based upon initial subscriber characteristics 303 that include express audio latency limitations, audio fidelity/quality requirements, and/or the like. Continuing with this example, in an instance in which the initial subscriber characteristics 303 comprises a maximal latency value associated with each of the subscribers and/or subscriber devices in the initial subscriber set 302, the initial resource block allocations 304 can be determined by allocating portions of the initial bandwidth availability 301 to subscribers or subscriber devices from the initial subscriber set 302 based upon the maximal latency value associated with each of the subscribers and/or subscriber devices in the initial subscriber set 302.

Continuing with the above example, the first device from the initial subscriber set 302 is an in-ear monitoring device assigned to, or associated with, a lead singer of a band, while the second device from the initial subscriber set 302 is a communications headset for a member of the lighting crew. In this example, the first device might be associated with a maximal latency value of about three (3) ms, whereas the second device might be associated with a maximal latency value of about 15 ms. When an audio payload allocation unit or the like generates the initial resource block allocations 304 for the initial subscriber set 302 of this example, audio payload mapped to a first audio channel for the first device might be allocated to one or more dedicated resource blocks while audio payload mapped to a second audio channel for the second device might be allocated to one or more shared resource blocks with other audio payload being mapped to other audio channels in the same shared resource blocks for other devices that allow for a relatively similar latency or a relatively higher audio latency to that required by the second device.

In some instances, dedicated allocations can be established based on a service type associated with different audio devices. While it is likely that different audio devices would experience different latencies, latency experienced by different audio devices is sometimes a function of overhead, transmission power, processing capacity, number of resource blocks to which the payload is allocated, individual processing blocks in the system, duration in symbols of the allocation span, and/or the like.

The initial bandwidth availability 301 can be identified by, for example, an audio payload allocation unit or an access point of a wideband multiuser audio system (e.g., system 200) by a sound engineer or other suitable technician. The initial bandwidth availability 301 can comprise indications of resource blocks in the frequency dimension that are allocatable to one or more users or user devices. The initial bandwidth availability 301 can additionally or alternatively comprise indications of radio frame characteristics, such as minimum guard interval, minimum guard period, turnaround time requirements, frame structure, resource block packing density, uplink/downlink flexibility of frame structure, other suitable radio frame characteristics, combinations thereof, and/or the like.

The initial subscriber set 302 defines the users and/or user devices to whom/to which the initial available bandwidth can be allocated or to which the initial available bandwidth is already allocated, whether in part or in full. The initial subscriber set 302 can include a name of each user, a unique device identifier of each user device, and/or the like.

The initial subscriber characteristics 303 comprises characteristics for subscribers in the initial subscriber set 302. The initial subscriber characteristics 303 can comprise, but are not limited to, a unique identifier, a users' name, a user type, a device name, a device type, a prioritization level, a minimum fidelity requirement, a maximal latency limit, a maximal distortion limit, a combined sound quality score, an audio quality value, a device/user bucket value, weighting score(s), user tag(s), device tag(s), user metadata, device metadata, subscriber registration date/time, subscriber registration duration, a period(s)-specific prioritization value, a dynamic or conditional prioritization value, other suitable characteristics, combinations thereof, and/or the like.

Initial resource block allocations 304 can be determined based on at least the initial bandwidth availability 301, initial subscriber set 302, and initial subscriber characteristics 303 associated with the initial subscriber set 302. By way of example only, in an instance in which the initial subscriber characteristics 303 comprises a subscriber type associated with each of the subscribers and/or subscriber devices in the initial subscriber set 302, the initial resource block allocations 304 can be determined by allocating portions of the initial bandwidth availability 301 to subscribers or subscriber devices from the initial subscriber set 302 based upon the subscriber type associated with each of the subscribers and/or subscriber devices in the initial subscriber set 302.

By way of another example, the initial resource block allocations 304 can be generated based upon the initial subscriber characteristics 303, which can include, e.g., subscriber type(s), audio latency limitation(s), audio fidelity/quality requirement(s), and/or the like. Continuing with this example, the initial subscriber characteristics 303 may comprise a subscriber type, a maximal latency value associated with each of the subscribers and/or subscriber devices in the initial subscriber set 302, and a minimal audio fidelity/audio quality value associated with each of the subscribers and/or subscriber devices in the initial subscriber set 302. It is contemplated that, in some instances, the initial subscriber characteristics 303 might include different characteristics for different subscribers or subscriber devices, different types of characteristics for different subscribers or subscriber devices, extraneous characteristics for certain subscribers or subscriber devices, and/or missing characteristics for certain subscribers or subscriber devices from among the initial subscriber set 302.

Additionally or alternatively, initial resource block allocations 304 can be normalized based on the initial subscriber set 302. For example, the initial resource block allocations 304 can be determined in part by removing characteristics from the initial subscriber characteristics 303 for subscribers from the initial subscriber set 302 where the same characteristic is not available or provided in the initial subscriber characteristics 303 for other subscribers of the initial subscriber set 302. The initial resource block allocations 304 can also be determined in part by adding characteristic values to the initial subscriber characteristics 303 for subscribers from the initial subscriber set 302 where the same characteristic is available or provided in the initial subscriber characteristics 303 for other subscribers of the initial subscriber set 302. The initial resource block allocations 304 can be determined in part by prompting a user or operator of the system (e.g., system 200) to provide values for certain missing characteristics from the initial subscriber characteristics 303 for certain subscribers from the initial subscriber set 302 where the same characteristic is available or provided in the initial subscriber characteristics 303 for other subscribers of the initial subscriber set 302.

The initial resource block allocations 304 can be generated by applying weighting value(s) to certain different characteristics from the existing subscriber characteristics 303 in order to allocate spectral resources based upon the initial bandwidth availability 301. Such initial resource block allocations 304 can be further determined based upon a combination of multiple different characteristics from the initial subscriber characteristics 303. For example, the initial subscriber characteristics 303 might include a subscriber type, a maximal latency value, and an estimated time dimension use value for each of the subscribers and/or subscriber devices in the initial subscriber set 302.

In instances in which weighting of different subscriber characteristics, audio channel requirements, or the like are used, a first weighting value might be assigned to the different subscriber types, a second weighting value might be assigned to the maximal latency value, and a third weighting value might be assigned to the estimated time dimension use value. Then, when determining the initial resource block allocations 304, the first, second, and third weighting values can be applied against, respectively, the subscriber type, the maximal latency value, and the estimated time dimension use value from the initial subscriber characteristics 303 to determine a single score for each subscriber and/or subscriber device from the initial subscriber set 302, or to otherwise prioritize spectral resource use by subscribers and/or subscriber devices.

The time dimension can be subdivided into a plurality of sets of periods according to any suitable method or organizational schema—the initial subscriber characteristics 303 might include a mapping of time dimension use by each subscriber or subscriber device from the initial subscriber set 302 and the third weighting value regarding estimated time dimension use value might be used to provide for initial resource block allocations 304 that are applicable for only a portion of the plurality of sets of periods of the time dimension. For example, if a subscriber or subscriber device need not send and/or receive audio payload information during a time period, the generation of the initial resource block allocations 304 during that time period may apply a relatively higher weighting to the estimated time dimension use value.

According to some examples, the initial resource block allocations 304 can be generated by applying application-specific weighting value(s) to certain different characteristics from the initial subscriber characteristics 303 in order for allocation of spectral resources based upon the initial bandwidth availability 301 can be determined based upon a combination of multiple different characteristics from the initial subscriber characteristics 303 and in view of the specific application for which the system (e.g., system 200) is being used.

By way of example only, the initial subscriber characteristics 303 might include a subscriber type, a maximal latency value, and an estimated time dimension use value for each of the subscribers and/or subscriber devices in the initial subscriber set 302, as well as information about the specific application or type of application for which the system is being used. For example, a system might be used in a conference setting, a professional audio setting, a broadcast/newscast setting, a podcast setting, a live sporting event setting, a recording studio setting, or the like, which can be referred to as the application type.

The application type can be used to determine initial resource block allocations 304, alongside the other existing subscriber characteristics 303, especially as a threshold for either ignoring certain other existing subscriber characteristics 303 or decreasing associated weighting values of certain other initial subscriber characteristics 303 when the initial bandwidth availability 301 is low. Continuing with this example, when the application type is a professional audio setting, such as a live musical performance, a first weighting value might be assigned to the different subscriber types, a second weighting value might be assigned to the maximal latency value, and a third weighting value might be assigned to the estimated time dimension use value, and no provision is made for ignoring any of these characteristics or reducing any of the first, second, and/or third weighting values due to the importance of low latency and the importance of high fidelity for certain subscriber types in a professional audio setting.

Alternatively, when the application type is a conference setting in which the importance of low latency and high fidelity is relatively less than for a professional audio setting, such as a live musical performance, a discount value may be applied against the first, second, and/or third weighting values that limits the affect that subscriber type, latency value, or estimated time dimension use value can have on the generation of the initial resource block allocations 304. Then, when determining the initial resource block allocations 304, the first, second, and third weighting values can be applied against, respectively, the subscriber type, the maximal latency value, and the estimated time dimension use value from the initial subscriber characteristics 303, discounted by the application type discount value if appropriate, to determine a single score for each subscriber and/or subscriber device from the initial subscriber set 302, or to otherwise prioritize spectral resource use by subscribers and/or subscriber devices.

In other example systems, the approach can comprise determining individual audio user requirements for the initial subscriber set 302 and determining capacity requirements for each user type, determining initial resource block allocations 304 based on initial bandwidth availability 301 and system capacity using a configuration tool or scheduling engine at time of initiation of the system. If it is determined that additional system capacity is required, more systems can be deployed. In such a system, a system requirement might be that all users must be able to get a channel allocation and have their requirements met.

The initial resource block allocations 304 can be used to generate resource block allocation instructions to user devices of the users in the initial subscriber set 302 and/or the devices in the initial subscriber set 302. The initial resource block allocations 304 can be used to generate a signal or carrier wave that comprises audio payload resource blocks carrying audio payload from an access point or the like to user devices, such as in-ear monitors, speakers, recording equipment, and/or the like. The initial resource block allocations 304 can be communicated to downlink user devices (e.g., in-ear monitoring units, speakers, recording equipment, etc.) and/or uplink user devices (e.g., wireless microphones, wireless instruments, etc.). The initial resource block allocations 304 can be used to update the initial bandwidth availability 301 following the assignment or allocation of spectral resources to the initial subscriber set 302.

This initial resource block allocation 304, once established, is used for transmitting audio payload between an access point or the like and the audio devices associated with the initial subscriber set 302. From time to time, one or more subscribers from the initial subscriber set 302 may discontinue accessing the network, or transmission of audio payload to the one or more subscribers may be discontinued for a variety of reasons. In some cases, the resource block(s) allocated for the one or more leaving subscribers may simply discontinue being scheduled for transmission of audio payload for a period of time. In some instances, the resource block(s) allocated for the one or more leaving subscribers may be re-allocated to other subscribers of the initial subscriber set 302 and the initial resource block allocation 304 may be updated accordingly.

Figure 3B:
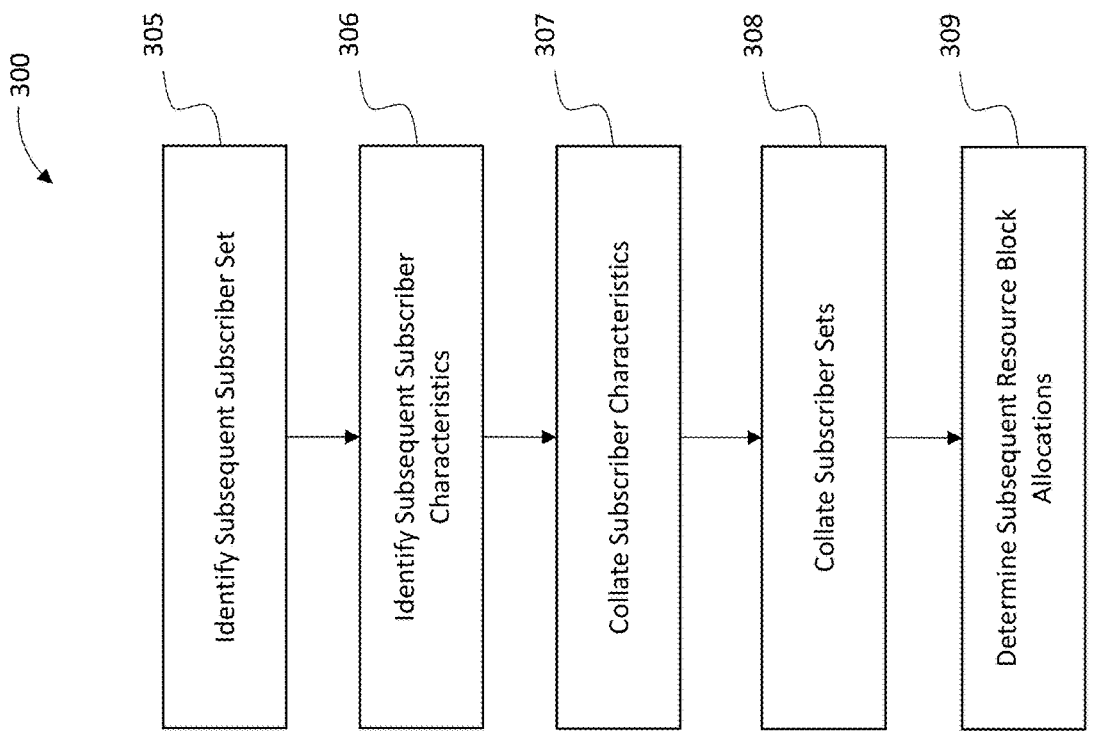
FIG. 3B illustrates an example approach for determining subcarrier allocation in an example audio system, according to embodiments of the present disclosure.

From time to time, one or more new subscribers may be granted access to the network, such that the initial resource block allocations 304 does not include resource block allocations for the new subscribers. In such instances, the initial resource block allocations 304 may be updated, at one or more reallocation points. FIG. 3B illustrates optional subsequent portions of the approach 300 that can be carried out to reconsider allocation of bandwidth for audio channels.

In such instances in which new subscribers are granted access to the system (e.g., 200), a subsequent subscriber set 305 may be identified. The subsequent subscriber set 305 can comprise one or more new users and/or one or more new user devices that have been granted access to the system and for which a resource block allocation has not yet been determined. A resource block allocation engine, or the like, such as described above, can identify subsequent subscriber characteristics 306 associated with the subsequent subscriber set 305. In view of the desired allocation of resource blocks from among the initial bandwidth available 301 to the subsequent subscriber set 305, the initial bandwidth availability 301 may now be outdated. Accordingly, the approach 300 can comprise the collation of subscriber characteristics 307 that include the initial subscriber characteristics 303 of the initial subscriber set 302 as well as the subsequent subscriber characteristics 306 of the subsequent subscriber set 305, minus any subscribers from the initial subscriber set 302 that are being deallocated resource blocks of the initial bandwidth availability 301.

The collated subscriber characteristics 307 can be generated by adding the subsequent subscriber characteristics 306 to the initial subscriber characteristics 303, and removing subscriber characteristics for any deallocated resource blocks. The collated subscriber characteristics 307 can be generated by adding the initial subscriber characteristics 303 to the subsequent subscriber characteristics 306. The collated subscriber characteristics 307 can be generated by combining the initial subscriber characteristics 303 and the subsequent subscriber characteristics 306 to generate a novel set of characteristics as the collated subscriber characteristics 307.

The approach 300 can further comprise collating subscriber sets 308 based upon the initial subscriber set 302 and the subsequent subscriber set 305. The collated subscriber set 308 can be generated by adding the subsequent subscriber set 305 to the initial subscriber set 302, adding the initial subscriber set 302 to the subsequent subscriber set 305, by combining the initial subscriber set 302 and the subsequent subscriber set 305 to generate a novel set of subscribers as the collated subscriber set 308, and/or otherwise combine the subscriber sets.

The approach 300 can further comprise determining subsequent resource block allocations 309. Decision making related to subsequent resource block allocations 309 can be made by one or more of the described algorithms, models, approaches, or processes described above, such as by way of an allocation facilitation engine or the like. The decision making related to the subsequent resource block allocations 309 can completely disregard the initial bandwidth availability 301 and/or the initial resource block allocations 304, and instead generate a completely new allocation scheme based upon the full, unallocated bandwidth available for use, and the collated subscriber set 308.

The decision making related to the subsequent resource block allocations 309 can comprise a modification of the existing resource block allocations 304 based upon whether the initial bandwidth availability 301 indicates that sufficient resources are available to expansively allocate the subsequent subscriber set 305 alongside the initial subscriber set 302 in the available resource blocks in the frequency dimension—which might be termed an expansive allocation approach.

The decision making related to the subsequent resource block allocations 309 can comprise a modification of the initial resource block allocations 304 based upon subscriber/subscriber device-wise comparisons of collated subscriber characteristics 307 against the initial bandwidth availability 301—which might be termed a reorganizational allocation approach. The decision making related to the subsequent resource block allocations 309 can comprise a multi-stage analysis of certain characteristics from the collated subscriber characteristics 307 for each of the collated subscriber set 308 in which certain characteristics (e.g., maximal latency value) are initially solely considered for allocating those subscribers/subscriber devices having the relatively lowest maximal latency values to dedicated resource blocks in the frequency dimension or across multiple resource blocks in the frequency dimension. Then, certain other characteristics (e.g., device type or estimated time dimension use value) can be subsequently considered for allocating the remaining subscribers/subscriber devices having relatively higher maximal latency values to remaining resources from among the resources indicated in the initial bandwidth availability 301.

The decision making related to subsequent resource block allocations 309 can comprise a threshold or binary decision making step in which the means, such as the processor and memory storing instructions (e.g., as program code), can remove subscribers and/or subscriber devices from the collated subscriber set 308 based upon resource limitations identified from the initial bandwidth availability 301. The decision making related to subsequent resource block allocations 309 can comprise an inclusive approach in which, even when the collated subscriber set 308 would require more spectral resources than those indicated as being available in the initial bandwidth availability 301 while maintaining or achieving the audio latency/quality requirements indicated by the collated subscriber characteristics 307, certain or all of the collated subscriber characteristics 307 can be deprioritized, a discount value can be applied against certain or all of the collated subscriber characteristics 307, certain of the collated subscriber characteristics 307 can be used to determine that one or more characteristics for one or more of the collated subscriber characteristics 307 for one or more of the collated subscriber set 308 will not be met in order to maintain or achieve the same characteristics for one or more others of the collated subscriber set 308, etc.

Said otherwise, in an instance in which maintaining or achieving the latency/fidelity/quality requirements from the collated subscriber characteristics 307 for all of the collated subscriber set 308 would require more resource blocks in the frequency dimension than are available, the means, e.g., processor and memory storing program instructions, can determine that certain subscriber types or all subscribers/ subscriber devices having a maximal latency value below a particular threshold will be preferentially allocated resources from among the initial bandwidth availability 301, while remaining subscribers/subscriber devices of other subscriber types or having a maximal latency value at or above the particular threshold will be allocated remaining resources with less or no regard for the collated subscriber characteristics 307 associated with the remaining subscribers/subscriber devices. According to an example, where the collated subscriber set 308, in order to satisfy or accommodate all of the collated subscriber characteristics 307, would require more spectrum in each time period than is available according to the initial bandwidth availability 301, a computing device, e.g., a device comprising a processor and a memory storing program instructions, can preferentially allocate audio channels for a professional musician or vocalist, for example, across more resource blocks in the frequency dimension, and allocate audio channels for subscribers having less or no latency/quality requirements (e.g., lighting crew, security, etc.), to less resource blocks in the frequency dimension and/or condensed within the same resource blocks in the frequency dimension and allocated out across more symbol periods of the time dimension.

Other aspects, characteristics, requirements, attributes, or configurations can be considered in addition to or alternatively to those described above when means, such as a processor and memory storing instructions as program code, are making audio channel allocation decisions. For example, other such considerations may include but are not limited to a required uplink/downlink transmission ratio of each subscriber/subscriber device, transmission power requirements for each subscriber/subscriber device, bit rate requirements, bit error rate limitations, modulation and coding scheme suitability, frame flexibility, symbol density requirements, distance from access point, over-the-air interference, frequency diversity requirements, total number of audio channels, number of audio devices connected to or associated with a transceiver, averaged or summed latency or quality requirements for nested audio device flows, sensitivity of devices to timing and frequency errors, use of cyclic prefixes, use of guard periods and/or guard intervals, overhead channel use, resource quantization used, sparsity of pilot subcarriers/pilot resource blocks, susceptibility to channel fading/channel interference, need for bi-directionality, other similar considerations, combinations thereof, and/or the like.

When the subsequent resource block allocations 309 cause allocation of additional spectral resources but do not result in a complete allocation of all spectral resources relative to the initial bandwidth availability 301, a computing device (e.g., a device comprising a processor and a memory storing instructions (e.g., as program code) can generate a mapping of updated or subsequent bandwidth availability either as a subsequent mapping of available bandwidth or by revising or updating the initial bandwidth availability 301. Such a subsequent bandwidth availability mapping can then be provided during subsequent decision making as additional subscribers/subscriber devices are added or removed from the network.

While audio channels can be added or removed from audio payload scheduling in at least a somewhat dynamic manner, subcarrier allocation and resource block scheduling can additionally or alternatively be carried out once upon initialization of the system 200 or iteratively as needed during a discrete instance of use of the system 200. In such an example system, a similar approach to the approach 300, including steps 301-304 from FIG. 3A, can be carried out during any discrete use of the system 200, without carrying out any of the optional portions of the approach 300 illustrated in FIG. 3B.

Figure 4:
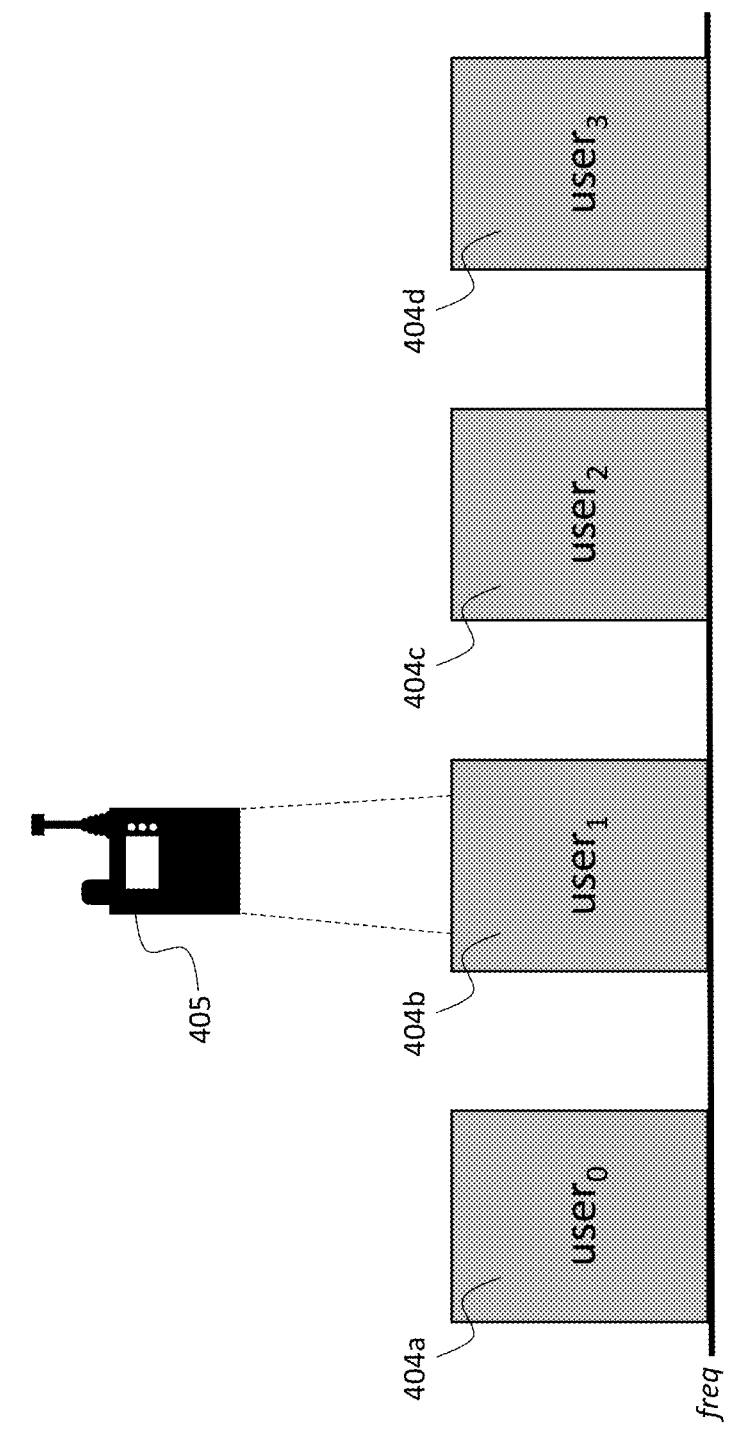
FIG. 4 illustrates an example allocation of subcarriers in a frequency dimension of a carrier wave, according to an embodiment of the present disclosure.

Referring now to FIG. 4, one possible allocation of audio channels is illustrated for a system 400 comprising plural users (user$_0$, user$_1$, user$_2$, and user$_3$ associated with respective audio devices 404$a,b,c,d$) to respective subcarriers within the frequency dimension of the carrier wave. An audio system can include a wireless transceiver 405 configured to transmit a signal or carrier wave to the respective audio devices 404$a,b,c,d$. The audio monitoring system 400 using such an allocation of audio channels may involve signals for individual subscribers being spaced in the frequency dimension to avoid interference from adjacent users. Sometimes, non-orthogonal allocation approaches that allocate for static narrowband audio channels across the frequency dimension without allocating audio channels in a diverse manner across the time dimension, such as the non-orthogonal allocation approach illustrated in FIG. 4, typically use spectral resources relatively inefficiently, meaning that the payload audio carried on the carrier wave per unit of the time dimension is low because of a relatively large subcarrier spacing, the lack of audio channel allocation to different resource blocks of a radio frame, the lack of audio channel diversity across the time dimension, and other reasons. Non-orthogonal wideband systems often require an arbitrary allocation of fixed bandwidth frequency resources to users. As such, non-orthogonal approaches can include a collection of narrowband links that are separated by guard bands in order to manage for interference. Accordingly, in such systems, the required spectral resources increases with the number of connected audio devices.

Figure 5:
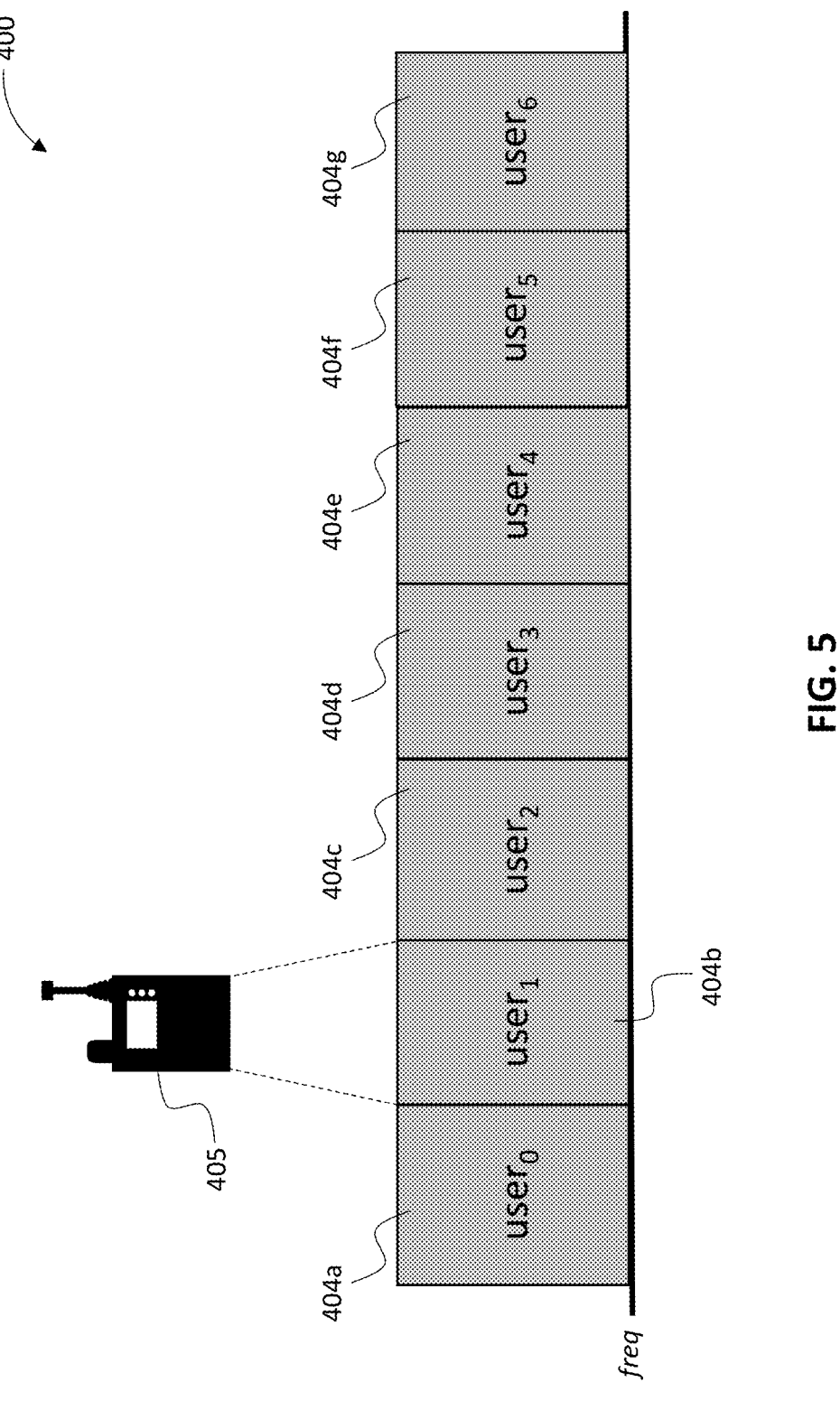
FIG. 5 illustrates an example allocation of subcarriers in a frequency dimension of a carrier wave, according to an embodiment of the present disclosure.

FIG. 5 illustrates an embodiment of the system 400 comprising plural users (user$_0$, user$_1$ user$_2$, user$_3$, user$_4$, user$_5$, user$_6$, associated with the respective audio devices 404$a,b,c,d,e,f,g$) in which audio channels are allocated orthogonally across resource blocks in the frequency dimension. As illustrated, the spectrum is subdivided into a number of subcarriers that are orthogonal to one or more other subcarriers in the frequency dimension, each subcarrier carrying audio payload for one or more users. Subcarriers can be modulated independently, for each of a series of symbols carried in each resource element of the subcarrier. Without wishing to be bound by any particular theory, because the subcarriers are orthogonal in the frequency dimension and overhead is minimized across symbols in the time dimension, a transceiver (e.g., 204$a$) that is time and frequency synchronized to an access point (e.g., 205) can recover the modulated audio payload data that are in a particular subcarriers associated with that particular transceiver such that subcarriers in adjacent subcarriers do not interfere with each other, by avoiding inter-subcarrier interference and subcarrier intermodulation.

In the allocation approach shown, a larger number of audio channels may be accommodated on the same portion of the spectrum than when guard bands are required between audio channels. Among other benefits of this audio channel allocation approach, the system 400 is user scalable, with improved spectral efficiency, achieves a low latency relative to other digital audio monitoring systems, is resilient to system interference and intermodulation between audio channels, and reduces external hardware (rack gear) for combining transmissions to achieve user-customized stereo audio mixtures by implementing internal digital combining.

Thus far, the frequency dimension of the carrier wave has been primarily discussed. Additionally or alternatively, spectral resources for audio systems may be allocated across both the frequency dimension and the time dimension. When receivers are allocated to a particular frequency range of the signal with spacing therebetween to avoid inter-channel interference, this spacing can lead to inefficient spectrum use and a system that is not sufficiently user scalable in light of diminishing available spectrum.

Figure 6:
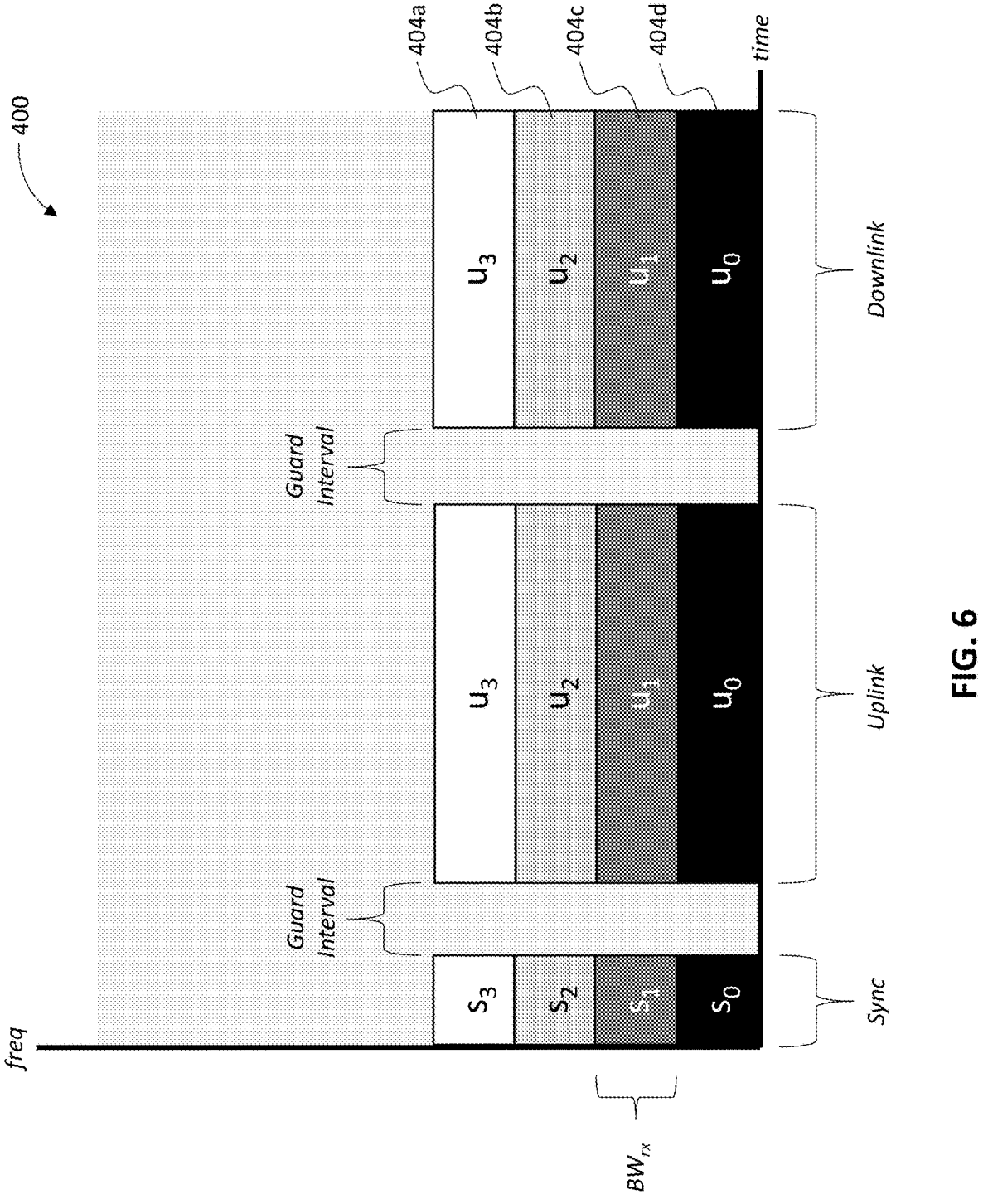
FIG. 6 illustrates an example allocation of subcarriers in a frequency dimension and a time dimension of a carrier wave for bi-directional audio transmission, according to an embodiment of the present disclosure.

FIG. 6 illustrates an example approach for subcarrier allocation in the frequency dimension of a carrier wave in the system 400 in which a portion of the available spectrum may be used for carrying other information besides the audio payload. While audio payload subcarriers may remain allocated to the same portion of the frequency dimension, the time dimension may be apportioned to various other information, to guard intervals, or the like.

For example, during a first portion of the time dimension, synchronization information, demodulation information, and/or the like may be transmitted in the portion of the frequency dimension allocated to $u_1$, for example. Then, in a second portion of the time dimension subsequent the first portion, the audio payload for user $u_1$ can be carried in the portion of the frequency dimension of the carrier wave allocated to $u_1$, for example, followed by a third portion of the time dimension subsequent the second portion in which further synchronization or demodulation information may be provided in the portion of the frequency dimension allocated to $u_1$.

An example audio channel allocation approach for the system 400 is shown in which an audio channel comprising uplink direction payload and downlink direction payload allocated across the frequency dimension and across the time dimension. Uplink direction payload may be transmitted in the same subcarrier(s) as downlink direction payload, with a guard interval between in the time dimension. Said otherwise, during a first portion of the symbols in the time dimension, the subcarrier may be used for downlink direction audio transmission between a soundboard transceiver and a transceiver worn by the user, e.g., to provide a stereo audio mix for playback to the user by one or more audio devices (e.g., IEMs). Then, during a subsequent portion of the symbols in the time dimension, the same subcarrier may be used for uplink direction audio transmission between a transceiver worn by the user and an access point or a centralized transceiver, e.g., to provide audio captured by the user's wireless microphone. However, when allocating audio channels to orthogonal subcarriers in the frequency dimension, it can be important that the stereo audio mix for playback can be transmitted, received, and demodulated without significant interference, noise, or uncorrected signal deformation. Likewise, when receiving uplink direction audio from a user's microphone at the access point or soundboard transceiver, for example, it is also important to correct for or avoid interference, noise, and uncorrected signal deformation.

The time dimension can be subdivided to accommodate synchronization between transmitter and transceiver and to leave guard periods where needed in the time dimension. By subdividing the time dimension and allowing for downlink synchronization subcarriers to be transmitted, followed by a guard period, followed by an uplink subcarrier or uplink set of subcarriers, and so on, the bi-directional approach may be carried out without introducing noise from direction switching in the time dimension and without requiring uplink direction payload to be carried in a separate subcarrier from downlink direction payload.

The frequency dimension can be subdivided into plural resource blocks comprising resource elements that form one or more subcarriers having a bandwidth BW, less than a total bandwidth of the total carrier wave or signal. The time dimension of the carrier wave or signal can be subdivided to accommodate synchronization between transmitter and transceiver in the downlink direction, to leave guard intervals where needed in the time dimension, and to accommodate one or both of uplink direction audio payload or downlink direction audio payload in the same subcarriers.

For example, the bi-directional approach may comprise subdividing the time dimension and allowing for downlink synchronization symbols to be transmitted. The downlink synchronization symbols can be followed subsequently in the time dimension by a guard period. The guard period can be followed subsequently in the time dimension by an uplink symbol or uplink set of symbols. The uplink symbol or uplink set of symbols can be followed subsequently in the time dimension of the subcarrier by further synchronization symbols. The further synchronization symbols can be followed subsequently in the time dimension of the subcarrier by symbols carrying uplink audio payload. The described approach may continue in the same or similar manner iteratively and according to the allocation or payload scheduling approach dictated by, for example, a scheduler function.

Figures 7A, 7B, 7C:
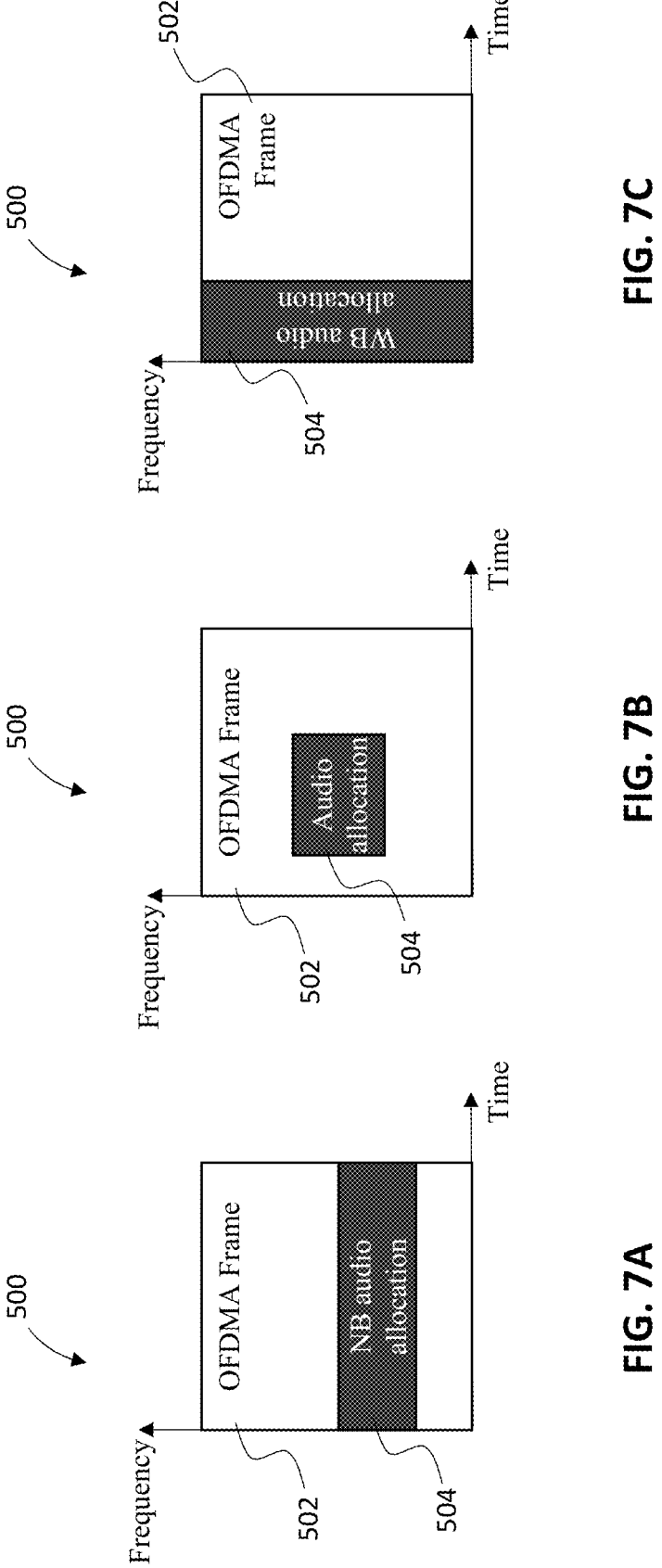
FIG. 7A illustrates an example allocation of a subcarrier in a frequency dimension and a time dimension of a carrier wave using an orthogonal frequency division multiple access (OFDMA) frame structure and narrowband (NB) audio allocation, according to an embodiment of the present disclosure.
FIG. 7B illustrates an example allocation of a subcarrier in a frequency dimension and a time dimension of a carrier wave using an orthogonal frequency division multiple access (OFDMA) frame structure, according to an embodiment of the present disclosure.
FIG. 7C illustrates an example allocation of a subcarrier in a frequency dimension and a time dimension of a carrier wave using an orthogonal frequency division multiple access (OFDMA) frame structure and wideband (WB) audio allocation, according to an embodiment of the present disclosure.

FIGS. 7A-7C provide for a simplified illustration of various allocation approaches for an audio channel within the time and frequency dimensions of the carrier wave/ signal. Illustrated is a frame structure 500. In the allocation approaches and frame architectures of FIGS. 7A-7C, the frame structure 500 of the signal/carrier wave may comprise a two-dimensional grid of frequency dimension modulation symbols, e.g., OFDMA symbols. The frame structure 500 may be divided into resource blocks comprising resource elements, which may be defined by regular subdivisions of the bandwidth of the frequency dimension occupied by the frame structure 500 and regular portions of the period of the time dimension occupied by the frame structure 500. The frame structure 500 can be divided into a downlink portion 502 and an uplink portion 504. A resource block may comprise a plurality of resource elements, defined as one symbol length of the time dimension by one subcarrier of the frequency dimension. Audio payload, a pilot tone, synchronization information, and/or the like, can be carried in symbol periods of an allocated subcarrier, comprising an audio channel allocated with the associated subscriber or audio device. A resource element may also be empty and may act, at least in part, as a guard interval across the time dimension or as a part of guard subcarriers across the frequency dimension.

A plurality of audio payload symbols across one or more subcarriers in the uplink portion 504 can be allocated to a subscriber or audio device to form an audio allocation. Symbols, such as OFDMA symbols, can be used to segment the frequency dimension into one or more subframes. Audio payload being transmitted with the same OFDMA symbol may indicate a mapping of subframes of the carrier wave to the same audio channel. OFDMA symbols, or the like, may be used to signal to audio devices the subscriber associated with the audio channel. The audio channel mapping approach used for allocating audio payload to resource blocks within a subframe of the signal/carrier wave may have an impact on the latency, audio fidelity, signaling complexity, overhead, transmission efficiency, transmission power required, and/or the like.

For example, in FIG. 7A, each portion 502, 504 of the frame structure 500 may be allocated to a narrowband of the frequency dimension and statically allocated across the time dimension to this same narrowband portion of the frequency dimension. The narrowband allocation approach may be beneficial in certain implementations because, e.g., legacy transceivers can be used. The narrowband allocation approach can be scalable in some implementations because the addition of new audio devices to the network may increase the required bandwidth in per-user increments. Audio devices that do not require high fidelity or low latency audio will often receive high fidelity, low latency audio since different portions of the time dimension within each resource block in the frequency dimension are not allocated to different audio channels for different audio devices. Additionally or alternatively, narrowband allocations can lead to increased latency as compared to wideband because audio packets are transmitted over a longer duration.

In FIG. 7B, the uplink portion 504 can be allocated to several different subcarriers of the frame structure 500 across the portion of the frequency dimension occupied by the frame and several different subcarriers of the frame across the portion of the time dimension occupied by the frame. The frame structure 500, such as an OFDMA frame, can include multiple audio channels as uplink portion 504 allocated to different subcarriers in the frame structure 500.

The subcarriers to which the audio channel in the uplink portion 504 is allocated can be aggregated to one or more adjacent resource units of the frame structure 500, e.g., resource units in adjacent periods of the time dimension and/or adjacent resource blocks in the frequency dimension. The subcarriers to which the audio channel is allocated can be at least partially dispersed between resource blocks that are not adjacent to other resource blocks of the audio channel in the frequency dimension and not adjacent to other resource blocks of the audio channel in the time dimension. Additionally or alternatively, resource elements in the frame can be allocated adjacent to or orthogonal to resource blocks in the frequency dimension that are part of the same audio channel.

Subcarriers mapped to the audio channel in the uplink portion 504 in different resource blocks in the frequency dimension may be adjacent or orthogonal to each other in the frequency dimension. Subcarriers mapped to the audio channel in the uplink portion 504 in different periods of the time dimension may be adjacent or orthogonal to each other in the time dimension. At least some of the subcarriers mapped to the audio channel in different resource blocks in the frequency dimension may be non-adjacent or non-orthogonal to other subcarriers in other resource blocks in the frequency dimension. At least some of the subcarriers mapped to the audio channel in different periods of the time dimension may be non-adjacent or non-orthogonal to other subscribers in other periods of the time dimension. Frame resources can be allocated in arbitrary shapes and/or sizes to meet bit rate requirements and manage trade-offs between frequency diversity, transmission power, and latency, among other aspects and characteristics. Relative to the allocation approach in FIG. 7A, the allocation approach in FIG. 7B may exhibit increased frequency diversity gain, increasing transmission power during "on" times for a constant signal-to-noise ratio, and decreased latency.

In FIG. 7C, audio channels in the uplink portion 504 may be allocated to many, most, or all of the available subcarriers across the frequency dimension of the frame structure 500, but only within a single period of the time dimension within the frame structure 500. The frame structure 500, such as an OFDMA frame, can include multiple audio channels in the downlink portion 502 or the uplink portion 504 allocated to different subcarriers in the frame structure 500. The subcarriers to which the audio channel is allocated can be aggregated to one or more adjacent resource units of the frame structure 500, e.g., resource units in adjacent periods of the time dimension and/or resource units in adjacent resource blocks in the frequency dimension. The subcarriers to which the audio channel is allocated can be at least partially dispersed between resource units that are not adjacent to other subcarriers of the audio channel in the frequency dimension and not adjacent to other subcarriers of the audio channel in the time dimension.

Subcarriers mapped to the audio channel in different resource blocks in the frequency dimension may be adjacent in the frequency dimension. At least some of the subcarriers mapped to the audio channel in different resource blocks in the frequency dimension may be non-adjacent to other subcarriers in other resource blocks in the frequency dimension. Frame resources can be allocated in arbitrary shapes and/or sizes to meet bit rate requirements and manage trade-offs between frequency diversity, transmission power, and latency, among other aspects and characteristics. Relative to the allocation approach in FIG. 7B, the allocation approach in FIG. 7C may exhibit increased frequency diversity gain, increasing transmission power during "on" times for a constant signal-to-noise ratio, and decreased latency.

Figure 8:
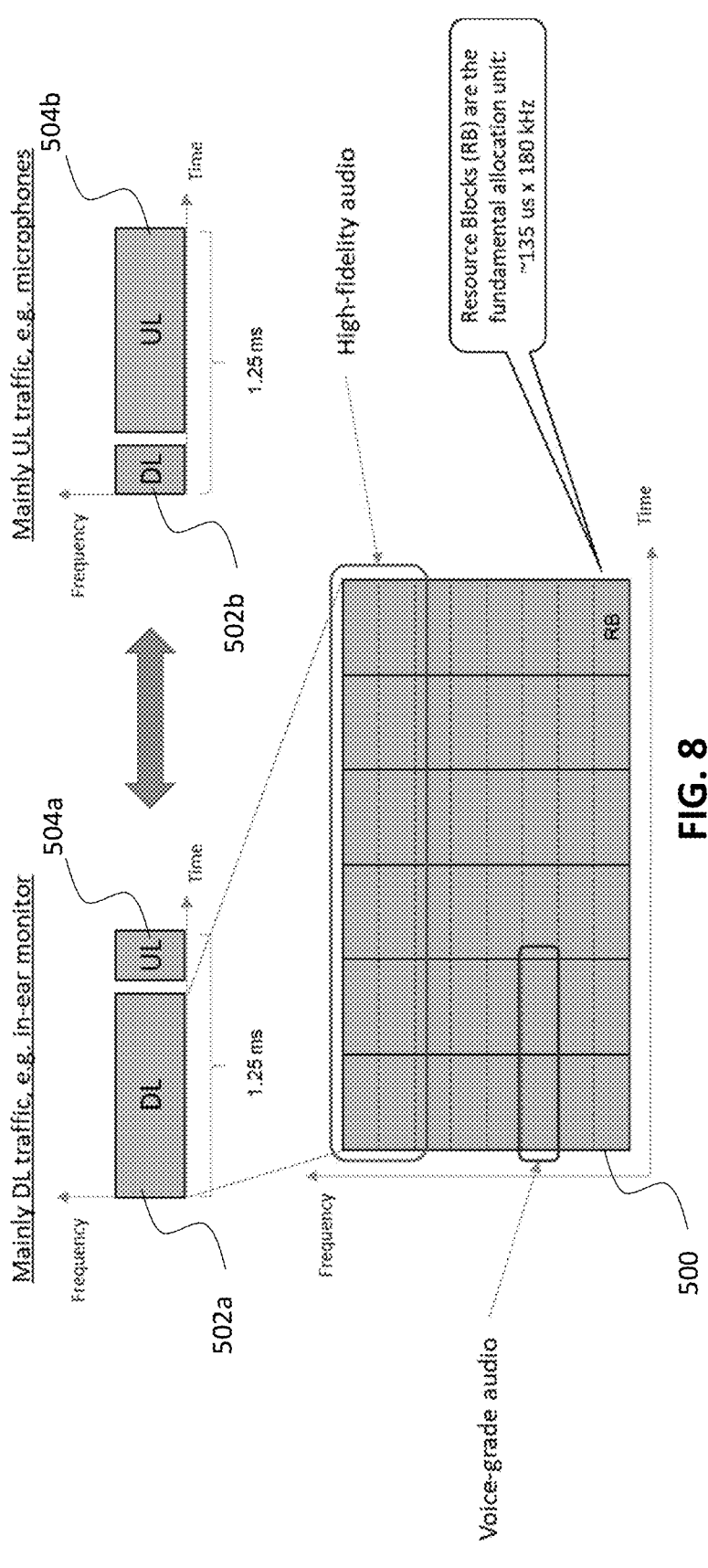
FIG. 8 illustrates an example allocation of resource blocks of a frequency dimension and a time dimension of a carrier wave using a frame structure that is flexibly allocatable for uplink and downlink transmissions and can adaptively accommodate different fidelity and latency requirements, according to an embodiment of the present disclosure.

FIG. 8 illustrates an example of the frame structure 500 that is uplink/downlink flexible. As illustrated in FIG. 8, the frame structure 500 occupies a bandwidth of the frequency dimension across periods of the time dimension. The frame can comprise a portion of an audio channel. The frame structure 500 and/or the audio channel can be sub-divided into resource blocks.

The channel can be subdivided into subcarriers using inverse fast Fourier transform (IFFT). For a channel comprising a number of subcarriers (e.g., 64 subcarriers), the majority of the subcarriers will contain modulated audio data, several of the subcarriers will act as pilots or pilot carriers, and several of the subcarriers will be left open as guard bands/intervals. Subcarrier spacing is the reciprocal of useful symbol duration. The symbol duration can be between about two (2) μs and about 20 μs, including all values therebetween and all subranges therebetween. The frame structure 500 can be used in TDD mode or downlink only (e.g., digital PSM), for example. A sampling frequency in TDD mode may be between about one (1) MHz and about 30 MHz, inclusive of all values and ranges therebetween. A plurality of symbols, such as OFDMA symbols, can be provided in each slot, such as two (2) symbols, four (4) symbols, or more. Elements of the frame structure 500, audio channel, resource block, or subcarrier may include, initially, a cyclic prefix that can indicate or map subsequent uplink/downlink transmission scheduling in the subcarrier(s).

A TDD frame can be configured to be split between uplink and downlink subframes. The TDD frame can be uplink/downlink flexible, meaning that the TDD frame can comprise a larger portion of the frame duration for one of uplink or downlink direction transmissions/payload. For example, as illustrated in FIG. 8, for a high-fidelity audio application that primarily requires downlink directional data traffic, the frame structure 500 can be configured to have a larger downlink portion 502 and a relatively smaller uplink portion 504. An example of such a high-fidelity audio application in which the frame having the larger downlink portion 502 than uplink portion 504 is used is for speakers, audio playback devices, recording devices, in-ear monitoring devices, and/or the like.

Alternatively, for audio applications in which primarily uplink direction data traffic is transmitted, such as wireless microphones, the frame structure 500 can have a larger uplink portion 504 and a relatively smaller downlink portion 502. A signal/carrier wave can comprise an arbitrary mix of uplink and downlink directional traffic. An arbitrary mix of uplink and downlink directional traffic can be accomplished by adjusting the ratio and/or spacing of different frames that are fixed or substantially fixed in terms of the frame portion allocated for uplink versus downlink directional traffic. The arbitrary mix of uplink and downlink directional traffic can be accomplished by adjusting the flexible frame structure to accommodate more uplink directional traffic or more downlink directional traffic in each frame. The arbitrary mix of uplink and downlink direction traffic can be accomplished by adjusting the rate, duration, and density of uplink frames versus downlink frames, as well as by adjusting the flexible frame structure to accommodate more uplink directional data or downlink direction data for the arbitrary mix of uplink/downlink traffic.

The size of allocation of resource blocks in a frame to downlink versus uplink traffic may be a function of audio bit rate requirements, modulation and coding scheme (MCS), and/or the like. The audio quality may be a function of resource allocation, such as the number of resource blocks mapped to an audio channel for a particular audio device. For example, as illustrated in FIG. 8, a frame comprising a larger number of resource blocks may be configured to transmit higher-fidelity audio whereas a frame comprising a smaller number of resource blocks may be configured to transmit voice-grade audio.

The use of flexible uplink/downlink TDD frames can lead to latency issues, increase scheduling complexity, and increased computational complexity relative to controlling frame structure and upstream/downstream scheduling. In many instances, it may still be beneficial to use uplink/downlink flexible TDD frames, even though there is a trade-off between complexity/latency and uplink/downlink flexibility. However, the use of a wideband audio channel with subcarriers allocated to subframes of a bi-direction radio frame is an alternative frame structure that can be used in many embodiments. Additionally or alternatively, the uplink/downlink frame split for TDD frames can be static and defined at configuration time.

Figures 9, 10:
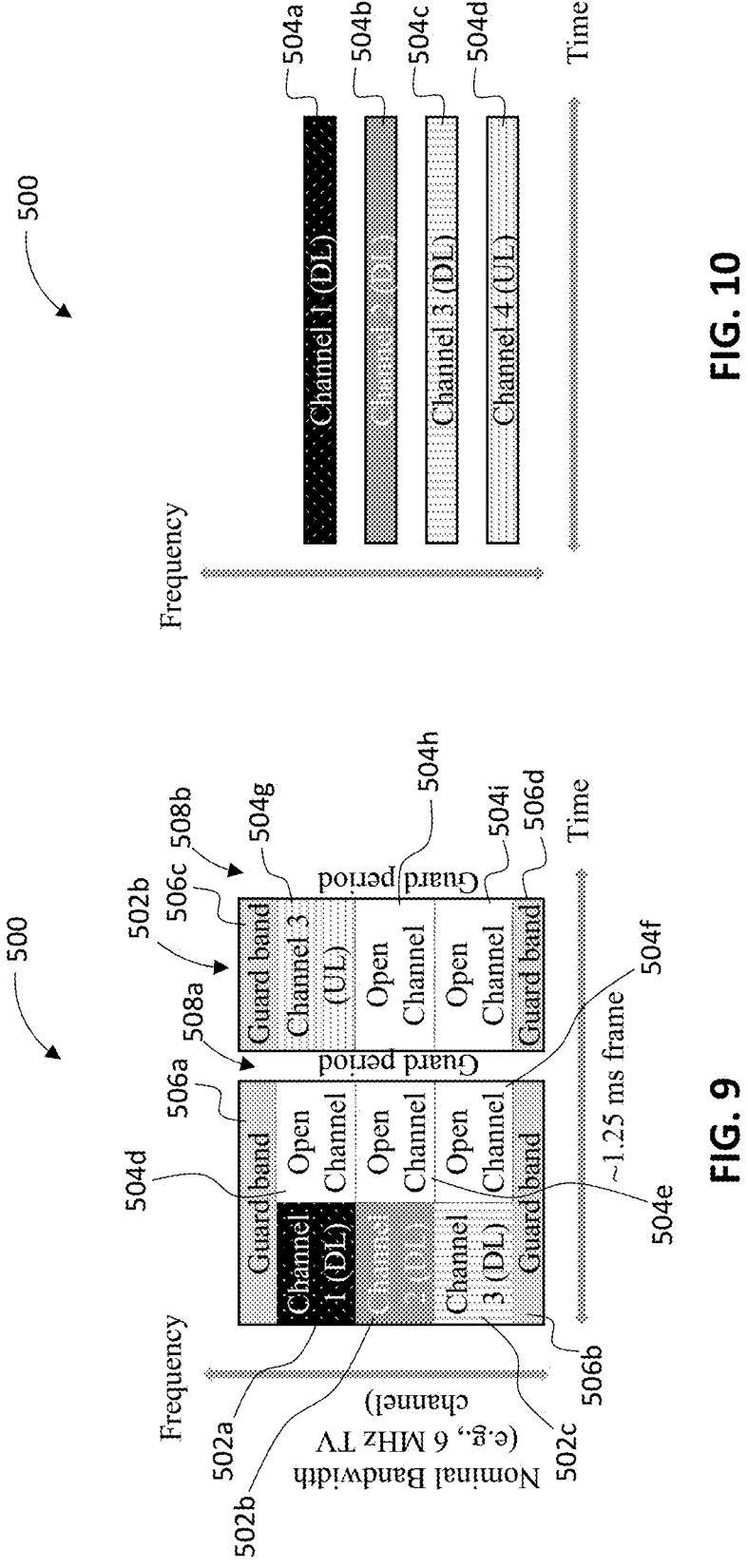
FIG. 9 illustrates an example frame structure for orthogonal allocation of different audio channels to a same portion of a frequency dimension and a same portion of a time dimension in a carrier wave, according to an embodiment of the present disclosure.
FIG. 10 illustrates an example allocation of subcarriers for different audio channels across different portions of a frequency dimension in the same portion of a time dimension of a carrier wave to accommodate uplink and downlink transmissions, according to an embodiment of the present disclosure.

FIG. 9 illustrates an example of the frame structure 500 (e.g., single wideband frame structure) for WMAS that allows for bi-directional audio without increasing the latency due to an increased need for scheduling, increased signaling regarding frame structure specifics, and the like. Illustrated in FIG. 9 is an approach for how orthogonal allocations may allow for tighter packing and increase spectral efficiency. As illustrated in FIG. 9, the frame structure 500 can provide for the grouping together of multiple downlink (DL) channels and the grouping together of multiple uplink (UL) channels. A frame can comprise a number of downlink portions 502a,b,c,d,e,f configured to carry audio payload subcarriers in the downlink direction and a number of uplink portions 504g,h,i configured to carry audio payload subcarriers in the uplink direction.

One or more of the downlink portions 502a,b,c,d,e,f and/or one or more of the uplink portions 504g,h,i may be open, meaning that no audio payload or other payload is being transmitted in that slot. When the channel allocations are truly orthogonal in each portion of the bi-directional frame structure, the audio payload subcarriers may be more tightly packed across the time and frequency dimensions. This can decrease latency, increase fidelity, and/or increase spectral efficiency. Such effects in terms of latency and fidelity may be incidental with regard to the orthogonality, with other aspects such as spectral efficiency and tighter packing being the desired outcome, however the described specific frame architecture and orthogonality of subcarriers and resource blocks may impact fidelity and/or latency nevertheless. The access point may comprise or act as a master clock while each audio device connected to the network can comprise or act as a slave clock to the master clock. System timing and frequency alignment or synchronization of the signal/carrier wave may be important to realize the effective latency decrease, fidelity increase, and spectral efficiency increase from using a frame structure such as that illustrated in FIG. 9.

Depending on the application, the modulation and coding scheme used, and scale of the system, among other aspects, the audio channel capacity achieved using the frame structure and flexible allocation approach described above and illustrated in FIG. 9 can achieve a range of audio channel densities, which may be dependent on the specific audio bit rate, physical range, MCS, frame structure, and other considerations. An OFDMA system can achieve a capacity of between about three (3) audio channels per MHz and 20 audio channels, or more than 20 audio channels per MHz, depending on the audio bit rate and MCS.

According to another example, a discussion system, such as for a delegate conference or the like, was able to reduce spectrum use per channel from about 20 MHz bandwidth to about five (5) MHz bandwidth by implementing a frame structure and audio channel allocation approach such as that illustrated in FIG. 10, and can achieve an audio capacity of between about 15 combined audio channels and about 50 combined audio channels for microphones, translation audio, etc. The audio capacity can depend upon at least the control channel latency (e.g., 20 ms, 40 ms, 80 ms, etc.).

FIG. 10 illustrates another example allocation approach in which narrowband channels are used, each narrowband channel being statically allocated to an audio device and designed as being for only uplink data transfer or only downlink data transfer. In order to avoid narrowband interference and channel fading between the different narrowband channels, each channel can be spaced in the frequency dimension. Based at least upon the spacing in frequency dimension of the various narrowband channels, and because multiple channels cannot be closely packed in frequency, the allocation approach of FIG. 10 is less spectrally efficient than the allocation approach facilitated by the frame structure illustrated in FIG. 9.

Figures 11A, 11B, 11C:
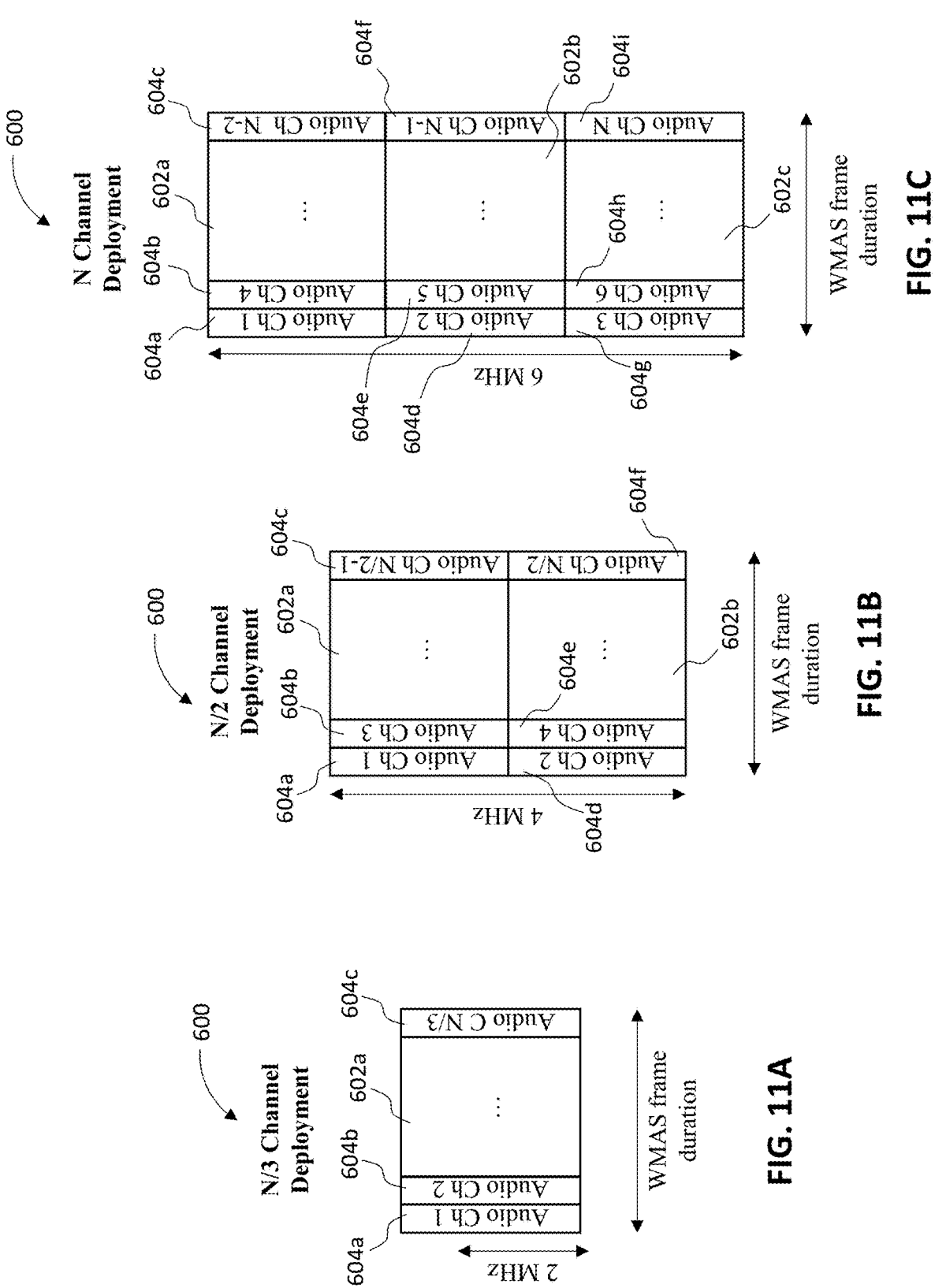
FIG. 11A illustrates an example audio channel allocation for an N/3 channel deployment scenario in which N/3 audio channels can be transmitted within the same frame during the same 2 MHz resource block and during the same frame duration without sacrificing one or more audio characteristic requirements, according to an embodiment of the present disclosure.
FIG. 11B illustrates an example audio channel allocation for an N/2 channel deployment scenario in which N/2 audio channels are transmitted within two frames positioned orthogonally within the frequency dimension during the same frame duration in order to achieve one or more audio characteristic requirements, according to an embodiment of the present disclosure.
FIG. 11C illustrates an example audio channel allocation for an N channel deployment scenario in which N audio channels are transmitted within three frames positioned orthogonally within the frequency dimension during the same frame duration in order to achieve one or more audio characteristic requirements, according to an embodiment of the present disclosure.

FIGS. 11A-11C illustrate an approach for scaling up a WMAS system (e.g., system 200) using frame structure 600. As illustrated, allocation of audio channels to resource blocks in the frequency dimension across a single frame duration of the time dimension can be optimized by packing multiple audio channels 604a,b,c,d,e,f,g,h,i into one or more radio frames 602a,b,c. The bandwidth of WMAS deployments can scale with required channel capacity and available bandwidth. Spectral efficiency may be preserved for smaller deployments.

For example, FIG. 11A illustrates an example of a smaller deployment of the frame structure 600, which in this case is an N/3 deployment, where N is the total audio channel capacity of the system based upon current audio quality/latency requirements of connected audio devices and current bandwidth availability. As illustrated, audio channel 1, audio channel 2, . . . and audio channel N/3 are packed into a frame duration (e.g., about 1.25 ms) over a particular frame bandwidth (e.g., about 2 MHz). By packing audio channels for different audio devices into a same frame 602a, the system can be scaled up from one audio channel to N/3 audio channels without needing to use additional bandwidth or discontinuing use of a portion of the bandwidth. Instead, when scaling up the system, because the frame duration is known to result in an acceptable latency, N/3 audio channels can be communicated per frame duration without needing to add additional bandwidth and without reducing audio quality/fidelity or increasing audio latency.

In FIG. 11B, the example frame structure 600 is illustrated as being scaled up to N/2 of the audio capacity, which includes adjacent frames transmitting audio channels 1, 2, 3, 4, . . . N/2−1, and N/2. In FIG. 11C, the example frame structure 600 is further illustrated as being scaled up to the audio capacity (N), which includes adjacent frames 602a,b carrying audio channels 1, 2, 3, 4, 5, 6, . . . N−2, N−1, and N (e.g., 604a,b,c,d,e,f). Organization, allocation, and/or scheduling of audio channels between audio frames/resource blocks in the frequency dimension can include a consideration of whether the audio channel can be persistently allocated to an associated audio device. For example, the frame structure 600 can have N/2 audio channels that comprise, for example, about half persistent audio channel allocations (e.g., for security, crew, sound booth, etc.) while the other half are impersistent audio channel allocations (e.g., for audio devices associated with presenters, musicians, etc. that will be deregistered from the system in the near term). In the frame structure 600, the persistently or more persistently allocated audio channels can be mapped to a single resource block in the audio frame (e.g., 602a). Then, if/when enough impersistent audio channels are deallocated and enough impersistent audio devices are deregistered from the system, use of one of the two resource blocks in the frequency dimension can be discontinued. Such discontinuing of use of a sub-band may be carried out without having to change the allocation of persistently allocated audio channels to consolidate those audio channels to one or more remaining resource blocks in the frequency dimension.

According to some examples, an audio system, such as a wideband multi-user audio system (WMAS) may use a persistent scheduler. A user device, once registered or otherwise attached to the access point, may receive a channel resource allocation that remains valid as long as the audio device is attached to the system. The WMAS may support a small set of audio bit rates and modulation and coding scheme levels that are defined at configuration time based on the use case, available bandwidth, number of devices, audio quality requirements, or combinations thereof.

The WMAS may support a mixture of audio classes. The different audio classes may comprise, for example, high-fidelity channels, voice channels, control channels, intercom channels, IFB channels, wireless microphone channels, in-ear monitor channels, and/or the like. Each audio class may be assigned a value, such as an audio quality value or the like. The value may be used by the scheduler to determine prioritization of available spectral resources to audio devices for which their associated audio class value indicates that higher quality/fidelity and/or lower latency audio is required, either in the uplink and/or downlink direction.

Figure 12:
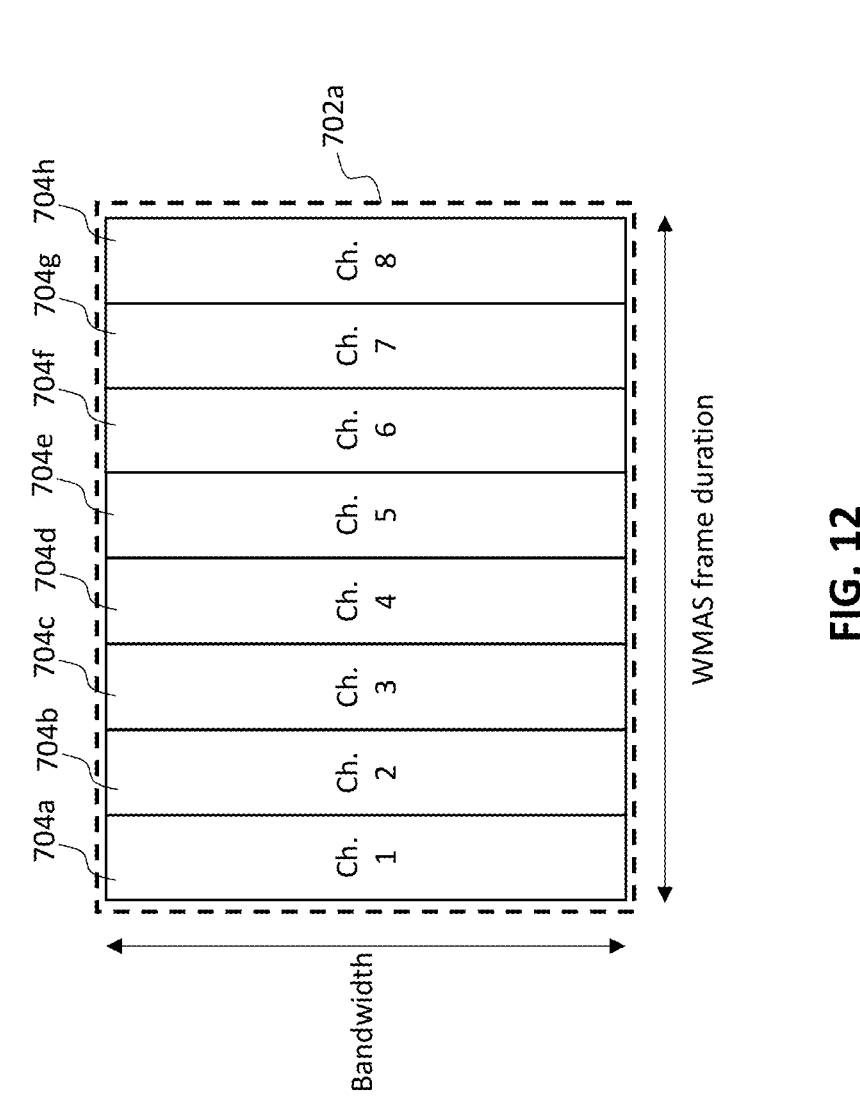
FIG. 12 illustrates an example audio channel allocation of a single class of audio devices, according to an embodiment of the present disclosure.

FIG. 12 illustrates an example audio channel allocation approach 700 in which audio channels 704a,b,c,d,e,f,g,h occupy the entire bandwidth of the frame structure 702a and are packed orthogonally across the frame duration. The allocation of an audio channel to a particular portion of the frame structure 702a can be a persistent allocation that remains fixed until deactivation/deregistration of the associated audio device with that audio channel. Alternatively, audio channel allocation for some or all of the audio channels 704a,b,c,d,e,f,g,h can be temporary and iteratively re-evaluated.

The allocation approach 700 can be used for a WMAS (e.g., system 200) that supports a small set of audio bit rates and MCS levels that are defined at configuration time based on the use case, available bandwidth, and/or the like. The allocation approach 700 can support a mix of different audio classes such as those described above. The approach 700 can include defining a per-class maximum user capacity to avoid fragmentation of the channel resources or reallocation of existing user audio channels to other resource blocks in the frequency dimension and/or time periods. In other examples, an arbitrary number of each audio class can be allowed, up to and/or exceeding an overall channel capacity. The approach 700 can be used for a single class of audio devices. The approach 700 can include establishment, at the time of configuration of each device with the system (e.g., system 200), of bit rate, MCS, and capacity/bandwidth. As illustrated, subcarriers for eight different high-fidelity audio channels can be carried in resource blocks of the frame structure. However, other numbers of audio channels may be carried in resource blocks in the frequency dimension of the audio frame that are less than or greater than eight. According to the example illustrated, the fidelity of the high-fidelity audio channels can be about 216 kbps at a 16-QAM rate ½.

In some example scenarios, a lower bit density can be used, leading to a fidelity less than about 216 kbps. The bit rate and MCS are not necessarily linked, but instead present tradeoffs. Without wishing to be bound by any particular theory, higher bit rates may require more resource blocks for a constant MCS; and fewer resource blocks are required with higher MCS for a given bit rate, but higher MCS may reduce the physical range of the system.

Figure 13:
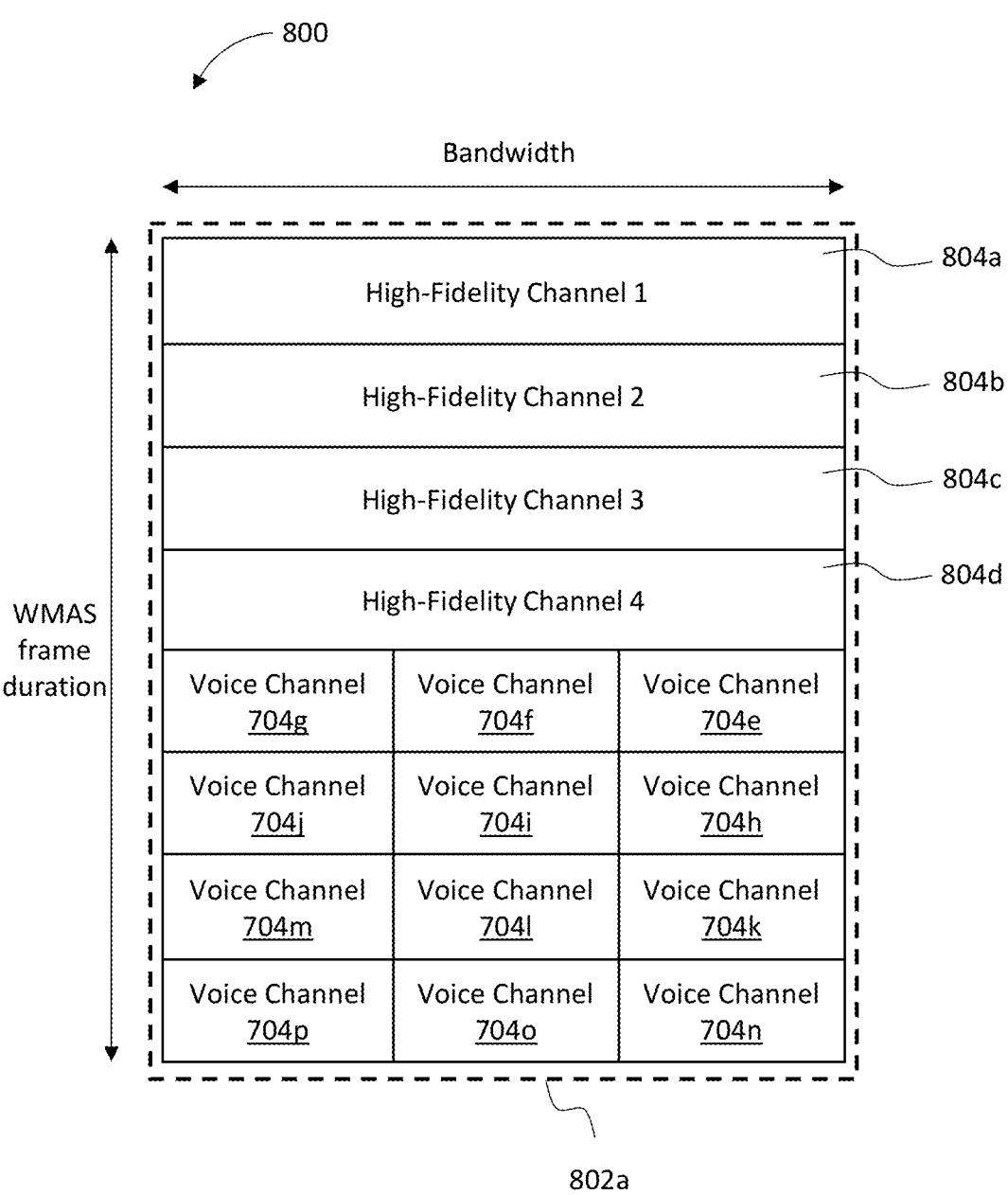
FIG. 13 illustrates an example audio channel allocation of multiple classes of audio devices, according to an embodiment of the present disclosure.

FIG. 13 illustrates an example audio channel allocation approach (i.e., approach 800) in which high-fidelity audio channels 804a,b,c,d occupy the entire bandwidth of the frame structure 802a and are packed orthogonally across a first portion of the frame duration. Voice-grade audio channels (e.g., 804e,f,g,h,i,j,k,l,m,n,o,p) may occupy only a portion of the bandwidth of the frame structure 802a and be packed orthogonally across a second portion of the frame duration and across the bandwidth of the frame structure 802a. The allocation of an audio channel to a particular portion of the frame structure 802a can be based upon an audio class designation, such as an audio class value. Allocation may be persistent, meaning that allocation remains fixed until deactivation/deregistration of the associated audio device with that audio channel. Alternatively, audio channel allocation for some or all of the audio channels 804a,b,c,d,e,f,g,h,i,j,k,l,m,n,o,p can be temporary and iteratively re-evaluated.

The approach 800 can be used for a WMAS (e.g., system 200) that supports a mix of different audio bit rates and MCS levels that are defined at configuration time based on the audio class value associated with the audio device/user, use case, available bandwidth, and/or the like. The approach 800 can support a mix of different audio classes such as those described above. The approach 800 can include defining a per-class maximum user capacity to avoid fragmentation of the channel resources or reallocation of existing user audio channels to other resource blocks in the frequency dimension and/or time periods. In other examples, an arbitrary number of each audio class can be allowed, up to and/or exceeding an overall channel capacity.

The approach 800 can be used for a single class of audio devices. The approach 800 can include establishment, at the time of configuration of each device with the system (e.g., system 200), of bit rate, MCS, and capacity/bandwidth for more than one audio class. As illustrated, subcarriers for four different high-fidelity audio channels can be carried in a first portion of the resource blocks of the frame structure 802a, and subcarriers for twelve voice-grade audio channels can be carried in a second portion of the resource blocks of the frame structure 802a. However, other numbers of audio channels may be carried in resource blocks in the frequency dimension of the audio frame that are less than or greater than those illustrated. According to the example illustrated, the fidelity of the high-fidelity audio channels can be about 216 kbps at a 16-QAM rate ½ and the fidelity of the voice-grade audio channels can be about 100 kbps at a 16-QAM rate ¾.

In some examples, audio channel characteristics and scheduler values can be fixed. For example, each user class can be assigned or designated a single bit rate and a single MCS level that are defined at the time of configuration or user class/audio class establishment. Alternatively, multiple bit rates and multiple corresponding MCS levels can be defined for each user class/audio class at the time of configuration or user class/audio class establishment. Select user classes/audio classes from among the full set of audio classes defined for the system (e.g., 200) can be assigned a single bit rate and a single MCS level while other user classes/audio classes from among the full set of audio classes defined for the system can be assigned multiple bit rates and multiple MCS levels.

When multiple bit rates and/or MCS levels are assigned for a single audio class, it may provide an opportunity for the scheduler to assess the available spectral resources at configuration time and to assign a first bit rate/MCS level for an audio class, and then later assign a second bit rate/MCS level for that same audio class depending on bandwidth availability, audio quality requirements, and the like. The amount of channel resources allocated for a user class may remain constant over the set of bit rates/MCS levels, meaning that as bit rate increases or decreases, MCS level increases or decreases correspondingly. The amount of channel resources allocated per audio class may remain constant in terms of only the relative ratio of total channel resources allocated to that user class relative to the other audio classes. The amount of channel resources allocated to an audio class may change over time, either as a raw value or with respect to the other audio classes occupying channel resources.

If channel conditions are poor, the scheduler can reduce the MCS (and bit rate) for certain audio channels or audio classes. By reducing MCS and bit rate for certain audio channels/audio classes, the scheduler can choose to reduce audio fidelity for certain audio channels/audio classes where appropriate instead of temporarily muting certain audio channels/audio classes entirely, which leads to packet loss.

If channel conditions are good, e.g., if the demand for channel resources is well aligned with or below channel bandwidth availability, the scheduler can increase the MCS (and bit rate) for certain audio channels or audio classes. By increasing MCS and bit rate for certain audio channels/audio classes, the scheduler can choose to increase audio fidelity without reducing system capacity.

By way of example only, high-fidelity audio channels may have a fixed fidelity of about 216 kbps and fixed MCS level of 16-QAM rate ½ while voice-grade audio channels may have two possible fidelity values of about 100 kbps at a MCS level of 16-QAM rate ¾ or about 50 kbps at a MCS level of QPSK rate ¾. According to another non-limiting example, high-fidelity audio channels may have a two possible fidelity values of about 216 kbps at an MCS level of 16-QAM rate ½ or about 108 kbps at an MCS level of QPSK ½ while voice-grade audio channels have two possible fidelity values of about 100 kbps at a MCS level of 16-QAM rate ¾ or about 50 kbps at a MCS level of QPSK rate ¾. Other fidelity values and MCS level are contemplated for such a flexible audio channel allocation approach. For example, a system (e.g., system 200) may include a set of different audio devices/users that can be subdivided into three or more audio classes/user classes. In such a circumstance, one or more of the audio classes may be fixed while others of the audio classes may be flexibly encoded and modulated according to different and/or changing bit rates and MCS levels.

One or more conditional thresholds may be established that trigger the changeover between two bit rate/MCS level settings for particular audio classes/user classes. For instance, a WMAS may establish a first audio class comprising devices/users that expect or require only voice-grade audio, a second audio class comprising devices/users that expect or require moderate fidelity audio, a third audio class comprising devices/users that expect or require high-fidelity audio, and a fourth audio class comprising devices/users that expect or require ultra-high-fidelity audio. Each of the first, second, third, and fourth (or a subset of the same) audio classes may have two or more different bit rate/MCS level settings that are suitable and for which the system is configured to operate these audio channels.

In such a system (e.g., 200), the scheduler may receive, determine, or establish bandwidth availability thresholds whereby when a sufficiently large number of new users/subscribers connect to the network and request or receive audio channel allocation to put strain on bandwidth available, the scheduler can first select the voice-grade audio class to be transitioned to a lower bit rate and lower MCS level before making any change to the moderate, high, and/or ultra-high fidelity audio classes. Subsequently, when poor channel conditions (e.g., fading) is experienced, leading to packet loss, the scheduler can select the moderate fidelity audio class to be transitioned to a lower bit rate and lower MCS level. Such a progression across the different audio classes can be carried out such that the high and ultra-high fidelity audio classes are only transitioned to a lower bit rate/lower MCS level after other, less drastic measures have been taken. That way, those users that expect or require the highest level of audio fidelity do not experience (or experience less frequently) the reduced fidelity often experienced when bit rate and MCS level are reduced to avoid packet loss.

Figure 14:
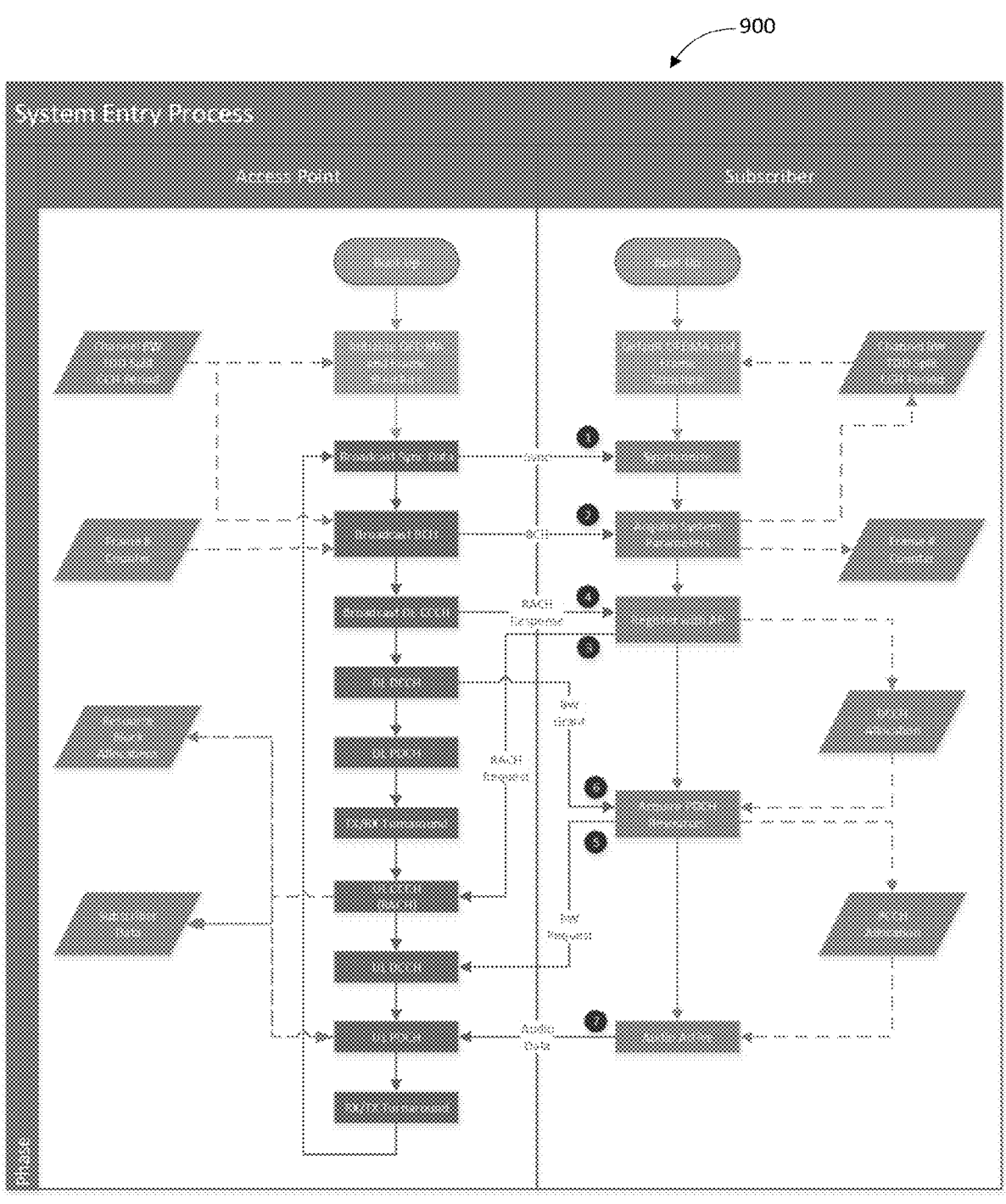
FIG. 14 illustrates an example system entry process in which an access point and a subscriber device negotiate for access and determine/communicate channel allocation information, according to an embodiment of the present disclosure.

FIG. 14 illustrates an example approach 900 for a subscriber device to register with/gain access to the system. The approach can be carried out through messaging between an access point and a subscriber device associated with a subscriber. The access point can initialize the OFDMA protocol and generate signals using the frame structure. In parallel, the subscriber device can operate according to a default OFDMA protocol and default frame structure. Access to the system and assignment of channel resources for the subscriber devices may be handled automatically via in-band control channel messaging. The in-band control channel messaging can include:

Step (1) includes the subscriber device synchronizing to time dimension and frequency dimension structures broadcast by the access point in every frame.

Step (2) includes the subscriber device may learn channel BW, TDD split, CCH period and frame number from a broadcast channel (BCH) broadcast by the access point in every frame.

Step (3) includes the subscriber device sending a random access (RACH) request on a dedicated uplink common control channel (CCCH) resource.

Step (4) includes sending, via the access point, a RACH response with allocations for an uplink dedicated control channel (DCCH) and downlink DCCH.

Step (5) includes receiving, from a subscriber apparatus, at the access point, a bandwidth request on the uplink DCCH.

Following Step (5), at Step (6), the access point may send a bandwidth grant message to the subscriber device on the downlink DCCH, the bandwidth grant message allocating PDCH resources for audio in one or both of the uplink direction or the downlink direction.

Following Step (6), at Step (7), the subscriber device begins to send audio on assigned resources.

Figure 15A:
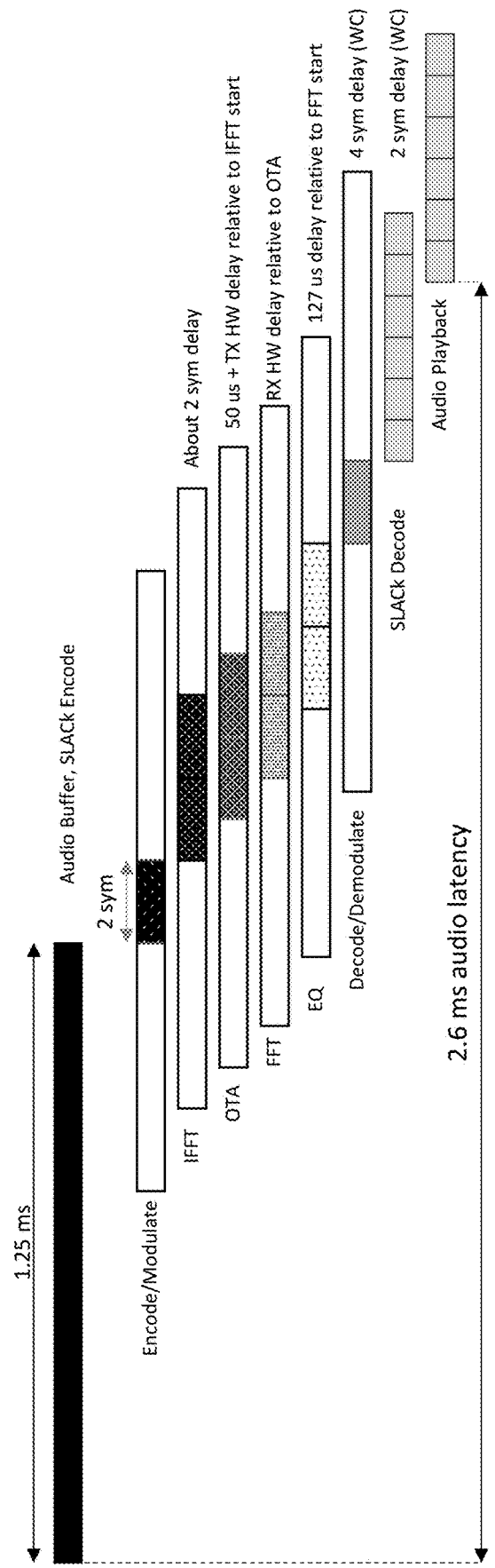
FIG. 15A illustrates an example audio latency map, according to an embodiment of the present disclosure.

FIG. 15A is an example latency map 1000 illustrating the timing and total duration of a frame, plus encoding, modulation, transmission, demodulation, decoding, and playback. The encoding and modulation can commence before the end of the frame duration. IFFT can commence about two symbol periods after encoding and modulation commences. Over-the-air (OTA) transmission can commence within about one symbol period after IFFT commences. Transceiver and transmitter allocations can be processed every subframe. Data allocations can span two subframes. Within about one symbol period after the signal/carrier wave is received by an access point or an audio device, FFT of the signal/carrier wave can commence. Equalization can commence within about 127 μs after FFT commences. Decoding and demodulation can commence after about a four symbol period delay following commencement of equalization. Decoding can commence after about a two symbol period delay following commencement of decoding and demodulation. Audio playback can commence even before completion of decoding. The audio latency may be less than about five (5) ms, less than about three (3) ms, etc., inclusive of all values and ranges therebetween. In order to further reduce latency, a shorter TDD frame can be used. In order to further reduce latency, data allocations can be limited to one (1) subframe.

Figure 15B:
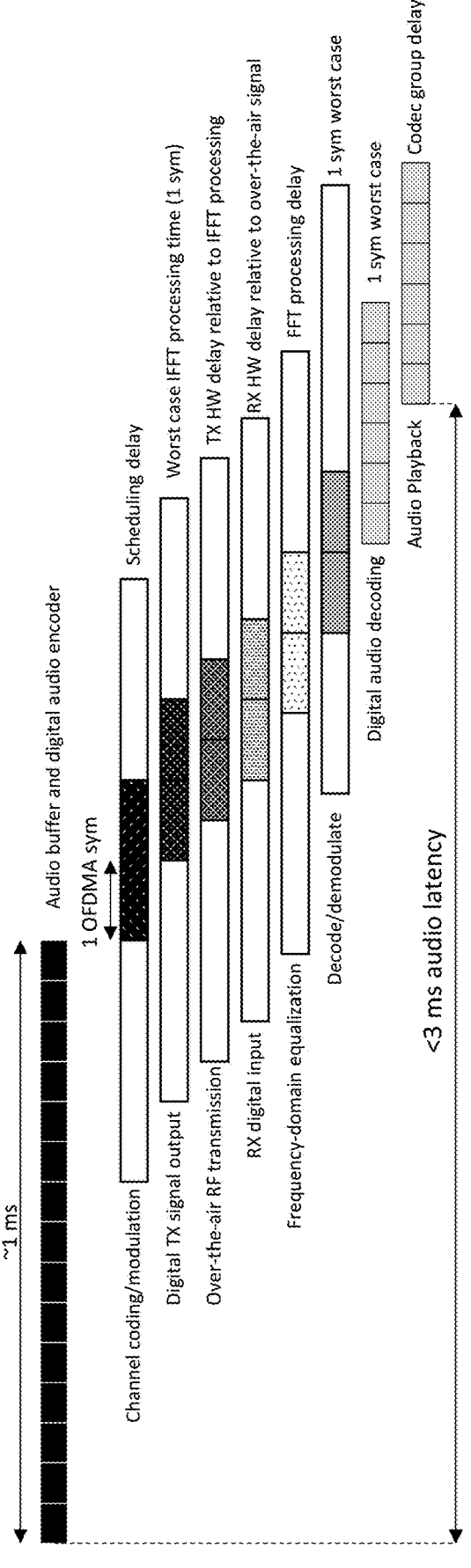
FIG. 15B illustrates an example audio latency map, according to an embodiment of the present disclosure.

FIG. 15B is an alternative of the example latency map 1000 illustrating the timing and total duration of a frame, plus encoding, modulation, transmission, demodulation, decoding, and playback. The channel coding and modulation can commence before the end of the audio buffer and digital audio encoder duration. Digital transmission (TX) signal output can commence about one OFDMA symbol period after channel coding and modulation commences and continue for about two total OFDMA symbols. Over-the-air (OTA) radio frequency (RF) transmission can commence within about ½ of the next OFDMA symbol period after digital TX signal output (e.g., IFFT) commences. Receiver digital input, including the receiver (RX) hardware delay relative to the OTA signal transmission can commence within about ½ of the next OFDMA symbol period following commencement of the OTA transmission. Frequency-domain equalization via FFT processing can commence within about 1 OFDMA symbol period following commencement of the RX digital input. Decoding and demodulation can commence after about a two OFDMA symbol period delay following commencement of frequency-domain equalization. Digital audio decoding can commence after about a one symbol period delay following commencement of decoding and demodulation. Audio playback can commence about one symbol period following commencement of digital audio decoding and the delay can account for codec group delay.

Referring now to FIGS. 16-20, simplified block flow diagrams are provided illustrating various example transceivers and access points, e.g., 1104, 1205, 1403, and 1504, which may be at least similar to the transceiver 204a, the access point 205, and/or the like. System 1300 may be similar to or the same as system 200.

Figure 16:
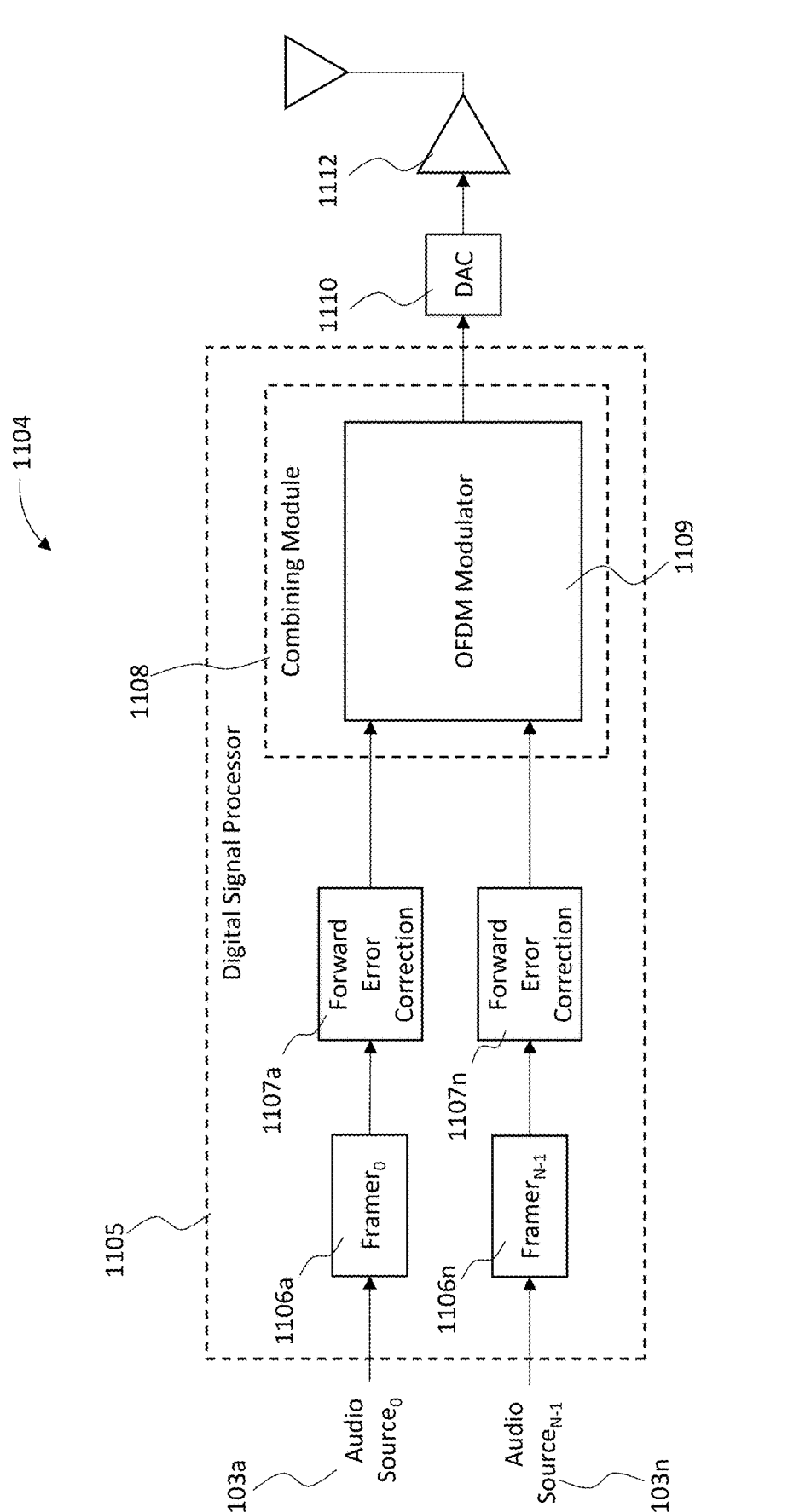
FIG. 16 illustrates a simplified block diagram of an example audio transmission device capable of supporting and facilitating one or more aspects described herein.

In FIG. 16, the transceiver 1104 is configured to receive audio 1103a (digital or analog) for a first user and other audio 1103n (digital or analog) for one or more other users. The transceiver 1104 may comprise a digital signal processor 1105 (DSP 1105). The DSP 1105 may be configured to frame 1106a the audio 1103a and frame 1106n the other audio signals 1103n. The DSP 1105 may be configured to carry out forward error correction 1107a and 1107n for the audio 1103a and the other audio 1103n, respectively. The DSP 1105 can comprise a combining module 1108 configured to combine the audio 1103a and the other audio 1103n into orthogonal subcarriers of a carrier wave. The combining module 1108 can comprise an orthogonal frequency-division multiplexing (OFDM) modulator 1109 configured to carry out subcarrier allocation within the frequency dimension of the signal. The transceiver 1104 can further comprise a DAC 1110 configured to receive the modulated and scrambled digital signal and convert it to an analog signal. The transceiver 1104 can further comprise an antenna 1112 (e.g., single antenna or an antenna array) that is configured for transmitting the analog FM signal (e.g., an ultra-high frequency (UHF) signal towards the receivers, e.g., 204a).

Figure 17:
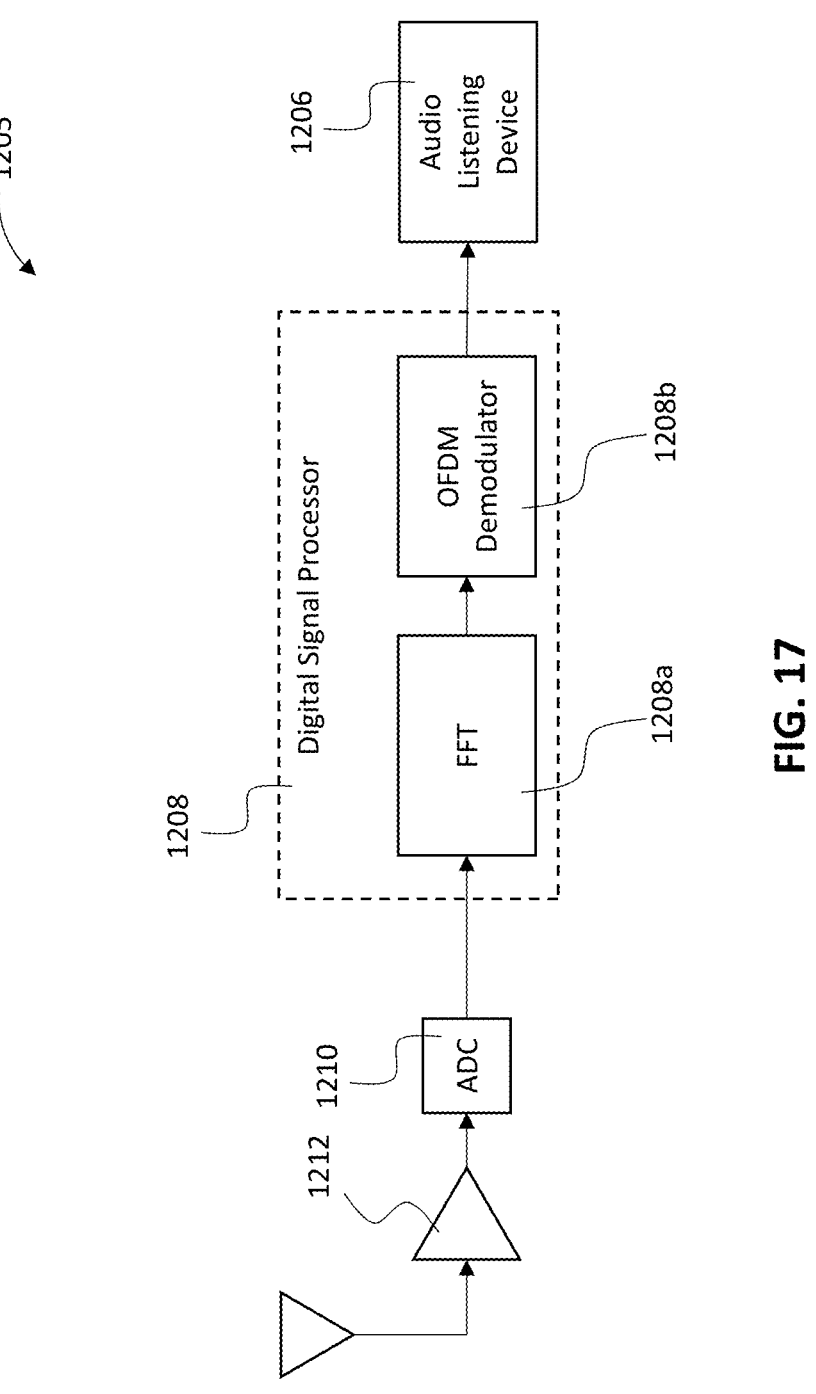
FIG. 17 illustrates a simplified block diagram of an example audio transmission device capable of supporting and facilitating one or more aspects described herein.

FIG. 17 is a simplified block flow diagram of a transceiver 1205, which may be at least similar to the transceiver 204a described elsewhere. The transceiver 1205 may be configured to receive, from an access point (e.g., 205), an analog signal, such as a narrowband analog signal comprising plural subcarriers that are orthogonal in the frequency dimension. The transceiver 1205 can comprise a receiving transducer 1212 configured to receive the signal, and an analog-to-digital converter 1210 (ADC 1210) to which the receiving transducer 1212 can relay the signal. The transceiver 1205 can further comprise a digital signal processor 1208 (DSP 1208) configured to descramble, demodulate, normalize, and sample the digital signal received from the ADC 1210. The DSP 1208 can comprise an ODFM demodulator 1209a configured to demodulate the digital signal. The DSP 1208 can further comprise a synchronization and normalization module 1209b configured to apply non-data-aided and/or data-aided synchronization techniques for correcting for noise and distortion in a signal that was received in an interferer laden environment. The transceiver 1205 can be a body worn IEM receiver and may comprise or be in communication with one or more audio listening devices 1206 such as in-ear-monitors.

Synchronization can be carried out by the transceiver 1205 using various non-data-aided methods. The transceiver 1205 may, for example, be synchronized to the transceiver 1104 with respect to the time dimension and the frequency dimension through interpretation of the carrier wave itself. The transceiver 1104 may include synchronization information as overhead in the transmission frame structure such that the transceiver 1205 can carry out data-aided synchronization methods.

An example of a synchronization approach includes frame synchronization in which the transceiver 1205 samples the time dimension of the signal at the appropriate time in order for the orthogonality of the subcarriers to be preserved. The transceiver 1205 can be configured to carry out frame synchronization as an initial synchronization upon initial receipt of the carrier wave. The transceiver 1205 can be configured to also or alternatively carry out frame synchronization during ongoing reception of the carrier wave. Said otherwise, frame synchronization can establish the point in the time dimension where the transceiver 1205 should sample the signal for fast Fourier transform (FFT). The access point may include, iteratively, symbols, frames, signals, or values in the time dimension of the carrier wave that facilitates synchronization of the transceiver 1205 with the transceiver 1104. During frame synchronization, or following frame synchronization, the transceiver 1205 can synchronize the remove the CPs from the signal and carry out FFT.

After frame synchronization within the time dimension, the transceiver 1205 may be configured for carrying out carrier frequency offset estimation and correction for the offset in the frequency dimension. By way of example only, if subcarrier spacing is estimated to be, for example, about 10 kHz, the coarse carrier frequency offset may be an increment of the subcarrier spacing and the transceiver 1205 can shift up or down in the frequency dimension by said increment to shift the audio channel data in the FFT.

As part of coarse carrier frequency offset estimation and correction, the transceiver 1205 may also be configured to look for beacon symbols associated with a particular subcarrier. If the transceiver 1205 is expecting to receive audio payload on a particular subcarrier, the transceiver 1205 can identify the beacon symbol associated with the particular subcarrier, determine a frequency or time dimension offset based upon where in the time or frequency dimension the beacon symbol is expected to be and where it is found, and then correct by shifting the subcarriers in the time dimension and/or the frequency dimension.

After frame synchronization in the time dimension, based upon CPs, and carrier offset synchronization in the frequency dimension, the transceiver 1205 can sample the signal to look into the bins of the FFT and see that the subcarrier are what the transceiver 1205 is expected. For example, the transceiver 1104 may provide one or more pilots, pilot subcarriers, pilot signals, or pilot frames in or with particular pre-determined subcarrier(s)s and the transceiver 1205 may know to expect a pilot, pilot subcarrier, pilot signal, or pilot frame at or in the particular pre-determined subcarrier(s), in which case the transceiver 1205 can sample the signal at the portion of the time and frequency dimension associated with that pre-determined subcarrier to identify whether the pilot, pilot subcarrier, pilot signal, or pilot frame is found. In an instance in which the transceiver 1205 does not see the expected pilot, pilot subcarrier, pilot signal, or pilot frame at the point in the time and frequency dimensions where the particular pre-determined subcarrier(s) is/are expected to be, the transceiver 1205 can carry out further subcarrier offset correction, e.g., based upon subcarrier spacing, and continue determining presence or absent of the expected pilot, pilot subcarrier, pilot signal, or pilot frame until the transceiver completes pilot-aided synchronization.

After initial synchronization, temperature changes, movements of the user wearing the transceiver 1205, interference from interferers in the environment, and the like may contribute to fine frequency or timing offsets. As such, the transceiver 1205 may be configured to carry out fine timing offset correction by tracking the timing offset to confirm that the transceiver 1205 is sampling the time dimension waveform at the correct time. The transceiver 1205 can be configured to carry out fine timing offset correction using the pilots, pilot subcarriers, pilot signals, or pilot frames in the subcarriers associated to the transceiver 1205.

The transceiver 1205 may be configured to, after coarse and/or fine offset correction in the time dimension and frequency dimension, whether non-data aided or aided by beacons/beacon symbols and/or pilot signals/pilot frames, carry out channel estimation according to pre-determined carrier and subcarrier frequencies. Said otherwise, the transceiver 1205 may initially be set up in the IEM system to expect a carrier frequency for the carrier wave and then, relative to that carrier frequency, the transceiver 1205 is configured to know the subcarriers to which it should listen (sample). The transceiver 1205 can then start sampling the subcarriers to interpret the audio payloads from the synchronization information and guard intervals.

As a user is moving around in the environment, the amplitude of the signal can change with signal path distance change and there can be multi-path propagation, so different frequencies are being attenuated. As such, the transceiver 1205 may be configured to carry out channel estimation to correct for those time varying impairments, so that the transceiver 1205 can subsequently demodulate the subcarriers successfully without distortions to the subcarrier data information or issues arising from that data having the incorrect phase.

Channel estimation may use beacon symbols in the subcarriers that are sent somewhat infrequently, such as every five milliseconds or the like, to normalize the signal in each subcarrier. By transmitting the beacon symbols relatively infrequently, overhead in the signal can be saved and latency reduced. The transceiver 1205 can be configured to, based on the beacon symbols associated with each subcarrier transmitted, estimate for each subcarrier the audio channel associated with the audio channel at that particular point in the frequency dimension and time dimension. Based upon this channel estimation approach, the transceiver 1205 can determine a shape and a phase of the channel across subcarriers.

The transceiver 1205 may be configured to carry out channel estimation based upon one or more data-aided approaches. For example, the transceiver 1205 may be configured to carry out channel estimation based upon beacon symbols, pilots, pilot signals, pilot frames, pilot subcarriers, and/or the like. The transceiver 1205 can, based on the channel estimation, determine attributes of the signal or resource blocks in the frequency dimension of the signal at various points in the time dimension, which can aid in correcting for one or more offsets or deformations, such as an amplitude offset, a phase offset, a timing offset, a time dimension waveform deformation, a frequency dimension waveform deformation, and/or the like. The transceiver 1205 can be configured to correct for the one or more offsets or deformations of the signal before sampling the signal for audio payload subcarriers.

The transceiver 1205 may be configured to be associated with a particular number of subcarriers, such as between about five (5) subcarriers and about 50 subcarriers, between about five (5) subcarriers and about 20 subcarriers, greater than about five (5) subcarriers, greater than about ten (10) subcarriers, or greater than about 15 subcarriers, inclusive of all values and ranges therebetween.

A portion of the subcarriers associated with the transceiver 1205 may be or comprise beacons or beacon symbols. A portion of the subcarriers may be payload subcarriers and may comprise payload symbols. A beacon symbol my precede a payload symbol, followed by a subsequent beacon symbol in the bitstream. A portion of the subcarriers can be pilots, pilot signals, pilot subcarriers, or pilot frames. Pilot signals/frames may comprise beacon symbols. Payload subcarriers may comprise a beacon symbol. By way of example, a bitstream may comprise a number of subcarriers comprising beacon symbols, a number of subcarriers comprising payload symbols and carrying audio payloads, and a number of subcarriers comprising one or more pilot signals/frames.

The bitstream may comprise subcarriers disposed orthogonal to other subcarrier(s) in the frequency dimension but with subcarrier spacing therebetween in the time dimension. The bitstream may comprise subcarriers disposed orthogonal to other subcarrier(s) in the time dimension but with subcarrier spacing therebetween in the frequency dimension. The bitstream may comprise subcarriers having subcarrier spacing therebetween in both the time dimension and the frequency dimension. The bitstream may comprise certain types of subcarriers that are orthogonal to other subcarrier(s), such as audio payload subcarriers that are orthogonal to preceding or subsequent beacon subcarrier(s), while other types of subcarriers may be spaced in the time dimension and/or frequency dimension. Subcarriers of a particular type may be orthogonal to other subcarriers of the same type but spaced in the time dimension and/or frequency dimension from subcarriers of different types.

An audio bitstream, such as described above for a plurality of subcarriers of the carrier wave, can result in a narrow signal bandwidth of between about 20 kHz and about 400 kHz, between about 30 kHz and about 300 kHz, between about 40 kHz and about 200 kHz, or between about 50 kHz and about 100 kHz, less than about 400 kHz, less than about 200 kHz, less than about 100 kHz, or less than about 50 kHz, inclusive of all values and ranges therebetween.

The signal bandwidth of the portion of the audio bitstream associated with the transceiver 1205 may depend, at least in part, upon subcarrier spacing, e.g., in the frequency dimension. The subcarrier spacing can be between about 5 kHz and about 50 kHz, between about 20 kHz and about 50 kHz, between about 30 kHz and about 50 kHz, greater than about one (1) kHz, greater than about five (5) kHz, greater than about ten (10) kHz, less than about 50 kHz, or less than about 20 kHz, inclusive of all values and ranges therebetween.

The signal bandwidth of the portion of the audio bitstream associated with the transceiver 1205 may depend, at least in part, upon subcarrier spacing, e.g., in the frequency dimension or time dimension.

As mentioned earlier, the bitstream may comprise subcarriers that comprise symbols. These symbols may be iterative and regularly spaced in the time dimension such as appearing at a particular portion of the frequency dimension, at a regular interval in the time dimension. The symbols may be provided to the transceiver in the time dimension between about every 50 μs and about every 100 ms, between about every 500 μs and about every 20 ms, between about every one (1) ms and about every ten (10) ms, greater than about every 50 μs, greater than about every 100 μs, greater than about every 500 μs, greater than about every one (1) ms, greater than about every ten (10) ms, or greater than about every 50 ms, inclusive of all values and ranges therebetween.

The transceiver 1205 may be configured to look at symbols, e.g., OFDMA symbols, in the bitstream across the frequency dimension and/or across the time dimension to accumulate a sufficient amount of symbol/signal information to facilitate various data-aided synchronization techniques, such as those described elsewhere herein. By keeping the symbols sparse across the time dimension, such as by using the time dimension symbol frequency described above, the proportion of overhead (synchronization information such as symbols, pilot signals/frames, etc.) can be kept lower than systems that operate using an allocation approach such as one of those described herein. Correlatively, the proportion of audio payload in the bitstream will be increased and there will be a proportional reduction in latency without sacrificing the transceiver's ability to conduct channel estimation.

In addition to the described configurations and capabilities of the transceiver 1205 that may lead to increased spectral efficiency, user scalability, decreased noise, and reduced latency, described herein are various configurations and capabilities of the transceiver 1104 that lead to increased spectral efficiency, user scalability, decreased noise, and reduced latency.

In addition, combining one subcarrier into plural channels in digital form (at a mixing board or the like) typically results in a relatively high PAPR, and therefore it can reduce PAPR to combine the subcarrier into plural channels for plural transceivers 1205 by combining analog signal portions after the PA and before signal transmission to the plural transceivers 1205, e.g., using a lossy RF combiner or the like. However, by combining analog signal portions after the PA, separate equipment is often required and the transmission and combining process leads to increased end-to-end latency. By combining subcarriers for channel formation in the digital signal, various analog components can be eliminated, there is no need for a cavity or hybrid combiner. However, in order to make digital combining of subcarriers for channel formation efficient in terms of PAPR reduction, the signal may need to be clipped.

The high PAPR of an OFDM signal may be a result of combining multiple subcarriers into one wideband signal. In some example OFDM/OFDMA approaches, this is done digitally by the IFFT. For example, PAPR reduction techniques can be performed digitally in the time dimension, after the IFFT.

The transceiver 1104 may be configured to carry out peak windowing to limit the time-domain waveform, which can reduce PAPR and make digital combining for channel formation more efficient from the PAPR perspective for audio systems, such as those described herein. The subcarriers may be combined for channel formation at a digital intermediate frequency (IF) domain or high frequency (HF) domain. The clipping process, e.g., peak windowing, can be carried out after digital subcarrier combining. Peak windowing may be carried out to achieve signal distortion by introducing self-interference. To carry out peak windowing, the transceiver 1104 may multiply relatively large signal peaks with a specific window function, such as a Gaussian shaped window, a cosine window, a Kaiser window, a Hamming window, etc. The signal is then multiplied with these windows, and the resulting spectrum will be a convolution of the original spectrum with the spectrum of the applied window.

Audio payload subcarriers can comprise a plurality of bits mapped to a complex constellation of points for the subcarrier. The transceiver 1104 may carry out forward error correction using a block code, convolutional code, or the like to scramble the modulated subcarriers. This modulation by the transceiver 1104 may constrain the sequences of bits that are transmitted. During demodulation of the audio payload subcarrier then, the transceiver 1205 may reverse the bit scrambling using one or more pre-determined sets of scrambling sequences.

In order to facilitate data-aided time and frequency synchronization between the transceiver 1104 and the transceiver 1205, or vice versa in the case of a bidirectional system, a portion of the time dimension can be allocated to synchronization. Synchronization subcarriers can be separated from audio payload subcarriers in the time dimension by guard intervals. The synchronization subcarriers can comprise uplink synchronization subcarriers and/or downlink synchronization subcarriers.

Figure 18:
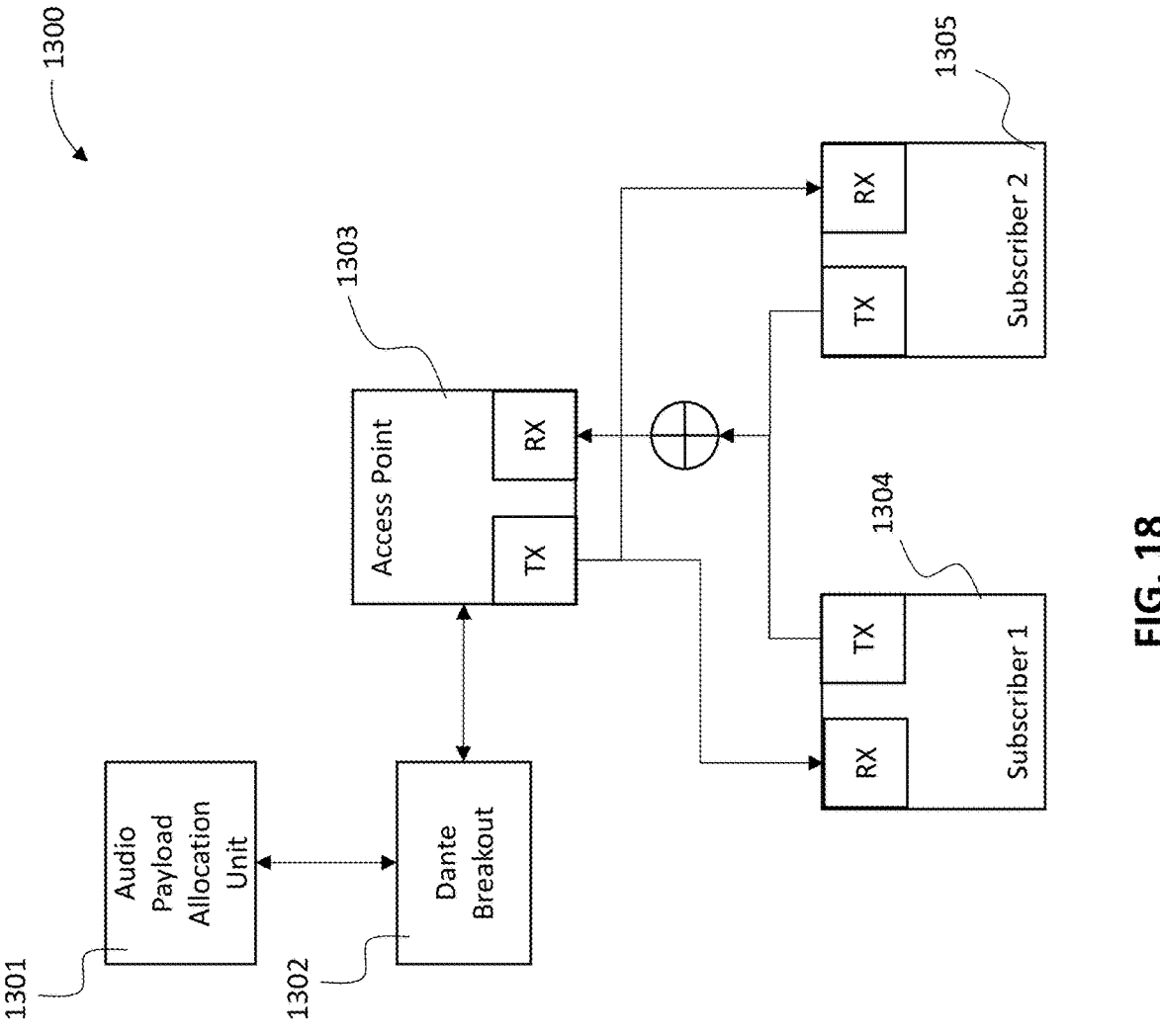
FIG. 18 illustrates a simplified block diagram of an example wideband multiuser audio system (WMAS), according to an embodiment of the present disclosure.

FIG. 18 illustrates a system 1300 comprising an audio payload allocation unit 1301 in operable communication with an access point 1303, e.g., via a Dante breakout box 1302. The access point 1303 can be configured to support low latency audio communications among a plurality of audio devices in a flexible and scalable audio system. The access point 1303 can comprise one or more processors and at least one memory storing instructions. The access point 1303 can be configured to determine an allocation of audio payload subcarriers for a plurality of audio channels for the plurality of audio devices to a plurality of resource blocks in the frequency dimension in a plurality of periods of a time dimension. The access point 1303 can be configured to transmit a carrier wave to the plurality of audio devices, the carrier wave comprising the audio payload subcarriers being carried in radio frames of the carrier wave according to the determined allocation.

The access point 1303 can be further configured to wirelessly communicate audio payload allocation information to one or more of the plurality of audio devices, wherein the audio payload allocation information is operable to cause respective audio devices to sample the carrier wave for audio payload subcarriers associated with the respective audio devices according to the audio payload allocation information. The access point 1303 can be configured to communicate, via infrared radiation, to one or more of the plurality of audio devices, audio payload allocation information, wherein the audio payload allocation information is operable to cause respective audio devices to sample the carrier wave for audio payload subcarriers associated with the respective audio devices according to the audio payload allocation information.

The access point 1303 can be configured to communicate, via a wired connection, to one or more of the plurality of audio devices, audio payload allocation information, wherein the audio payload allocation information is operable to cause respective audio devices to sample the carrier wave for audio payload subcarriers associated with the respective audio devices according to the audio payload allocation information. The access point 1303 can be configured to receive, from the plurality of audio devices, a plurality of audio payload allocation requests. At least one of the plurality of audio payload allocation requests can be operable to prompt wireless communication of the audio payload allocation instructions.

The access point 1303 can be configured to generate a broadcast signal comprising the audio payload allocation information; and transmit the broadcast signal towards at least a subset of the plurality of audio devices. The access point 1303 can be configured to receive, from one or more audio devices of the plurality of audio devices, an indication of a bit rate requirement for the one or more audio devices. The access point 1303 can be configured to transmit, in response to the indication of the bit rate requirement for the one or more audio devices, to the one or more audio devices, a response message comprising the allocation of audio payload subcarriers for the one or more audio devices.

The access point 1303 can be configured to receive, from one or more audio devices of the plurality of audio devices, an indication of a modulation and coding scheme requirement for the one or more audio devices. The access point 1303 can be configured to transmit, in response to the indication of the modulation and coding scheme requirement for the one or more audio devices, to the one or more audio devices, a response message comprising the allocation of audio payload subcarriers for the one or more audio devices. The access point 1303 can be configured to wirelessly transmit, to the plurality of audio devices, an allocation signal indicating the audio payload allocation instructions, time synchronization information, frequency synchronization information, and one or more symbols associated with the plurality of audio devices. The one or more symbols can comprise, for example, OFDMA symbols or the like.

The access point 1303 can be configured to receive, in response to the allocation signal, a plurality of audio requests. A first audio request of the plurality of audio requests may be configured to initiate transmission of a first audio payload associated with a first audio channel of the plurality of audio channels allocated for a respective first audio device of the plurality of audio devices. A first subset of the plurality of audio channels can be positioned orthogonal to a second subset of the plurality of audio channels in either the frequency dimension or the time dimension. A first subset of the plurality of audio channels can be positioned orthogonal to a second subset of the plurality of audio channels in the frequency dimension and a third subset of the plurality of audio channels can be positioned orthogonal to a fourth subset of the plurality of audio channels in the time dimension.

The access point 1303 can be configured to transmit, to one or more of the plurality of audio devices, an audio signal comprising audio payload subcarriers. At least a first portion of the audio payload subcarriers associated with a first audio device and a second portion of the audio payload subcarriers associated with a second audio device can be communicated in a same radio frame.

The access point 1303 can be configured to communicate, to the plurality of audio devices, the audio payload allocation instructions and audio payload subcarriers in the plurality of audio channels. The access point 1303 can be configured to cause at least one of the plurality of audio devices to sample an audio signal based upon at least a subset of the audio payload allocation instructions. The access point 1303 can be configured to cause at least one of the plurality of audio devices to perform time and frequency synchronization of an audio signal. The access point 1303 can be configured to cause, via one or more modulation symbols communicated in the audio signal, in response to at least one of the plurality of audio devices receiving the audio signal, subsequent to the time and frequency synchronization of the audio signal, the at least one of the plurality of audio devices to demodulate the audio signal.

The access point 1303 can be configured to determine audio payload allocation instructions configured to allocate a plurality of audio channels for the plurality of audio devices to a plurality of resource blocks in the frequency dimension in a plurality of periods of a time dimension. The access point 1303 can be further configured to wirelessly communicate the audio payload allocation instructions to the plurality of audio devices, the audio payload allocation instructions being operable to cause at least one of the plurality of audio devices to sample respective audio channels of the plurality of audio channels in an audio signal.

The access point 1303 can be further configured to receive, from the plurality of audio devices, a plurality of audio payload allocation requests. An audio payload allocation request can be configured to prompt wireless communication of the audio payload allocation instructions. The access point 1303 can be further configured to wirelessly transmit, to the plurality of audio devices, an allocation signal indicating the audio payload allocation instructions, time synchronization information, frequency synchronization information, and one or more symbols (e.g., OFDMA symbols) associated with the plurality of audio devices. The access point 1303 can be further configured to receive, in response to the allocation signal, a plurality of audio requests. A first audio request of the plurality of audio requests can be configured to initiate transmission of a first audio payload associated with a first audio channel of the plurality of audio channels allocated for a respective first audio device of the plurality of audio devices.

A first subset of the plurality of audio channels can be positioned orthogonal to a second subset of the plurality of audio channels in either the frequency dimension or the time dimension. A first subset of the plurality of audio channels can be positioned orthogonal to a second subset of the plurality of audio channels in the frequency dimension and a third subset of the plurality of audio channels are orthogonal to a fourth subset of the plurality of audio channels in the time dimension. The access point 1303 can be further configured to transmit, to one or more of the plurality of audio devices, an audio signal comprising audio payload subcarriers. A first portion of the audio payload subcarriers associated with a first audio device and a second portion of the audio payload subcarriers associated with a second audio device can be communicated in a same radio frame.

The access point 1303 can be further configured to communicate, to the plurality of audio devices, the audio payload allocation instructions and audio payload subcarriers in the plurality of audio channels. The access point 1303 can be further configured to cause at least one of the plurality of audio devices to sample an audio signal based upon at least a subset of the audio payload allocation instructions. The access point 1303 can be further configured to cause at least one of the plurality of audio devices to perform time and frequency synchronization of an audio signal. The access point 1303 can be further configured to cause, via one or more modulation symbols communicated in the audio signal, in response to at least one of the plurality of audio devices receiving the audio signal, subsequent to the time and frequency synchronization of the audio signal, the at least one of the plurality of audio devices to demodulate the audio signal.

The access point 1303 can be configured to support low latency audio communications in a flexible and scalable audio system. The access point 1303 can be configured to allocate audio payload subcarriers for respective audio devices of a plurality of audio devices to respective audio channels. The audio payload subcarriers for one or more first audio devices of the plurality of audio devices can be allocated adjacent to the audio payload subcarriers for one or more second audio devices of the plurality of audio devices in a frequency dimension. The audio payload subcarriers for the one or more first audio devices are allocated adjacent to the audio payload subcarriers for one or more third audio devices in a time dimension.

The access point 1303 can be configured to generate an audio signal comprising the audio payload subcarriers carried, according to the audio payload subcarrier allocation, in respective resource blocks in the frequency dimension and respective time periods of the time dimension. The access point 1303 can be configured to transmit the audio signal comprising the audio payload subcarriers to the plurality of audio devices. The access point 1303 can be configured to transmit, to the plurality of audio devices, information indicative of the audio payload subcarrier allocation to the respective audio channels. The information indicative of the audio payload subcarrier allocation can be transmitted to the plurality of audio devices as part of an allocation signal.

In some examples, the allocation signal can further comprise synchronization subcarriers. The synchronization subcarriers can comprise at least one of: a timing synchronization subcarrier, a frequency synchronization subcarrier, or a phase synchronization subcarrier, or the like. The access point 1303 can be configured to transmit the audio signal comprising the audio payload subcarriers to the plurality of audio devices. The audio signal can further comprise one or more signals, one or more tones, or one or more symbols, and wherein the one or more signals, the one or more tones, or the one or more symbols are associated with one or more audio devices of the plurality of audio devices. The audio payload allocation unit comprises one of: a wireless microphone transceiver, a wireless in-ear monitor transceiver, an access point, a server unit, a base station, an audio rack, an audio mixing console, or a cloud computing device.

The access point 1303 can be further configured to allocate, based on one or more characteristics of a plurality of wireless audio devices, to a frequency dimension and a time dimension of and audio signal, a plurality of audio channels associated with the plurality of wireless audio devices. The plurality of audio channels can comprise audio payload subcarriers carrying audio payload for respective wireless audio devices of the plurality of wireless audio payload devices. A first subset of the plurality of audio channels can be positioned orthogonal to a second subset of the plurality of audio channels in the frequency dimension and orthogonal to a third subset of the plurality of audio channels in the time dimension.

The one or more characteristics can comprise one of: a wireless audio device identifier, a wireless audio device type, a wireless audio device symbol, a latency requirement, a fidelity requirement, a transmission priority classification, an indication of a user associated with the respective wireless audio device, or a user type of the user associated with the respective wireless audio devices. The access point 1303 can be further configured to generate, according to the allocation, one or more audio signals carrying the plurality of audio payload subcarriers in respective audio channels of the plurality of audio channels for one or more of the plurality of audio devices. The access point 1303 can be further configured to transmit the one or more audio signals to the plurality of wireless audio devices, the one or more audio signals being operable to cause one or more of the wireless audio devices to sample the one or more audio signals for audio payload carried within associated audio channels of the plurality of audio channels.

The system 1300 can further comprise a plurality of transceivers 1304, 1305. The transceivers 1304, 1305 can be configured as audio playback devices. The plurality of transceivers 1304, 1305 can be configured to support low latency audio communications with the access point 1303 in a flexible and scalable audio system. Transceivers 1304, 1305 can comprise one or more processors and at least one memory storing instructions. Transceivers 1304, 1305 can be configured to receive an indication of audio payload subcarrier allocation for one or more audio channels of a plurality of audio channels mapped to a plurality of resource blocks in the frequency dimension in a plurality of periods of a time dimension. Transceivers 1304, 1305 can be configured to receive a carrier wave comprising audio payload subcarriers being carried in radio frames of the carrier wave according to the audio payload subcarrier allocation. Transceivers 1304, 1305 can be configured to extract, from the audio payload subcarriers carried in the radio frames of the carrier wave, audio payload data.

Transceivers 1304, 1305 can be configured to transmit, to an access point, an audio payload allocation request, wherein the audio payload allocation request is configured to prompt the access point to provide the indication of the audio payload subcarrier allocation. Transceivers 1304, 1305 can be configured to receive, from an access point, a broadcast signal comprising the indication of the audio payload subcarrier allocation. Transceivers 1304, 1305 can be configured to provide, to an access point, an indication of a bit rate requirement for the audio playback device; and receive, in response to the indication of the bit rate requirement for the audio playback device, from the access point, a response message comprising the indication of the audio payload subcarrier allocation.

Transceivers 1304, 1305 can be configured to provide, to the access point 1303, an indication of a modulation and coding scheme requirement for the audio playback device; and receive, in response to the indication of the modulation and coding scheme requirement for the audio playback device, from the access point, a response message comprising the indication of the audio payload subcarrier allocation. Transceivers 1304, 1305 can be configured to provide, to the access point 1303, an indication of an audio device type of the audio playback device; and receive, in response to the indication of the audio device type of the audio playback device, a response message comprising the indication of the audio payload subcarrier allocation. Transceivers 1304, 1305 can be configured to provide, to the access point 1303, an indication of an audio device type of the audio playback device; and receive, in response to the indication of the audio device type of the audio playback device, a response message comprising the indication of the audio payload subcarrier allocation.

Transceivers 1304, 1305 can be configured to wirelessly receive, from an access point, with the indication of the audio payload subcarrier allocation, one or more symbols associated with the audio channels for the audio playback device. The one or more symbols can comprise, for example, OFDMA symbols or the like.

Transceivers 1304, 1305 can be configured to receive, from an access point, an audio signal comprising a first plurality of audio payload subcarriers associated with the audio playback device and a second plurality of audio payload subcarriers associated with one or more other audio devices, wherein at least one of the first plurality of audio payload subcarriers are carried in a same radio frame with at least one of the second plurality of audio payload subcarriers. Transceivers 1304, 1305 can be configured to receive, with the audio signal or the indication of the audio payload subcarrier allocation, from the access point, information for carrying out time synchronization and frequency synchronization of the audio signal, and information for demodulating the audio signal. Transceivers 1304, 1305 can be configured to, based upon at least the information for carrying out time synchronization and frequency synchronization of the audio signal, and the information for demodulating the audio signal, carry out time and frequency synchronization of the audio signal and demodulate the audio signal.

Transceivers 1304, 1305 can be configured to: receive, from an audio payload allocation unit or the access point 1303, audio payload allocation instructions indicating allocation of a plurality of audio channels for a plurality of audio devices to one or more resource blocks in the frequency dimension in one or more periods of a time dimension, the plurality of audio devices including the audio device. Transceivers 1304, 1305 can be configured to, based upon at least a subset of the audio payload allocation instructions, sample an audio signal for allocated audio payload information. The one or more resource blocks in the frequency dimension comprise a plurality of resource blocks in the frequency dimension, and wherein the one or more periods of the time dimension comprise a plurality of periods of the time dimension.

Transceivers 1304, 1305 can be configured to transmit, to the audio payload allocation unit, an audio payload allocation request that is configured to prompt wireless communication of the audio payload allocation instructions. Transceivers 1304, 1305 can be configured to receive, from the audio payload allocation unit, an allocation signal indicating the audio payload allocation instructions, time synchronization information, frequency synchronization information, or one or more symbols associated with the plurality of audio devices.

Transceivers 1304, 1305 can be configured to transmit, in response to the allocation signal, to the audio payload allocation unit, an audio request. A first subset of the plurality of audio channels can be positioned orthogonal to a second subset of the plurality of audio channels in either the frequency dimension or the time dimension. A first subset of the plurality of audio channels can be positioned orthogonal to a second subset of the plurality of audio channels in the frequency dimension and a third subset of the plurality of audio channels can be positioned orthogonal to a fourth subset of the plurality of audio channels in the time dimension.

Transceivers 1304, 1305 can be configured to receive, from the audio payload allocation unit or an access point, an audio signal comprising audio payload subcarriers, wherein at least a first portion of the audio payload subcarriers associated with the user device and a second portion of the audio payload subcarriers associated with a second user device are communicated in a same radio frame. Transceivers 1304, 1305 can be configured to receive, from the audio payload allocation unit, with the audio payload allocation instructions, audio payload subcarriers in the plurality of audio channels.

Transceivers 1304, 1305 can be configured to perform a frequency synchronization of an audio signal. Transceivers 1304, 1305 can be configured to demodulate the audio signal.

Transceivers 1304, 1305 can be configured to receive, from an access point, an allocation signal. The allocation signal can comprise one or more symbols. The transceivers 1304, 1305 can be further configured to receive captured audio from one or more audio capture devices. The transceivers 1304, 1305 can be further configured to generate an audio signal comprising audio information indicative of the captured audio and at least one of the one or more symbols. The audio information being carried in one or more audio payload subcarriers can be mapped to one or more audio channels based upon audio payload allocation information received from the access point. The one or more audio payload subcarriers can be allocated orthogonally within a time dimension and a frequency dimension of the audio signal.

Transceivers 1304, 1305 can be configured to receive, from an audio payload allocation unit, a signal comprising one or more symbols and a plurality of audio payload subcarriers allocated to a plurality of resource blocks in the frequency dimension and a plurality of periods of a time dimension, wherein the signal has a transmit power of between about 50 milliwatts and about 250 milliwatts, determine, based at least in part on the one or more symbols, the allocation of audio payload subcarriers associated with the audio transceiver apparatus within the frequency and time dimensions.

Figures 19, 20:
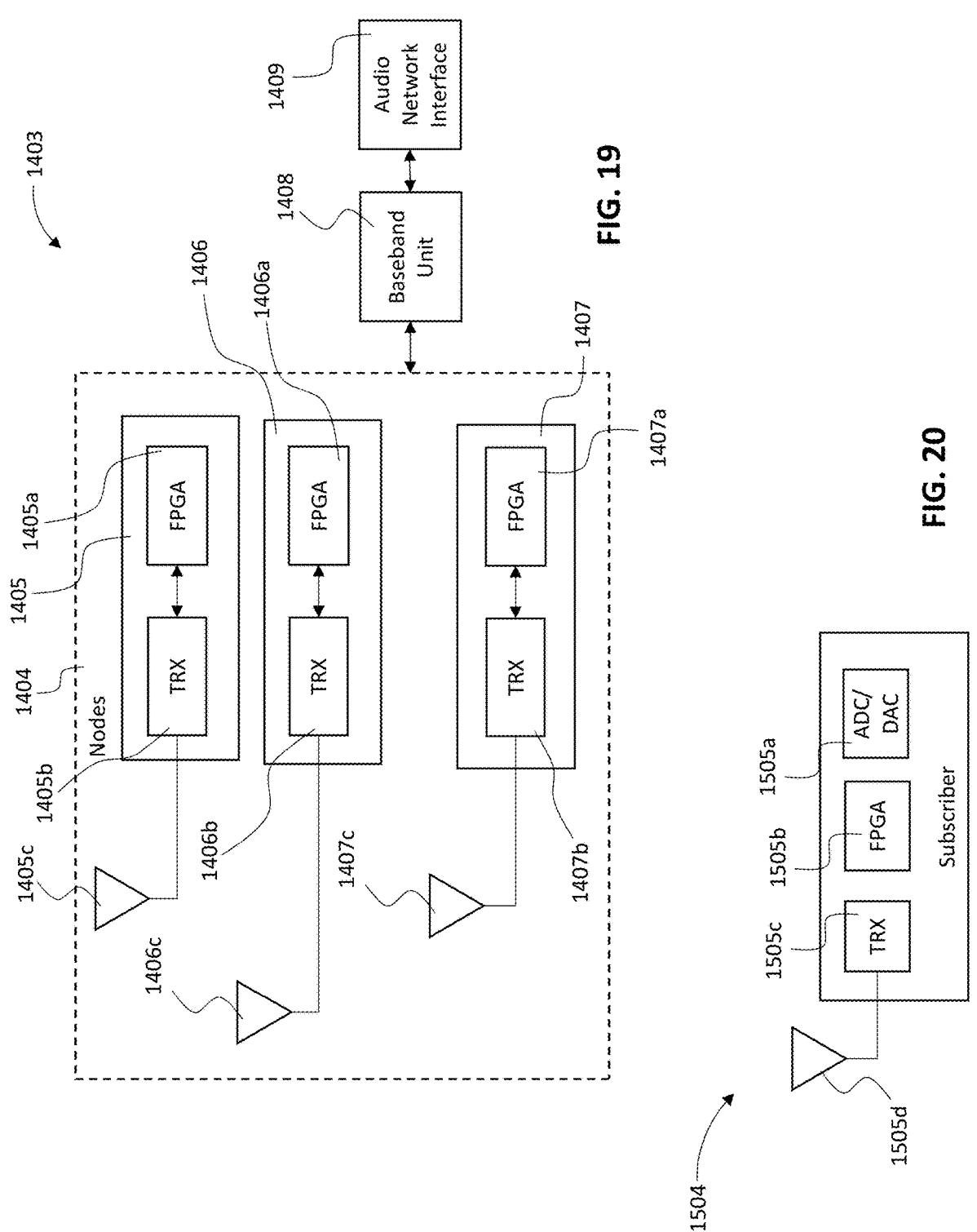
FIG. 19 illustrates a simplified block diagram of an example access point for a WMAS, according to an embodiment of the present disclosure.
FIG. 20 illustrates a simplified block diagram of an example subscriber device for a WMAS, according to an embodiment of the present disclosure.

FIG. 19 illustrates an access point 1403 comprising a radio access network 1404 comprising nodes 1405, 1406, 1407. The nodes 1405, 1406, 1407 comprise a field-programmable gate array (FPGA) 1405*a*, 1406*a*, 1407*a*. The nodes 1405, 1406, 1407 further comprise transceivers 1405*b*, 1406*b*, 1407*b* configured to prepare and transmit signals or carrier waves. The nodes 1405, 1406, 1407 further comprise antennas 1405*c*, 1406*c*, 1407*c*. The radio access network 1404 may function as a cell or cell network in which all or many of the nodes 1405, 1406, 1407 are configured to communicate with a centralized network, core network, primary processor, or the like.

For example, the access point 1403 can further comprise a baseband unit 1408 that is configured to communicate via wired or wireless communication with each of the nodes 1405, 1406, 1407, and to communicate with other components of the core network, such as an audio network interface 1409 configured to control and direct transmission of audio throughout the radio access network 1404 and with a plurality of audio devices (e.g., instruments, microphones, speakers, IEM devices, recorders, etc.). The audio network interface 1409 may include or be in communication with an audio payload subcarrier scheduler, audio channel allocation unit, and/or the like. The access point 1403 can be configured to communicate, for example by way of the radio access network 1404, with transceivers of audio devices dispersed throughout an interferer laden environment in near proximity to one or more of the nodes 1405, 1406, 1407.

Different physical layer channel types can be defined for the described WMAS. For example, data channels, which carry audio bits, can be allocated in the downlink direction and/or the uplink direction. Multiple audio channels can be allocated to a given subscriber if needed (e.g., for stereo audio, different bit classes, different equipment requirements, etc.). The access point 1403 can be configured to define the physical layer channel types.

The physical layer channel types can comprise a Broadcast Channel (BCH) which provides in the downlink direction only key system parameters to the user devices (TX power, bandwidth, etc.). The physical layer channel types can comprise a Sync Channel that provides in the downlink direction only a reference signal to enable user devices/audio devices to synchronize to the carrier frequency and sample clock of the access point 1403. The physical layer channel types can comprise Control Channels (CCH). The subscriber/audio devices 1304 can have a DL and UL CCH allocation for the exchange of any control-related information with the access point. There may be common CCH allocations that are shared by all subscribers/audio devices 1304 for random access request (RACH) and response.

Uplink and downlink traffic can be separated via a TDD frame structure. The number of OFDMA symbols allocated to the DL and UL portions of the frame can be configured at initialization time to support an arbitrary mix of DL and UL audio traffic. The overall duration for the TDD frame is also flexible. A shorter frame may be desirable for limiting audio latency, but capacity reduction due to increased overhead may be a limiting factor.

A smallest unit of capacity that can be allocated to a channel is the resource block, which consists of a block of N subcarriers over a subframe, defined as one (1) or more OFDMA symbols. Each resource block may contain both data and pilot symbols and can be demodulated independently of other resource blocks.

A scheduler function, implemented in software, may allocate a set of resource blocks for each physical layer channel. The number of resource blocks allocated may be a function of the modulation and coding scheme (MCS) and the bit rate for that channel, among other aspects. Channel coding can be implemented as a basic rate-½ convolutional code, and higher code rates can be achieved through puncturing/insertion without increasing the complexity of the encoder/decoder. Without wishing to be bound by any particular theory, this may allow a mix of arbitrary bit rates, from voice-grade and high-fidelity codecs to uncompressed audio, to easily be multiplexed into the wideband carrier.

The TDD frame can be viewed as a two-dimensional grid of RBs that can be allocated in a flexible manner. Scalability in terms of bandwidth may be achieved by allocating a variable number of resource blocks in the frequency dimension. Various system trade-offs can often be managed in software by the scheduler function without modifying the physical layer algorithms (e.g., equalization) or parameters (e.g., sampling rate).

For example, the scheduler function may be able to consider tradeoffs and automatically/autonomously decide when and to what extent to schedule resource blocks within a single subframe to maximize frequency diversity and minimize latency, schedule resource blocks across multiple subframes to minimize the power required during transmission periods, and/or schedule resource blocks in some arbitrary manner to minimize unused resource blocks and therefore maximize capacity.

Transmission (TX) power can be required for subscriber devices/audio devices in WMAS systems, such as OFDMA systems, so that all UL transmissions arrive at the access point within a valid signal level range for demodulation. The access point 1403 may send the TX power level on the BCH to enable the user devices to measure path loss and set UL TX power accordingly (open-loop power control). Closed-loop power control can be implemented, if needed, via messaging over the CCH interface.

FIG. 20 illustrates an audio device 1504, which can comprise or be in communication with audio devices such as microphones, IEM devices, instruments, intercoms, recording devices, speakers, and/or the like. The audio device 1504 can comprise an analog-to-digital converter or digital-to-analog converter (ADC/DAC) 1505*a*. The audio device 1504 can comprise an FPGA 1505*b*. The audio device 1504 can comprise a transceiver (TRX) 1505*c* configured to prepare and cause transmission of signals/carrier waves, and to receive and process signals/carrier waves received by the audio device 1504. The audio device 1504 further comprises an antenna 1505*d* configured to transmit the signals/carrier waves prepared by the TRX 1505*c* and/or the receive signals/carrier waves from other devices, such as the access point 1403 or the like.

Figure 21:
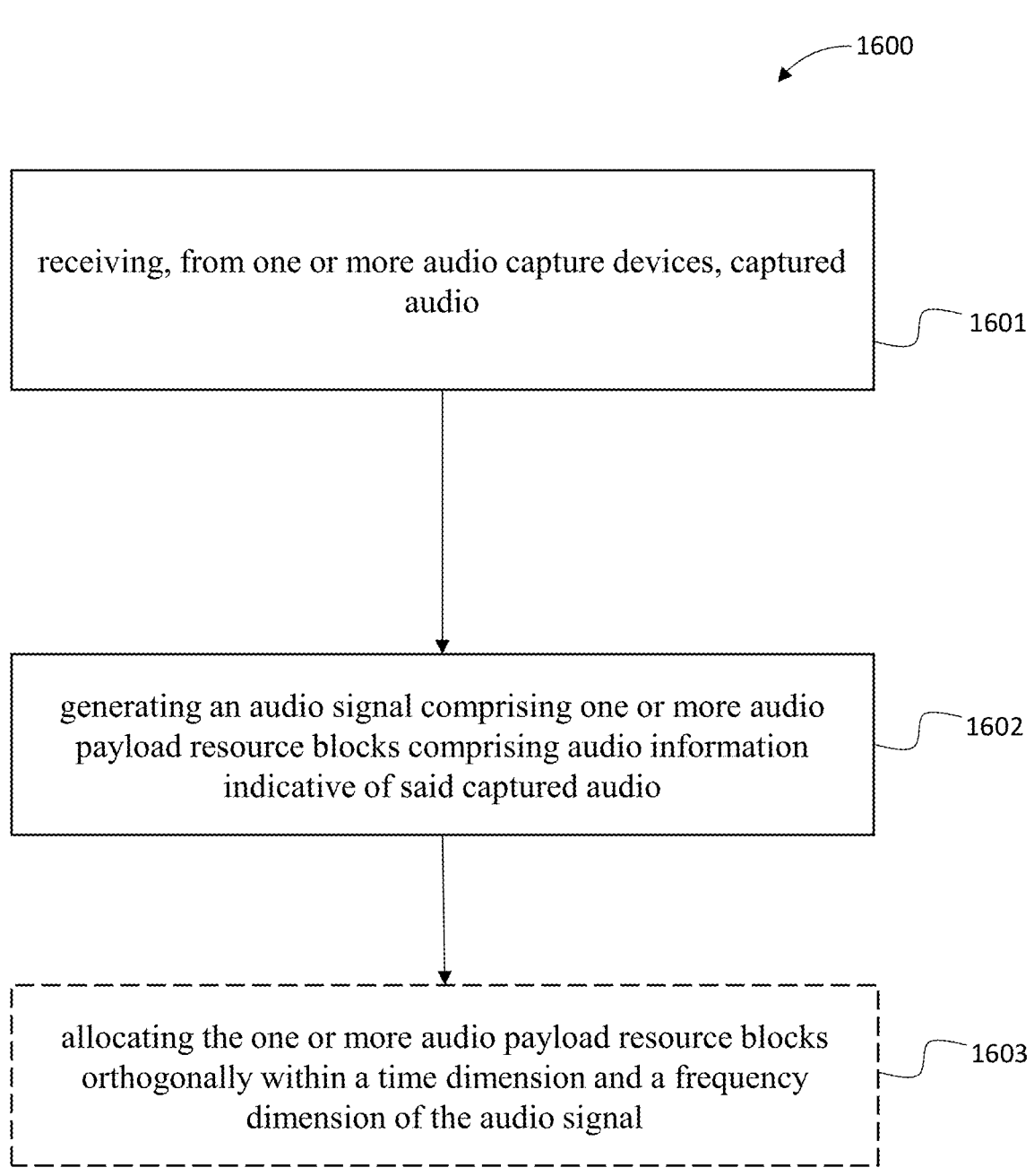
FIG. 21 illustrates a simplified block diagram of a method for facilitating low latency audio transmission in a multiuser audio system, according to an embodiment of the present disclosure.

Referring now to FIG. 21, a simplified block flow diagram illustrates an example method 1600 that can be carried out by a transmission device or computing device, such as the transceiver 204*a*, the access point 205, the audio processor 206, the remote control device 208, the local control device 209, or a specialized computing device, or another suitable apparatus comprising, e.g., a processor and a memory storing computer program instructions. The method 1600 can comprise receiving, from one or more audio capture devices, captured audio, at 1601. The method 1600 can comprise generating an audio signal comprising one or more audio payload resource blocks comprising audio information indicative of said captured audio, at 1602. The method 1600 can, optionally, comprise allocating the one or more audio payload resource blocks orthogonally within a time dimension and a frequency dimension of the audio signal, at 1603. Some or all elements of the method 1600 can be carried out or caused to be carried out by circuitry, such as a specialized computing device, or the like.

Referring now to FIG. 22, a simplified block flow diagram illustrates an example method 1700 that can be carried out by a transmission device or computing device, such as the transceiver 204, the access point 205, the audio processor 206, the remote control device 208, the local control device 209, or another suitable apparatus comprising, e.g., a processor and a memory storing computer program instructions. The method 1700 can comprise receiving a broadcast signal comprising one or more symbols, at 1701. The method 1700 can comprise receiving captured audio from one or more audio capture devices, at 1702. The method 1700 can further comprise generating an audio signal comprising one or more audio payload resource blocks and at least one of the one or more symbols, the one or more audio payload resource blocks comprising audio information indicative of said captured audio, at 1703*a*. The one or more audio payload resource blocks can be allocated orthogonally within a time dimension and a frequency dimension of the audio signal, at 1703*b*. Some or all elements of the method 1700 can be carried out or caused to be carried out by circuitry, such as a specialized computing device or the like.

Figure 23:
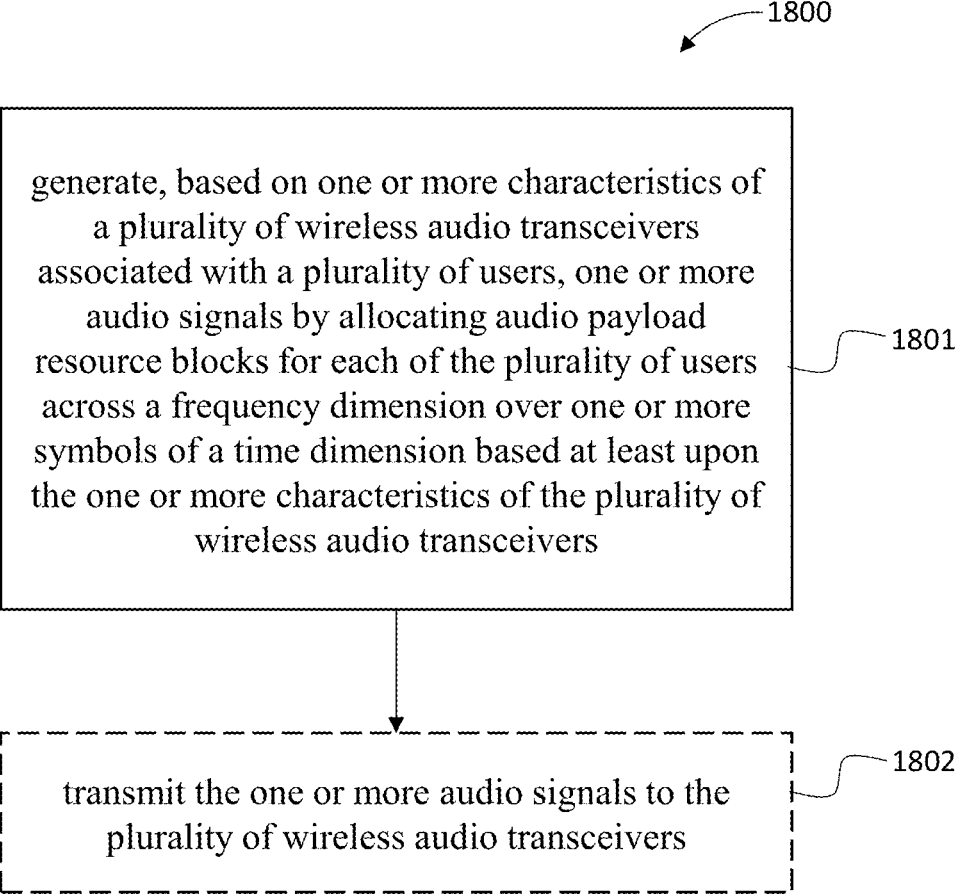
FIG. 23 illustrates a simplified block diagram of a method for facilitating low latency audio transmission in a multiuser audio system, according to an embodiment of the present disclosure.

Referring now to FIG. 23, a simplified block flow diagram illustrates an example method 1800 that can be carried out by a transmission device or computing device, such as the transceiver 204*a*, the access point 205, the audio processor 206, the remote control device 208, the local control device 209, a specialized computing device, or another suitable apparatus comprising, e.g., a processor and a memory storing computer program instructions. The method 1800 can comprise generating, based on one or more characteristics of a plurality of wireless audio transceivers associated with a plurality of users, one or more audio signals by allocating audio payload for each of the plurality of users to one or more resource blocks in the frequency dimension over one or more periods of a time dimension based at least upon the one or more characteristics of the plurality of wireless audio transceivers, at 1801. The method 1800 can, optionally, further comprise transmitting the one or more audio signals to the plurality of wireless audio transceivers, at 1802. Some or all elements of the method 1800 can be carried out or caused to be carried out by circuitry, a specialized computing device, or the like.

Additional Embodiments

One or more of the operations, steps, or processes described herein may be modified or further amplified as described herein. Moreover, additional optional operations may also be included, e.g., in the flowchart of method 1600, method 1700, and/or method 1800. It should be appreciated that each of the modifications, optional additions, and/or amplifications described herein may be included with the operations previously described herein, either alone or in combination, with any others from among the features described herein.

Fidelity, in some instances, may be measured using metrics such as: total harmonic distortion, output power, frequency response, signal-to-noise ratio (SNR), speaker impedance, headroom, intermodulation distortion, crosstalk, common-mode rejection ratio, dynamic range, transient response, damping factor, jitter, sample rate, bit depth, sample accuracy/synchronization, linearity, sequence testing, any other suitable metric or test, a combination thereof, and/or the like. In some audio systems, and sometimes even between different audio systems, absolute values of these audio characteristics and audio quality metrics may be less important than the subjective feedback provided by users of the system and/or the relative differential or change over time of audio characteristics and audio quality metrics.

For example, while the present disclosure includes a number of examples of systems, methods, devices, and approaches in which OFDMA is used, other technologies can be used alternatively and/or additionally, and can include but are not limited to: orthogonal frequency-division multiplexing (OFDM), single-carrier frequency-division multiple access (SC-FDMA), linearly pre-coded orthogonal frequency-division multiple access (LP-OFDMA), polar modulation schemes, quadrature modulation schemes, direct-sequence spread spectrum (DSSS), time-division multiple access (TDMA), Dynamic TDMA, code-division multiple access (CDMA), frequency-hopping spread spectrum (FHSS), wavelet modulation, fractal modulation, trellis modulation, trellis coded modulation (TCM), orthogonal frequency-division multiplexing-time-division multiple access (OFDM-TDMA), orthogonal frequency-division multiplexing-frequency-division multiple access (OFDM-FDMA), orthogonal frequency-division multiplexing-time-division duplex (OFDM-TDD), orthogonal frequency-division multiplexing-frequency-division duplex (OFDM-FDD), amplitude-shift keying (ASK), phase-shift keying (PSK), amplitude and phase-shift keying (APSK), continuous phase modulation (CPM), pulse-amplitude modulation (PAM), frequency-shift keying (FSK), multiple frequency-shift keying (MFSK), minimum-shift keying (MSK), on-off keying (OOK), pulse-position modulation (PPM), pulse-code modulation (PCM), pulse-density modulation (PDM), pulse-width modulation (PWM), pulse-duration modulation (PDM), delta-sigma modulation ($\Delta\Sigma M$), quadrature amplitude modulation (QAM), single-carrier frequency dimension equalization (SC-FDE), wavelength-division multiplexing (WDM), quadrature amplitude modulation (QAM), chirp spread spectrum (CSS), time-hopping spread spectrum (THSS), packet switching, variations thereof, or the like.

An audio management console can comprise one or more of: an audio scheduling device, an audio mixing console, an audio interface device, an audio control surface, a sound board, a mixing board, an audio controller, a digital audio workstation, a digital-to-analog converter (DAC), an analog-to-digital converter (ADC), a monitor management device, a rack mount, a MIDI controller, a power conditioner, a master clock, an audio recorder, a digital audio mixer, an output stage box, an audio channel allocation unit, an access point, an antenna (or antenna array), a production studio device, a digital snake, a digital sampler, a stage box, a loudness meter, a fidelity monitoring unit, a latency monitoring unit, a rackmount mixer, a leveling amplifier, a preamp, an equalizer, an effects processor, a stereo compressor, a transient shaper, a distortion/saturation controller, a mastering limiter, a vocal harmony and effects processor, a signal processing device, a multi-dimensional signal processor, a signal router, a signal splitter, a signal combiner, a line driver, an amplifier, an in-ear-monitor, a wireless microphone, an audio sensor, an audio pickup, a reamp device, an output gain control device, a ground lift switch, a input/output correction unit, a summing mixer, a stereo mix bus, a tree audio stem, a line mixer, a mastering transfer console, a fader, an expander, an output transformer, a transceiver network access interface, a bodypack transceiver network access interface, a wireless microphone transceiver network access interface, other suitable audio engineering, mixing, and recording equipment, combinations thereof, and/or the like. Scheduling can be carried out subject to parameters that are set at configuration time (e.g., number of channels, MCS levels, codec bit rates, etc.).

The present disclosure describes several example algorithms for carrying out audio channel allocation. However, algorithms may include, but are not limited to, a machine learning algorithm, a supervised machine learning algorithm, an unsupervised machine learning algorithm, a neural network, an artificial neural network, a connectionist system, a decision tree learning algorithm, a support-vector machine learning network, a Bayesian network, a belief network, a directed acyclic graphical model, a federated learning algorithm, a deep learning algorithm, a recursive algorithm, a brute force algorithm, a divide and conquer algorithm, a dynamic programming algorithm, a branch and bound algorithm, a quicksort algorithm, a mergesort algorithm, a greedy algorithm, artificial intelligence models, other suitable algorithms, methods, processes, networks, or models, combinations thereof, and/or the like.

The provided method description, illustrations, and process flow diagrams are provided merely as illustrative examples and are not intended to require or imply that the steps of the various embodiments must each or all be performed and/or should be performed in the order presented or described. As will be appreciated by one of skill in the art, the order of steps in some or all of the embodiments described may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular.

The term "comprising" means including, but not limited to, and should be interpreted in the manner it is typically used in the patent context;

If the specification describes something as "exemplary" or an "example," it should be understood that refers to a non-exclusive example;

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

As used herein, the terms "data," "content," "information," and similar terms may be used interchangeably, according to some example embodiments of the present invention, to refer to data capable of being transmitted, received, operated on, displayed, and/or stored. Thus, use of any such terms should not be taken to limit the spirit and scope of the disclosure. Further, where a computing device is described herein to receive data from another computing device, it will be appreciated that the data may be received directly from the other computing device or may be received indirectly via one or more computing devices, such as, for example, one or more servers, relays, routers, network access points, base stations, and/or the like.

As used herein, the term "carrier medium" may refer to any of various memory media as described above, as well as a physical transmission medium, such as a bus, network, and/or other physical transmission medium that conveys signals such as electrical, electromagnetic, or digital signals.

As used herein, the term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a floppy disk, a flexible disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the terms "memory medium" and "storage medium" may refer to any of various types of non-transitory memory devices or storage devices. The terms "memory medium" and "storage medium" are intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

As used herein, the term "programmable hardware element" may refer to various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

As used herein, the terms "computer system" may refer to any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

As used herein, the terms "user equipment," "user device," "subscriber device," or "audio device" can refer to any of various types of computer systems or devices that are mobile or portable and that perform wireless communications. Examples of such devices can include but are not limited to wireless transceivers, bodypack transceivers, wireless in-ear monitoring systems, wireless microphones, mobile telephones or smart phones, tablets, portable gaming devices, wearable devices, internet-of-things (IoT) devices, laptops, PDAs, portable Internet devices, music players, data storage devices, or other handheld devices, etc. In general, the terms "user equipment," "user device," "subscriber device," or "audio device" can be broadly defined to encompass any electronic, computing, and/or telecommunications device (or combination of devices) which is easily transported by a user and capable of wireless communication.

As used herein, the term "wireless device" can refer to any of various types of computer systems or devices that perform wireless communications. A wireless device can be portable (or mobile) or may be stationary or fixed at a certain location. An audio device such as a bodypack transceiver, a wireless microphone, or an in-ear monitoring device are all examples of a wireless device.

As used herein, the term "communication device" can refer to any of various types of computer systems or devices that perform communications, where the communications can be wired or wireless. A communication device can be portable (or mobile) or may be stationary or fixed at a certain location. A wireless device is an example of a communication device. An audio device such as a bodypack transceiver, a wireless microphone, or an in-ear monitoring device are all other examples of a communication device.

As used herein, the terms "access point" and "base station," as used herein, have the full breadth of their ordinary meaning, and at least includes a wireless communication station, e.g., installed at a fixed location, and used to communicate as part of a wireless audio system or radio system.

As used herein, the terms "cell", "access network", and "radio access network" may refer to an area or region of a wireless audio system or network in which wireless communication services are provided on at least one radio frequency by at least one access point or base station. A cell may be identified in various instances by the frequency on which the cell is deployed, by a network to which the cell belongs, and/or a cell identifier (cell id), among various possibilities.

As used herein, the terms "channel" and "audio channel" may refer to a medium used to convey information from a sender (transmitter) to a transceiver. It should be noted that since characteristics of the term "channel" may differ according to different standards or protocols, the term "channel" as used herein may be considered as being used in a manner that is consistent with the standard of the type of device with reference to which the term is used. In some standards, channel widths may be variable (e.g., depending on device capability, band conditions, etc.). Certain protocols and standards may include different definitions of channels. Furthermore, some standards may define and use multiple types of channels, e.g., different channels for uplink or downlink and/or different channels for different uses such as data, control information, etc.

As used herein, the term "band" has the full breadth of its ordinary meaning, and at least includes a section of spectrum (e.g., radio frequency spectrum) in which channels are used or set aside for the same purpose.

As used herein, the term "automatically" refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

As used herein, the term "computing device" refers to a specialized, centralized device, network, or system, comprising at least a processor and a memory device including computer program code, and configured to provide guidance or direction related to the charge transactions carried out in one or more charging networks.

As used herein, the terms "about," "substantially," and "approximately" generally mean plus or minus 10% of the value stated, e.g., "about 250 μm" would include 225 μm to 275 μm; "about 20 milliseconds (ms)" would include 18 ms to 22 ms; and "about 100 kbps" would include 90 kbps to 110 kbps.

As described herein and defined by the International Telecommunication Union, a "low frequency" signal or carrier wave may refer to a signal or carrier wave having a frequency between 30 kHz and 300 kHz, a "medium frequency" signal or carrier wave may refer to a signal or carrier wave having a frequency between 300 kHz and 3 MHz, a "high frequency" signal or carrier wave may refer to a signal or carrier wave having a frequency between 3 MHz and 30 MHz, a "very high frequency" signal or carrier wave may refer to a signal or carrier wave having a frequency between 30 MHz and 300 MHz, and a "ultra-high frequency" signal or carrier wave may refer to a signal or carrier wave having a frequency between 300 MHz.

Figure 24:
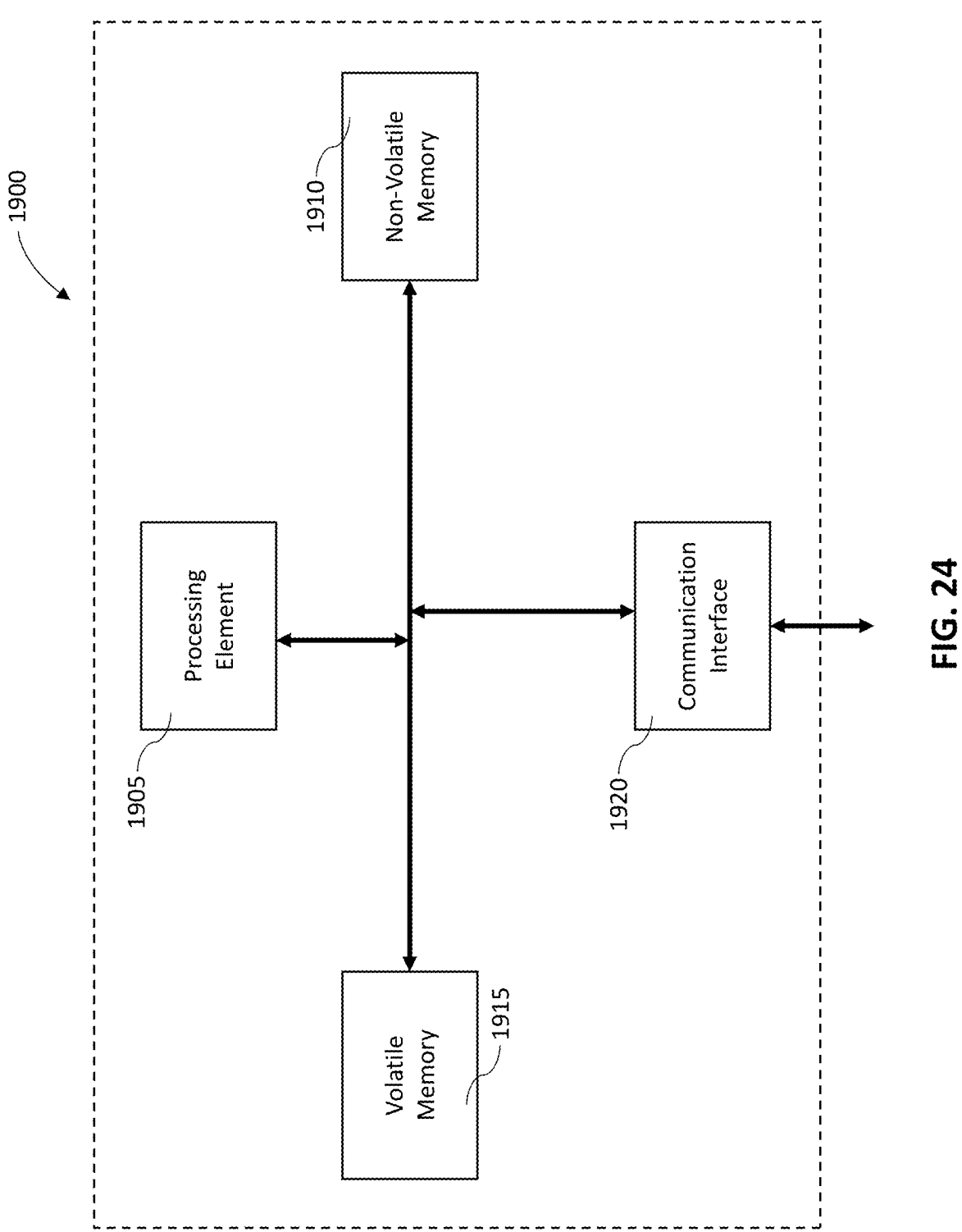
FIG. 24 illustrates a schematic of an example computing device capable of supporting and facilitating one or more aspects described herein.

FIG. 24 provides a schematic of a computing device 1900 configured for carrying out a portion or all of at least some of the methods, approaches, steps, processes, techniques, and/or algorithms described herein. The computing device 1900 can be similar to or the same as one or more of the transceiver 204a, or the access point 205. One or more of the transceiver 204a, or the access point 205 can comprise the computing device 1900, or vice versa. The computing device 1900 can be configured to carry out all or part of any of the methods, algorithms, processes, or approaches described herein, according to a set of instructions or according to computer program code. In general, the terms computing entity, computer, entity, device, system, and/or similar words used herein interchangeably may refer to, for example, one or more computers, sound boards, audio mixers, audio signal transmission systems, in-ear-monitoring systems, audio engineering racks, computing entities, desktops, mobile phones, tablets, phablets, notebooks, laptops, distributed systems, kiosks, input terminals, servers or server networks, blades, gateways, switches, processing devices, processing entities, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. These functions, operations, and/or processes can be performed on data, content, information, and/or similar terms used herein interchangeably.

As indicated, the computing device 1900 may include or be in communication with one or more processing elements 1905 (also referred to as processors, processing circuitry, and/or similar terms used herein interchangeably) that communicate with other elements within the computing device 1900 via a bus, for example. As will be understood, the processing element 1905 may be embodied in a number of different ways. For example, the processing element 1905 may be embodied as one or more complex programmable logic devices (CPLDs), microprocessors, multi-core processors, coprocessing entities, application-specific instruction-set processors (ASIPs), digital signal processors (DSPs), microcontrollers, and/or controllers. Further, the processing element 1905 may be embodied as one or more other processing devices or circuitry. The term circuitry may refer to an entirely hardware embodiment or a combination of hardware and computer program products. Thus, the processing element 1905 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 1905 may be configured for a particular use or configured to execute instructions stored in volatile or non-volatile media or otherwise accessible to the processing element 1905. As such, whether configured by hardware or computer program products, or by a combination thereof, the processing element 1905 may be capable of performing steps or operations according to embodiments of the present invention when configured accordingly.

The computing device 1900 may further include or be in communication with non-volatile media (also referred to as non-volatile storage, memory, memory storage, memory circuitry and/or similar terms used herein interchangeably). The non-volatile storage or memory may include one or more non-volatile storage or memory media 1910, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

The computing device 1900 may further include or be in communication with volatile media (also referred to as volatile storage, memory, memory storage, memory circuitry and/or similar terms used herein interchangeably). The volatile storage or memory may also include one or more volatile storage or memory media 1915, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 1905. Thus, the databases, database instances, database management systems, data, applications, programs, program modules, scripts, source code, object code, byte code, compiled code, interpreted code, machine code, executable instructions, and/or the like may be used to control certain aspects of the operation of the computing device 1900 with the assistance of the processing element 1905 and operating system.

Additionally or alternatively, the computing device 1900 may include one or more communications interfaces 1920 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing device 1900 may be configured to communicate via wireless external communication networks using any of a variety of protocols, such as ultra-high frequency analog signal transmission, frequency modulation, radio frequency transmission, or other such protocols or approaches.

Although not shown, the computing device 1900 may include or be in communication with one or more input elements (not shown), such as a keyboard input, a mouse input, a touch screen/display input, motion input, movement input, audio input, pointing device input, joystick input, keypad input, and/or the like. The computing device 1900 may also include or be in communication with one or more output elements (not shown), such as audio output, video output, screen/display output, motion output, movement output, and/or the like. Such an output element may comprise, for example, one or more in-ear-monitors (IEMs) in wired or wireless communication with the computing device 1900 or a component thereof, such as the processing element 1905, and/or the like.

Figure 25:
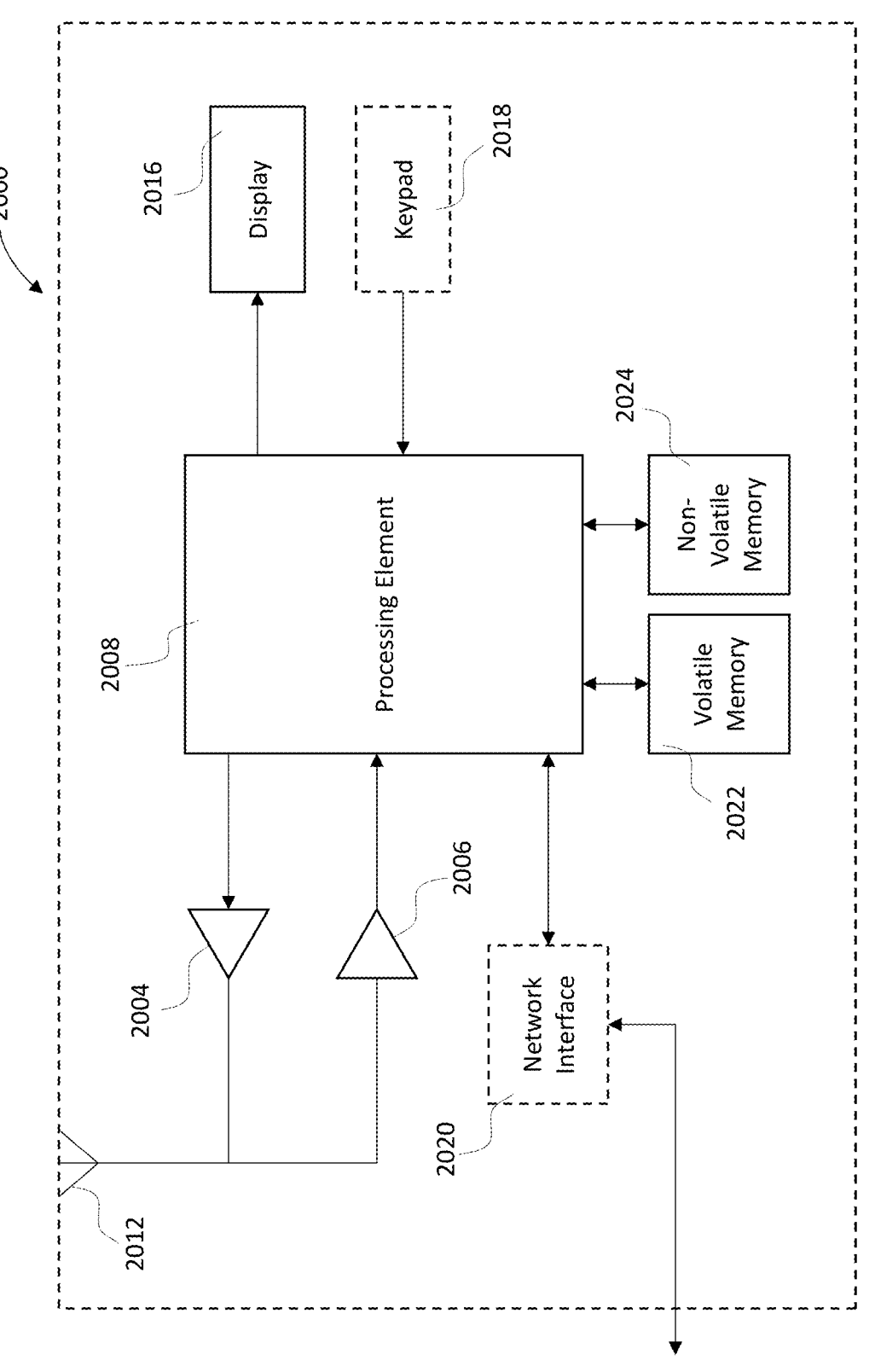
FIG. 25 illustrates a schematic of an example external computing device capable of supporting and facilitating one or more aspects described herein.

FIG. 25 provides an illustrative schematic representative of an external computing entity 2000 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 2000 can be operated by various parties. As shown in FIG. 25, the external computing entity 2000 can comprise an antenna 2012, a transmitter 2004 (e.g., radio), a transceiver 2006 (e.g., radio), and a processing element 2008 (e.g., CPLDs, microprocessors, multi-core processors, DSP, ADC, coprocessing entities, ASIPs, microcontrollers, controllers, and/or the like) that provides signals to and receives signals from the transmitter 2004 and transceiver 2006, correspondingly. The external computing entity 2000 may comprise the transceiver 2006 but not the transmitter 2004.

The signals provided to and received from the transmitter 2004 and the transceiver 2006, correspondingly, may include signaling information/audio data in an air interface and/or via other suitable wireless means. In this regard, the external computing entity 2000 may be capable of operating over one or more air interfaces, with any suitable modulation approach, and with one or a plurality of other such devices.

The external computing entity 2000 may include location determining aspects, devices, modules, functionalities, and/or similar words used herein interchangeably. For example, the external computing entity 2000 may include outdoor positioning aspects, such as a location module adapted to acquire, for example, latitude, longitude, altitude, geocode, course, direction, heading, speed, universal time (UTC), date, and/or various other information/data. The external computing entity 2000 may include ambient weather determining aspects, such as a thermometer or the like. The location module can acquire data, sometimes known as ephemeris data, by identifying the number of satellites in view and the relative positions of those satellites (e.g., using global positioning systems (GPS)). The location information/data can be determined by triangulating the external computing entity's 2000 position in connection with a variety of other systems, including cellular towers, an antenna of the computing device 1900 or the like, Wi-Fi access points, and/or the like. Similarly, the external computing entity 2000 may include indoor positioning aspects, such as a location module adapted to acquire, for example, latitude, longitude, altitude, geocode, course, direction, heading, speed, time, date, and/or various other information/data. Some of the indoor systems may use various position or location technologies including radio-frequency identification (RFID) tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 2000 may also comprise a user interface (that can comprise a display 2016 coupled to a processing element 2008) and/or a user input interface (coupled to a processing element 2008). For example, the user interface may be a user application, user interface, and/or similar words used herein interchangeably executing on and/or accessible via the external computing entity 2000 to interact with and/or cause display of information/data from the computing device 1900, as described herein. The user input interface can comprise any of a number of devices or interfaces allowing the external computing entity 2000 to receive data, such as an optional keypad 2018 (hard or soft), a touch display, voice/speech or motion interfaces, or other input device. When a keypad 2018 is included in the external computing entity 2000, the keypad 2018 can comprise (or cause display of) a numerical value (0-9) and related keys (#, *), and other keys used for operating the external computing entity 2000 and may include a full set of alphabetic keys or set of keys that may be activated to provide a full set of alphanumeric keys. Including a keypad 2018, the keypad 2018 can be caused to be presented temporarily when appropriate on the display 2016. In addition to providing input, the user input interface can be used, for example, to activate or deactivate certain functions, such as sleep modes.

The external computing entity 2000 can also include volatile storage or memory 2022 and/or non-volatile storage or memory 2024, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 2000. As indicated, this may include a user application that is resident on the entity or accessible through a browser or other user interface for communicating with the computing device 1900 and/or various other computing entities.

The external computing entity 2000 may include one or more components or functionality that are the same or similar to those of the computing device 1900, as described in greater detail above. As will be recognized, these architectures and descriptions are provided for exemplary purposes only and are not limiting to the disclosure.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of" and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Hereinafter, various characteristics will be highlighted in a set of numbered clauses or paragraphs. These characteristics are not to be interpreted as being limiting on the invention or inventive concept, but are provided merely as a highlighting of some characteristics as described herein, without suggesting a particular order of importance or relevancy of such characteristics.

Clause 1. An in-ear monitoring (IEM) system configured to support low latency audio monitoring, the IEM system comprising: an audio channel allocation device; and an IEM device configured to be in wireless communication with the audio channel allocation device, wherein the IEM device comprises one or more audio drivers configured to generate an audio output, a circuit configured to control the audio output generated by the one or more audio drivers, one or more in-ear portions configured to deliver the audio output into one or both ears of a user, and a bodypack receiver in wired communication with the circuit and the one or more audio drivers, wherein the audio channel allocation device is configured to: determine an allocation of audio channels for the IEM devices to a plurality of resource blocks in a frequency dimension in a plurality of symbol periods of a time dimension; and transmit a carrier wave to the bodypack receiver of the IEM device, the carrier wave comprising an indication of the allocation of audio channels, and wherein the IEM device is configured to: receive, using the bodypack receiver, the carrier wave from the audio channel allocation device; configure the circuit of the IEM device according to the indication of the allocation of audio channels in the carrier wave; receive, using the bodypack receiver of the IEM device, a subsequent carrier wave comprising audio payload carried therein according to the allocation of audio channels determined by the audio channel allocation device; and generate the audio output based on the audio payload, using the one or more audio drivers of the IEM device, for output to the user via the one or more in-ear portions.

Clause 2. The system of Clause 1, wherein the wideband portion of the frequency dimension occupied by the resource blocks to which the audio channels are allocated has a bandwidth between about 500 kHZ and about 5 MHz.

Clause 3. The system of any one of Clauses 1-2, wherein the allocation of audio channels is based at least in part on one or more indications of a bit rate requirement for the IEM device.

Clause 4. The system of any one of Clauses 1-3, wherein the allocation of audio channels is based at least in part on one or more indications of a modulation and coding scheme requirement for the IEM device.

Clause 5. The system of any one of Clauses 1-4, wherein the audio channel allocation device is further configured to: wirelessly transmit, to the IEM device, in the carrier wave with the indication of the allocation of audio channels or in the subsequent carrier wave with the audio payload, one or more of: time synchronization information, frequency synchronization information, or one or more symbols associated with the IEM device.

Clause 6. The system of Clause 5, wherein the one or more symbols comprise one or more of: orthogonal frequency division multiple access (OFDMA) symbols, frequency-division multiple access (FDMA) symbols, orthogonal frequency division multiplexing (OFDM), single-carrier (SC)-FDMA, linear precoded (LP)-FDMA, or LP-OFDMA.

Clause 7. The system of any one of Clauses 1-6, wherein a first subset of the audio channels are orthogonal to a second subset of the audio channels in either the frequency dimension or the time dimension.

Clause 8. The system of any one of Clauses 1-7, wherein a first subset of the audio channels are orthogonal to a second subset of the audio channels in the frequency dimension and a third subset of the audio channels are orthogonal to a fourth subset of the audio channels in the time dimension.

Clause 9. The system of any one of Clauses 1-8, further comprising one or more of: a wireless microphone, a wireless instrument receiver, a wireless speaker, or an audio recording device.

Clause 10. The system of any one of Clauses 1-9, wherein at least a portion of a first audio channel of the audio channels and at least a portion of a second audio channel of the audio channels are transmitted from the audio channel allocation device to the IEM device in a common radio frame.

Clause 11. The system of any one of Clauses 1-10, wherein the IEM device is further configured to: upon receiving the subsequent carrier wave, perform time and frequency synchronization of the subsequent carrier wave; demodulate the subsequent carrier wave; and after demodulating the subsequent carrier wave, sample the subsequent carrier wave based on the allocation of audio channels indicated in the carrier wave to retrieve audio payload carried in one or more of the audio channels.

Clause 12. The system of any one of Clauses 1-11, wherein the allocation of the audio channels is based at least upon one or more characteristics selected from among: a wireless audio device identifier, a wireless audio device type, a wireless audio device symbol, a latency requirement, a fidelity requirement, a transmission priority classification, an indication of a user associated with the respective wireless audio device, or a user type of the user associated with the respective wireless audio devices.

Clause 13. The system of any one of Clauses 1-12, wherein the audio channel allocation device is further configured to: transmit the subsequent carrier wave to the bodypack receiver of the IEM device, wherein the subsequent carrier wave has a transmit power of between about 50 milliwatts and about 250 milliwatts.

Clause 14. An in-ear monitoring (IEM) device configured to support low latency audio monitoring, the IEM device comprising: one or more in-ear portions configured to deliver an audio output into one or both ears of a user; a bodypack receiver in operable communication with the one or more in-ear portions, the bodypack receiver being configured to: receive a carrier wave from an audio channel allocation device, wherein the carrier wave comprises an indication of an allocation of one or more audio channels for the IEM devices to a plurality of resource blocks in a frequency dimension in a plurality of symbol periods of a time dimension, and receive a subsequent carrier wave comprising audio payload carried therein according to the allocation of audio channels determined by the audio channel allocation device; and a circuit disposed in wired communication with the bodypack receiver and the one or more in-ear portions, wherein the circuit is configured to, based on the indication of the allocation of the one or more audio channels in the carrier wave, cause generation of the audio output based on the audio payload for output to the user via the one or more in-ear portions.

Clause 15. The IEM device of Clause 14, wherein the wideband portion of the frequency dimension occupied by the resource blocks to which the audio channels are allocated has a bandwidth between about 500 kHZ and about 5 MHz.

Clause 16. The IEM device of any one of Clauses 14-15, wherein the carrier wave further comprises one or more of: time synchronization information, frequency synchronization information, or one or more symbols associated with the IEM device.

Clause 17. The IEM device of Clause 16, wherein the one or more symbols comprise one or more of: orthogonal frequency division multiple access (OFDMA) symbols, frequency-division multiple access (FDMA) symbols, orthogonal frequency division multiplexing (OFDM), single-carrier (SC)-FDMA, linear precoded (LP)-FDMA, or LP-OFDMA.

Clause 18. The IEM device of any one of Clauses 14-17, wherein a first subset of the audio channels are orthogonal to a second subset of the audio channels in the frequency dimension and a third subset of the audio channels are orthogonal to a fourth subset of the audio channels in the time dimension.

Clause 19. The IEM device of any one of Clauses 14-18, wherein the IEM device further comprises: one or more audio drivers in wired communication with the circuit and in operable communication with the one or more in-ear portions, the IEM device being further configured to: upon receiving the subsequent carrier wave at the bodypack receiver, use the circuit to perform time and frequency synchronization of the subsequent carrier wave; use the circuit to demodulate the subsequent carrier wave; after demodulating the subsequent carrier wave, use the circuit to sample the subsequent carrier wave based on the allocation of audio channels indicated in the carrier wave to retrieve audio payload carried in one or more of the audio channels; and transmit a signal from the circuit to the one or more audio drivers to cause the one or more audio drivers to emit the audio output to one or both ears of the user.

Clause 20. An in-ear monitoring (IEM) device configured to support low latency audio monitoring, the IEM device comprising: one or more audio drivers configured to generate an audio output; one or more in-ear portions configured to deliver the audio output into one or both ears of a user; a bodypack receiver in wired communication with the one or more audio drivers, the bodypack receiver being configured to: receive a carrier wave from an audio channel allocation device, wherein the carrier wave comprises an indication of an allocation of one or more audio channels for the IEM devices to a plurality of resource blocks positioned orthogonally in a wideband portion of a frequency dimension in a plurality of symbol periods of a time dimension, and receive a subsequent carrier wave comprising audio payload carried therein according to the allocation of audio channels determined by the audio channel allocation device; and a circuit disposed in wired communication with the bodypack receiver and the one or more audio drivers, wherein the circuit is configured to, based on the indication of the allocation of the one or more audio channels in the carrier wave, cause the one or more audio drivers to generate the audio output based on the audio payload for output to the user via the one or more in-ear portions.

Clause 21. An audio payload transmission device configured to support low latency audio communications among a plurality of audio devices in a flexible and scalable audio system, the audio payload allocation unit comprising: one or more processors; and at least one memory storing instructions, wherein the instructions, when executed by the one or more processors, cause the audio payload communication device to: determine an allocation of audio channels for the plurality of audio devices to a plurality of resource blocks in a frequency dimension in a plurality of symbol periods of a time dimension; and transmit a carrier wave to the plurality of audio devices, the carrier wave comprising the plurality of resource blocks being carried in radio frames of the carrier wave according to the determined allocation.

Clause 22. The device of Clause 21, wherein the instructions, when executed by the one or more processors, further cause the audio payload communication device to: wirelessly communicate audio payload allocation information to one or more of the plurality of audio devices, wherein the audio payload allocation information is operable to cause respective audio devices to sample the carrier wave for resource blocks associated with the respective audio devices according to the audio payload allocation information.

Clause 23. The device of any one of Clauses 21-22, wherein the instructions, when executed by the one or more processors, further cause the audio payload communication device to: communicate, via infrared radiation, to one or more of the plurality of audio devices, audio payload allocation information, wherein the audio payload allocation information is operable to cause respective audio devices to sample the carrier wave for resource blocks associated with the respective audio devices according to the audio payload allocation information.

Clause 24. The device of any one of Clauses 21-23, wherein the instructions, when executed by the one or more processors, further cause the audio payload communication device to: communicate, via a wired connection, to one or more of the plurality of audio devices, audio payload allocation information, wherein the audio payload allocation information is operable to cause respective audio devices to sample the carrier wave for resource blocks associated with the respective audio devices according to the audio payload allocation information.

Clause 25. The device of any one of Clauses 21-24, wherein the instructions, when executed by the one or more processors, further cause the audio payload communication device to: receive, from the plurality of audio devices, a plurality of audio payload allocation requests, wherein at least one of the plurality of audio payload allocation requests is configured to prompt wireless communication of the audio payload allocation instructions.

Clause 26. The device of any one of Clauses 21-24, wherein the instructions, when executed by the one or more processors, further cause the audio payload communication device to: generate a broadcast signal comprising the audio payload allocation information; and transmit the broadcast signal towards at least a subset of the plurality of audio devices.

Clause 27. The device of any one of Clauses 21-26, wherein the instructions, when executed by the one or more processors, further cause the audio payload communication device to: receive, from one or more audio devices of the plurality of audio devices, an indication of a bit rate requirement for the one or more audio devices.

Clause 28. The device of Clause 27, wherein the instructions, when executed by the one or more processors, further cause the audio payload communication device to: transmit, in response to the indication of the bit rate requirement for the one or more audio devices, to the one or more audio devices, a response message comprising the allocation of audio channels for the one or more audio devices.

Clause 29. The device of any one of Clauses 21-28, wherein the instructions, when executed by the one or more processors, further cause the audio payload communication device to: receive, from one or more audio devices of the plurality of audio devices, an indication of a modulation and coding scheme requirement for the one or more audio devices.

Clause 30. The device of Clause 29, wherein the instructions, when executed by the one or more processors, further cause the audio payload communication device to: transmit, in response to the indication of the modulation and coding scheme requirement for the one or more audio devices, to the one or more audio devices, a response message comprising the allocation of audio channels for the one or more audio devices.

Clause 31. The device of any one of Clauses 21-30, wherein the instructions, when executed by the one or more processors, further cause the audio payload communication device to: wirelessly transmit, to the plurality of audio devices, an allocation signal indicating the audio payload allocation instructions, time synchronization information, frequency synchronization information, and one or more symbols associated with the plurality of audio devices.

Clause 32. The device of Clause 31, wherein the one or more symbols comprise one or more of: orthogonal frequency division multiple access (OFDMA) symbols, frequency-division multiple access (FDMA) symbols, orthogonal frequency division multiplexing (OFDM), single-carrier (SC)-FDMA, linear precoded (LP)-FDMA, or LP-OFDMA.

Clause 33. The device of Clause 31, wherein the instructions, when executed by the one or more processors, further cause the audio payload communication device to: receive, in response to the allocation signal, a plurality of audio requests, wherein a first audio request of the plurality of audio requests is configured to initiate transmission of a first audio payload associated with a first audio channel of the plurality of audio channels allocated for a respective first audio device of the plurality of audio devices.

Clause 34. The device of any one of Clauses 21-33, wherein a first subset of the plurality of audio channels are orthogonal to a second subset of the plurality of audio channels in either the frequency dimension or the time dimension.

Clause 35. The device of any one of Clauses 21-34, wherein a first subset of the plurality of audio channels are orthogonal to a second subset of the plurality of audio channels in the frequency dimension and a third subset of the plurality of audio channels are orthogonal to a fourth subset of the plurality of audio channels in the time dimension.

Clause 36. The device of any one of Clauses 21-35, wherein the instructions, when executed by the one or more processors, further cause the audio payload communication device to: transmit, to one or more of the plurality of audio devices, an audio signal comprising resource blocks, wherein at least a first portion of the resource blocks associated with a first audio device and a second portion of the resource blocks associated with a second audio device are communicated in a same radio frame.

Clause 37. The device of any one of Clauses 21-36, wherein the instructions, when executed by the one or more processors, further cause the audio payload communication device to: communicate, to the plurality of audio devices, the audio payload allocation instructions and resource blocks associated with the plurality of audio channels.

Clause 38. The device of Clause 37, wherein the instructions, when executed by the one or more processors, further cause the audio payload communication device to: cause at least one of the plurality of audio devices to sample an audio signal based upon at least a subset of the audio payload allocation instructions.

Clause 39. The device of any one of Clauses 21-38, wherein the instructions, when executed by the one or more processors, further cause the audio payload communication device to: cause at least one of the plurality of audio devices to perform time and frequency synchronization of an audio signal.

Clause 40. The device of Clause 39, wherein the instructions, when executed by the one or more processors, further cause the audio payload communication device to: cause, via one or more modulation symbols communicated in the audio signal, in response to at least one of the plurality of audio devices receiving the audio signal, subsequent to the time and frequency synchronization of the audio signal, the at least one of the plurality of audio devices to demodulate the audio signal.

Clause 41. A method for supporting low latency audio communications among a plurality of audio devices in a flexible and scalable audio system, the method comprising: determining an allocation of a plurality of audio channels for the plurality of audio devices to a plurality of resource blocks in a frequency dimension in a plurality of symbol periods of a time dimension; and transmitting a carrier wave to the plurality of audio devices, the carrier wave comprising the resource blocks being carried in radio frames of the carrier wave according to the determined allocation.

Clause 42. A non-transitory computer-readable medium for supporting low latency audio communications among a plurality of audio devices in a flexible and scalable audio system, the non-transitory computer-readable medium storing instructions that, when executed by one or more processors, cause at least: determining an allocation of a plurality of audio channels for the plurality of audio devices to a plurality of resource blocks in a frequency dimension in a plurality of symbol periods of a time dimension; and transmitting a carrier wave to the plurality of audio devices, the carrier wave comprising the resource blocks being carried in radio frames of the carrier wave according to the determined allocation.

Clause 43. An audio playback device configured to support low latency audio communications among a plurality of audio devices in a flexible and scalable audio system, the audio payload allocation unit comprising: one or more processors; and at least one memory storing instructions, wherein the instructions, when executed by the one or more processors, cause the audio payload communication device to: receive an indication of audio payload subcarrier allocation for one or more audio channels of a plurality of audio channels mapped to a plurality of resource blocks in a frequency dimension in a plurality of periods of a time dimension; receive a carrier wave comprising resource blocks being carried in radio frames of the carrier wave according to the audio payload subcarrier allocation; and extract, from the resource blocks carried in the radio frames of the carrier wave, audio payload data.

Clause 44. The device of Clause 43, wherein the instructions, when executed by the one or more processors, further cause the audio playback device to: transmit, to an access point, an audio payload allocation request, wherein the audio payload allocation request is configured to prompt the access point to provide the indication of the audio payload subcarrier allocation.

Clause 45. The device of any one of Clauses 43-44, wherein the instructions, when executed by the one or more processors, further cause the audio playback device to: receive, from an access point, a broadcast signal comprising the indication of the audio payload subcarrier allocation.

Clause 46. The device of any one of Clauses 43-45, wherein the instructions, when executed by the one or more processors, further cause the audio playback device to: provide, to an access point, an indication of a bit rate requirement for the audio playback device; and receive, in response to the indication of the bit rate requirement for the audio playback device, from the access point, a response message comprising the indication of the audio payload subcarrier allocation.

Clause 47. The device of any one of Clauses 43-46, wherein the instructions, when executed by the one or more processors, further cause the audio playback device to: provide, to an access point, an indication of a modulation and coding scheme requirement for the audio playback device; and receive, in response to the indication of the modulation and coding scheme requirement for the audio playback device, from the access point, a response message comprising the indication of the audio payload subcarrier allocation.

Clause 48. The device of any one of Clauses 43-47, wherein the instructions, when executed by the one or more processors, further cause the audio playback device to: provide, to an access point, an indication of an audio device type of the audio playback device; and receive, in response to the indication of the audio device type of the audio playback device, a response message comprising the indication of the audio payload subcarrier allocation.

Clause 49. The device of any one of Clauses 43-48, wherein the instructions, when executed by the one or more processors, further cause the audio playback device to: provide, to an access point, an indication of an audio device type of the audio playback device; and receive, in response to the indication of the audio device type of the audio playback device, a response message comprising the indication of the audio payload subcarrier allocation.

Clause 50. The device of any one of Clauses 43-49, wherein the instructions, when executed by the one or more processors, further cause the audio playback device to: wirelessly receive, from an access point, with the indication of the audio payload subcarrier allocation, one or more symbols associated with the audio channels for the audio playback device.

Clause 51. The device of Clause 50, wherein the one or more symbols comprise at least one of: orthogonal frequency division multiple access (OFDMA) symbols, frequency-division multiple access (FDMA) symbols, orthogonal frequency division multiplexing (OFDM) symbols, single-carrier (SC)-FDMA symbols, linear precoded (LP)-FDMA symbols, or LP-OFDMA symbols.

Clause 52. The device of any one of Clauses 43-51, wherein the instructions, when executed by the one or more processors, further cause the audio playback device to: receive, from an access point, an audio signal comprising a first plurality of resource blocks associated with the audio playback device and a second plurality of resource blocks associated with one or more other audio devices, wherein at least one of the first plurality of resource blocks are carried in a same radio frame with at least one of the second plurality of resource blocks.

Clause 53. The device of Clause 52, wherein the instructions, when executed by the one or more processors, further cause the audio playback device to: receive, with the audio signal or the indication of the audio payload subcarrier allocation, from the access point, information for carrying out time synchronization and frequency synchronization of the audio signal, and information for demodulating the audio signal.

Clause 54. The device of Clause 53, wherein the instructions, when executed by the one or more processors, further cause the audio playback device to: based upon at least the information for carrying out time synchronization and frequency synchronization of the audio signal, and the information for demodulating the audio signal, carry out time and frequency synchronization of the audio signal and demodulate the audio signal.

Clause 55. A method for supporting low latency audio communications among a plurality of audio devices in a flexible and scalable audio system, the method comprising: receiving an indication of audio payload subcarrier allocation for one or more audio channels of a plurality of audio channels mapped to a plurality of resource blocks in a frequency dimension in a plurality of periods of a time dimension; receiving a carrier wave comprising resource blocks being carried in radio frames of the carrier wave according to the audio payload subcarrier allocation; and extracting, from the resource blocks carried in the radio frames of the carrier wave, audio payload data.

Clause 56. A non-transitory computer-readable medium for supporting low latency audio communications among a plurality of audio devices in a flexible and scalable audio system, the non-transitory computer-readable medium storing instructions that, when executed by one or more processors, cause at least: receiving an indication of audio payload subcarrier allocation for one or more audio channels of a plurality of audio channels mapped to a plurality of resource blocks in a frequency dimension in a plurality of periods of a time dimension; receiving a carrier wave comprising resource blocks being carried in radio frames of the carrier wave according to the audio payload subcarrier allocation; and extracting, from the resource blocks carried in the radio frames of the carrier wave, audio payload data.

Clause 57. An audio payload allocation unit configured to support low latency audio communications among a plurality of audio devices in a flexible and scalable audio system, the audio payload allocation unit comprising: one or more processors; and at least one memory storing instructions, wherein the instructions, when executed by the one or more processors, cause the audio payload allocation unit to: determine audio payload allocation instructions configured to allocate a plurality of audio channels for the plurality of audio devices to a plurality of resource blocks in a frequency dimension in a plurality of periods of a time dimension; and wirelessly communicate the audio payload allocation instructions to the plurality of audio devices, the audio payload allocation instructions being operable to cause at least one of the plurality of audio devices to sample respective audio channels of the plurality of audio channels in an audio signal.

Clause 58. The audio payload allocation unit of Clause 57, wherein the one or more memory comprise further instructions that, when executed by the one or more processors, cause the audio payload allocation unit to: receive, from the plurality of audio devices, a plurality of audio payload allocation requests, wherein at least one of the plurality of audio payload allocation requests is configured to prompt wireless communication of the audio payload allocation instructions.

Clause 59. The audio payload allocation unit of any one of Clauses 57-58, wherein the at least one memory comprise further instructions that, when executed by the one or more processors, cause the audio payload allocation unit to: wirelessly transmit, to the plurality of audio devices, an allocation signal indicating the audio payload allocation instructions, time synchronization information, frequency synchronization information, and one or more symbols associated with the plurality of audio devices.

Clause 60. The audio payload allocation unit of Clause 59, wherein the one or more symbols comprise orthogonal frequency division multiple access (OFDMA) symbols.

Clause 61. The audio payload allocation unit of any one of Clauses 57-60, wherein the at least one memory comprise further instructions that, when executed by the one or more processors, cause the audio payload allocation unit to: receive, in response to the allocation signal, a plurality of audio requests, wherein a first audio request of the plurality of audio requests is configured to initiate transmission of a first audio payload associated with a first audio channel of the plurality of audio channels allocated for a respective first audio device of the plurality of audio devices.

Clause 62. The audio payload allocation unit of any one of Clauses 57-61, wherein a first subset of the plurality of audio channels are orthogonal to a second subset of the plurality of audio channels in either the frequency dimension or the time dimension.

Clause 63. The audio payload allocation unit of any one of Clauses 57-62, wherein a first subset of the plurality of audio channels are orthogonal to a second subset of the plurality of audio channels in the frequency dimension and a third subset of the plurality of audio channels are orthogonal to a fourth subset of the plurality of audio channels in the time dimension.

Clause 64. The audio payload allocation unit of any one of Clauses 57-63, wherein the at least one memory comprise further instructions that, when executed by the one or more processors, cause the audio payload allocation unit to: transmit, to one or more of the plurality of audio devices, an audio signal comprising resource blocks, wherein at least a first portion of the resource blocks associated with a first audio device and a second portion of the resource blocks associated with a second audio device are communicated in a same radio frame.

Clause 65. The audio payload allocation unit of any one of Clauses 57-64, wherein the at least one memory comprise further instructions that, when executed by the one or more processors, cause the audio payload allocation unit to: communicate, to the plurality of audio devices, the audio payload allocation instructions and resource blocks in the plurality of audio channels.

Clause 66. The audio payload allocation unit of Clause 65, wherein the at least one memory comprise further instructions that, when executed by the one or more processors, cause the audio payload allocation unit to: cause at least one of the plurality of audio devices to sample an audio signal based upon at least a subset of the audio payload allocation instructions.

Clause 67. The audio payload allocation unit of any one of Clauses 57-66, wherein the at least one memory comprise further instructions that, when executed by the one or more processors, cause the audio payload allocation unit to: cause at least one of the plurality of audio devices to perform time and frequency synchronization of an audio signal.

Clause 68. The audio payload allocation unit of Clause 67, wherein the at least one memory comprise further instructions that, when executed by the one or more processors, cause the audio payload allocation unit to: cause, via one or more modulation symbols communicated in the audio signal, in response to at least one of the plurality of audio devices receiving the audio signal, subsequent to the time and frequency synchronization of the audio signal, the at least one of the plurality of audio devices to demodulate the audio signal.

Clause 69. A method for low latency audio communications among a plurality of audio devices in a flexible and scalable audio system, the method comprising: determining audio payload allocation instructions configured to allocate a plurality of audio channels for the plurality of audio devices to a plurality of resource blocks in a frequency dimension in a plurality of periods of a time dimension; and wirelessly communicating the audio payload allocation instructions to the plurality of audio devices, the audio payload allocation instructions being operable to cause at least one of the plurality of audio devices to sample respective audio channels of the plurality of audio channels in an audio signal.

Clause 70. A non-transitory computer-readable medium for supporting low latency audio communications among a plurality of audio devices in a flexible and scalable audio system, the non-transitory computer-readable medium storing instructions that, when executed by one or more processors, cause at least: determining audio payload allocation instructions configured to allocate a plurality of audio channels for the plurality of audio devices to a plurality of resource blocks in a frequency dimension in a plurality of periods of a time dimension; and wirelessly communicating the audio payload allocation instructions to the plurality of audio devices, the audio payload allocation instructions being operable to cause at least one of the plurality of audio devices to sample respective audio channels of the plurality of audio channels in an audio signal.

Clause 71. An audio device configured to support low latency audio communications in a flexible and scalable audio system, the audio device comprising: one or more processors; and at least one memory comprising instructions, wherein the instructions, when executed by the one or more processors, cause the audio payload allocation unit to: receive, from an audio payload allocation unit, audio payload allocation instructions indicating allocation of a plurality of audio channels for a plurality of audio devices to one or more resource blocks in a frequency dimension in one or more periods of a time dimension, the plurality of audio devices including the audio device; and, based upon at least a subset of the audio payload allocation instructions, sample an audio signal for allocated audio payload information.

Clause 72. The audio device of Clause 71, wherein the one or more resource blocks in the frequency dimension comprise a plurality of resource blocks in the frequency dimension, and wherein the one or more periods of the time dimension comprise a plurality of periods of the time dimension.

Clause 73. The audio device of any one of Clauses 71-72, wherein the at least one memory comprise further instructions that, when executed by the one or more processors, cause the audio device to: transmit, to the audio payload allocation unit, an audio payload allocation request that is configured to prompt wireless communication of the audio payload allocation instructions.

Clause 74. The audio device of any one of Clauses 71-73, wherein the at least one memory comprise further instructions that, when executed by the one or more processors, cause the audio device to: receive, from the audio payload allocation unit, an allocation signal indicating the audio payload allocation instructions, time synchronization information, frequency synchronization information, or one or more symbols associated with the plurality of audio devices.

Clause 75. The audio device of Clause 74, wherein the at least one memory comprise further instructions that, when executed by the one or more processors, cause the audio device to: transmit, in response to the allocation signal, to the audio payload allocation unit, an audio request.

Clause 76. The audio device of any one of Clauses 71-75, wherein a first subset of the plurality of audio channels are orthogonal to a second subset of the plurality of audio channels in either the frequency dimension or the time dimension.

Clause 77. The audio device of any one of Clauses 71-76, wherein a first subset of the plurality of audio channels are orthogonal to a second subset of the plurality of audio channels in the frequency dimension and a third subset of the plurality of audio channels are orthogonal to a fourth subset of the plurality of audio channels in the time dimension.

Clause 78. The audio device of any one of Clauses 71-77, wherein the at least one memory comprise further instructions that, when executed by the one or more processors, cause the audio device to: receive, from the audio payload allocation unit or an access point, an audio signal comprising resource blocks, wherein at least a first portion of the resource blocks associated with the user device and a second portion of the resource blocks associated with a second user device are communicated in a same radio frame.

Clause 79. The audio device of any one of Clauses 71-78, wherein the at least one memory comprise further instructions that, when executed by the one or more processors, cause the audio device to: receive, from the audio payload allocation unit, with the audio payload allocation instructions, resource blocks in the plurality of audio channels.

Clause 80. The audio device of any one of Clauses 71-79, wherein the at least one memory comprise further instructions that, when executed by the one or more processors, cause the audio device to: perform time and frequency synchronization of an audio signal.

Clause 81. The audio device of Clause 80, wherein the at least one memory comprise further instructions that, when executed by the one or more processors, cause the audio device to: demodulate the audio signal.

Clause 82. A method for low latency audio communications among a plurality of audio devices in a flexible and scalable audio system, the method comprising: receiving, from an audio payload allocation unit, audio payload allocation instructions indicating allocation of a plurality of audio channels for a plurality of audio devices to one or more resource blocks in a frequency dimension in one or more periods of a time dimension; and, based upon at least a subset of the audio payload allocation instructions, sampling an audio signal for allocated audio payload information.

Clause 83. A non-transitory computer-readable medium for supporting low latency audio communications among a plurality of audio devices in a flexible and scalable audio system, the non-transitory computer-readable medium storing instructions that, when executed by one or more processors, cause at least: receiving, from an audio payload allocation unit, audio payload allocation instructions indicating allocation of a plurality of audio channels for a plurality of audio devices to one or more resource blocks in a frequency dimension in one or more periods of a time dimension; and, based upon at least a subset of the audio payload allocation instructions, sampling an audio signal for allocated audio payload information.

Clause 84. An audio payload allocation unit configured to support low latency audio communications in a flexible and scalable audio system, the audio payload allocation unit comprising: one or more processors; and at least one memory storing instructions, wherein the instructions, when executed by the one or more processors, cause the audio payload allocation unit to: allocate resource blocks for respective audio devices of a plurality of audio devices to respective audio channels, wherein the resource blocks for one or more first audio devices of the plurality of audio devices are allocated adjacent to the resource blocks for one or more second audio devices of the plurality of audio devices in a frequency dimension, and wherein the resource blocks for the one or more first audio devices are allocated adjacent to the resource blocks for one or more third audio devices in a time dimension; and generate an audio signal comprising the resource blocks carried, according to the audio payload subcarrier allocation, in respective resource blocks in the frequency dimension and respective time periods of the time dimension.

Clause 85. The audio payload allocation unit of Clause 84, wherein the at least one memory comprise further instructions that, when executed by the one or more processors, cause the audio payload allocation unit to: transmit the audio signal comprising the resource blocks to the plurality of audio devices.

Clause 86. The audio payload allocation unit of any one of Clauses 84-85, wherein the at least one memory comprise further instructions that, when executed by the one or more processors, cause the audio payload allocation unit to: transmit, to the plurality of audio devices, information indicative of the audio payload subcarrier allocation to the respective audio channels.

Clause 87. The audio payload allocation unit of Clause 86, wherein the information indicative of the audio payload subcarrier allocation is transmitted to the plurality of audio devices as part of an allocation signal.

Clause 88. The audio payload allocation unit of Clause 87, wherein the allocation signal further comprises synchronization subcarriers.

Clause 89. The audio payload allocation unit of Clause 88, wherein the synchronization subcarriers comprise at least one of: a timing synchronization subcarrier, a frequency synchronization subcarrier, or a phase synchronization subcarrier.

Clause 90. The audio payload allocation unit of any one of Clauses 84-89, wherein the at least one memory comprise further instructions that, when executed by the one or more processors, cause the audio payload allocation unit to: transmit the audio signal comprising the resource blocks to the plurality of audio devices.

Clause 91. The audio payload allocation unit of any one of Clauses 84-90, wherein the audio signal further comprises one or more signals, one or more tones, or one or more symbols, and wherein the one or more signals, the one or more tones, or the one or more symbols are associated with one or more audio devices of the plurality of audio devices.

Clause 92. The audio payload allocation unit of any one of Clauses 84-91, wherein the audio payload allocation unit comprises one of: a wireless microphone transceiver, a wireless in-ear monitor transceiver, an access point, a server unit, a base station, an audio rack, an audio mixing console, or a cloud computing device.

Clause 93. A method for low latency audio communications among a plurality of audio devices in a flexible and scalable audio system, the method comprising: allocating resource blocks for respective audio devices of a plurality of audio devices to respective audio channels, wherein the resource blocks for one or more first audio devices of the plurality of audio devices are allocated adjacent to the resource blocks for one or more second audio devices of the plurality of audio devices in a frequency dimension, and wherein the resource blocks for the one or more first audio devices are allocated adjacent to the resource blocks for one or more third audio devices in a time dimension; and generating an audio signal comprising the resource blocks carried, according to the audio payload subcarrier allocation, in respective resource blocks in the frequency dimension and respective time periods of the time dimension.

Clause 94. A non-transitory computer-readable medium for supporting low latency audio communications among a plurality of audio devices in a flexible and scalable audio system, the non-transitory computer-readable medium storing instructions that, when executed by one or more processors, cause at least: allocating resource blocks for respective audio devices of a plurality of audio devices to respective audio channels, wherein the resource blocks for one or more first audio devices of the plurality of audio devices are allocated adjacent to the resource blocks for one or more second audio devices of the plurality of audio devices in a frequency dimension, and wherein the resource blocks for the one or more first audio devices are allocated adjacent to the resource blocks for one or more third audio devices in a time dimension; and generating an audio signal comprising the resource blocks carried, according to the audio payload subcarrier allocation, in respective resource blocks in the frequency dimension and respective time periods of the time dimension.

Clause 95. A wireless audio device configured to support low latency audio communications in a flexible and scalable audio system, the wireless audio device comprising: one or more processors; and at least one memory storing instructions, wherein the instructions, when executed by the one or more processors, cause the audio device to: receive, from an access point, an allocation signal comprising one or more symbols; receive captured audio from one or more audio capture devices; and generate an audio signal comprising audio information indicative of the captured audio and at least one of the one or more symbols, the audio information being carried in one or more resource blocks mapped to one or more audio channels based upon audio payload allocation information received from the access point, wherein the one or more resource blocks are allocated orthogonally within a time dimension and a frequency dimension of the audio signal.

Clause 96. A method for low latency audio communications among a plurality of audio devices in a flexible and scalable audio system, the method comprising: receiving, from an access point, an allocation signal comprising one or more symbols; receiving captured audio from one or more audio capture devices; and generating an audio signal comprising audio information indicative of the captured audio and at least one of the one or more symbols, the audio information being carried in one or more resource blocks mapped to one or more audio channels based upon audio payload allocation information received from the access point, wherein the one or more resource blocks are allocated orthogonally within a time dimension and a frequency dimension of the audio signal.

Clause 97. A non-transitory computer-readable medium for supporting low latency audio communications among a plurality of audio devices in a flexible and scalable audio system, the non-transitory computer-readable medium storing instructions that, when executed by one or more processors, cause at least: receiving, from an access point, an allocation signal comprising one or more symbols; receiving captured audio from one or more audio capture devices; and generating an audio signal comprising audio information indicative of the captured audio and at least one of the one or more symbols, the audio information being carried in one or more resource blocks mapped to one or more audio channels based upon audio payload allocation information received from the access point, wherein the one or more resource blocks are allocated orthogonally within a time dimension and a frequency dimension of the audio signal.

Clause 98. An audio payload allocation unit configured to support low latency audio communications in a flexible and scalable audio system, the audio payload allocation unit comprising: one or more processors; and at least one memory storing instructions, wherein the instructions, when executed by the one or more processors, cause the audio payload allocation unit to: allocate, based on one or more characteristics of a plurality of wireless audio devices, to a frequency dimension and a time dimension of and audio signal, a plurality of audio channels associated with the plurality of wireless audio devices, wherein the plurality of audio channels comprise resource blocks carrying audio payload for respective wireless audio devices of the plurality of wireless audio payload devices, wherein a first subset of the plurality of audio channels are orthogonal to a second subset of the plurality of audio channels in the frequency dimension and orthogonal to a third subset of the plurality of audio channels in the time dimension, and wherein the one or more characteristics comprise one of: a wireless audio device identifier, a wireless audio device type, a wireless audio device symbol, a latency requirement, a fidelity requirement, a transmission priority classification, an indication of a user associated with the respective wireless audio device, or a user type of the user associated with the respective wireless audio devices; generate, according to the allocation, one or more audio signals carrying the plurality of resource blocks in respective audio channels of the plurality of audio channels for one or more of the plurality of audio devices; and transmit the one or more audio signals to the plurality of wireless audio devices, the one or more audio signals being operable to cause one or more of the wireless audio devices to sample the one or more audio signals for audio payload carried within associated audio channels of the plurality of audio channels.

Clause 99. A method for low latency audio communications among a plurality of audio devices in a flexible and scalable audio system, the method comprising: allocating, based on one or more characteristics of a plurality of wireless audio devices, to a frequency dimension and a time dimension of and audio signal, a plurality of audio channels associated with the plurality of wireless audio devices, wherein the plurality of audio channels comprise resource blocks carrying audio payload for respective wireless audio devices of the plurality of wireless audio payload devices, wherein a first subset of the plurality of audio channels are orthogonal to a second subset of the plurality of audio channels in the frequency dimension and orthogonal to a third subset of the plurality of audio channels in the time dimension, and wherein the one or more characteristics comprise one of: a wireless audio device identifier, a wireless audio device type, a wireless audio device symbol, a latency requirement, a fidelity requirement, a transmission priority classification, an indication of a user associated with the respective wireless audio device, or a user type of the user associated with the respective wireless audio devices; generating, according to the allocation, one or more audio signals carrying the plurality of resource blocks in respective audio channels of the plurality of audio channels for one or more of the plurality of audio devices; and transmitting the one or more audio signals to the plurality of wireless audio devices, the one or more audio signals being operable to cause one or more of the wireless audio devices to sample the one or more audio signals for audio payload carried within associated audio channels of the plurality of audio channels.

Clause 100. A non-transitory computer-readable medium for supporting low latency audio communications among a plurality of audio devices in a flexible and scalable audio system, the non-transitory computer-readable medium storing instructions that, when executed by one or more processors, cause at least: allocating, based on one or more characteristics of a plurality of wireless audio devices, to a frequency dimension and a time dimension of and audio signal, a plurality of audio channels associated with the plurality of wireless audio devices, wherein the plurality of audio channels comprise resource blocks carrying audio payload for respective wireless audio devices of the plurality of wireless audio payload devices, wherein a first subset of the plurality of audio channels are orthogonal to a second subset of the plurality of audio channels in the frequency dimension and orthogonal to a third subset of the plurality of audio channels in the time dimension, and wherein the one or more characteristics comprise one of: a wireless audio device identifier, a wireless audio device type, a wireless audio device symbol, a latency requirement, a fidelity requirement, a transmission priority classification, an indication of a user associated with the respective wireless audio device, or a user type of the user associated with the respective wireless audio devices; generating, according to the allocation, one or more audio signals carrying the plurality of resource blocks in respective audio channels of the plurality of audio channels for one or more of the plurality of audio devices; and transmitting the one or more audio signals to the plurality of wireless audio devices, the one or more audio signals being operable to cause one or more of the wireless audio devices to sample the one or more audio signals for audio payload carried within associated audio channels of the plurality of audio channels.

Clause 101. A wireless audio device configured to support low latency audio communications in a flexible and scalable audio system, the wireless audio device comprising: one or more processors; and at least one memory storing instructions, wherein the instructions, when executed by the one or more processors, cause the audio device to: receive, from an audio payload allocation unit, a signal comprising one or more symbols and a plurality of resource blocks allocated to a plurality of resource blocks in a frequency dimension and a plurality of periods of a time dimension, wherein the signal has a transmit power of between about 50 milliwatts and about 250 milliwatts; and determine, based at least in part on the one or more symbols, the allocation of resource blocks associated with the audio transceiver apparatus within the frequency and time dimensions.

Clause 102. A method for low latency audio communications among a plurality of audio devices in a flexible and scalable audio system, the method comprising: receiving, from an audio payload allocation unit, a signal comprising one or more symbols and a plurality of resource blocks allocated to a plurality of resource blocks in a frequency dimension and a plurality of periods of a time dimension, wherein the signal has a transmit power of between about 50 milliwatts and about 250 milliwatts; and determining, based at least in part on the one or more symbols, the allocation of resource blocks associated with the audio transceiver apparatus within the frequency and time dimensions.

Clause 103. A non-transitory computer-readable medium for supporting low latency audio communications among a plurality of audio devices in a flexible and scalable audio system, the non-transitory computer-readable medium storing instructions that, when executed by one or more processors, cause at least: receiving, from an audio payload allocation unit, a signal comprising one or more symbols and a plurality of resource blocks allocated to a plurality of resource blocks in a frequency dimension and a plurality of periods of a time dimension, wherein the signal has a transmit power of between about 50 milliwatts and about 250 milliwatts; and determining, based at least in part on the one or more symbols, the allocation of resource blocks associated with the audio transceiver apparatus within the frequency and time dimensions.

Clause 104. A wireless multiuser audio system configured to support low latency audio communications among a plurality of audio devices, the wireless multiuser audio system comprising: an audio channel allocation device; and one or more audio transceivers configured to be in wireless communication with the audio channel allocation device, wherein the audio channel allocation device is configured to: determine an allocation of audio channels for the one or more audio transceivers to a plurality of resource blocks in a frequency dimension in a plurality of symbol periods of a time dimension; and transmit a carrier wave to the one or more audio transceivers, the carrier wave comprising an indication of the allocation of audio channels, wherein the one or more audio transceivers are configured to: receive the carrier wave from the audio channel allocation device; configure one or more antenna ports of respective audio transceivers of the one or more audio transceivers according to the indication of the allocation of audio channels in the carrier wave; and receive, using the one or more antenna ports of respective audio transceivers of the one or more audio transceivers, a subsequent carrier wave comprising audio payload carried therein according to the allocation of audio channels determined by the audio channel allocation device.

Clause 105. The system of Clause 104, wherein the allocation of audio channels is based at least in part on one or more indications of a bit rate requirement for the one or more audio transceivers.

Clause 106. The system of any one of Clauses 104-105, wherein the allocation of audio channels is based at least in part on one or more indications of a modulation and coding scheme requirement for the one or more audio transceivers.

Clause 107. The system of any one of Clauses 104-106, wherein the audio channel allocation device is further configured to: wirelessly transmit, to the one or more audio transceivers, in the carrier wave with the indication of the allocation of audio channels and/or in the subsequent carrier wave with the audio payload, one or more of: time synchronization information, frequency synchronization information, or one or more symbols associated with the one or more audio transceivers.

Clause 108. The system of Clause 107, wherein the one or more symbols comprise one or more of: orthogonal frequency division multiple access (OFDMA) symbols, frequency-division multiple access (FDMA) symbols, orthogonal frequency division multiplexing (OFDM), single-carrier (SC)-FDMA, linear precoded (LP)-FDMA, or LP-OFDMA.

Clause 109. The system of Clause 107, wherein the audio channel allocation device is further configured to: receive, from the one or more audio transceivers, in response to the carrier wave comprising the indication of the allocation of audio channels, one or more audio requests.

Clause 110. The system of any one of Clauses 104-109, wherein a first subset of the audio channels are orthogonal to a second subset of the audio channels in either the frequency dimension or the time dimension.

Clause 111. The system of any one of Clauses 104-110, wherein a first subset of the audio channels are orthogonal to a second subset of the audio channels in the frequency dimension and a third subset of the audio channels are orthogonal to a fourth subset of the audio channels in the time dimension.

Clause 112. The system of any one of Clauses 104-111, wherein the one or more audio transceivers comprises one of: an in-ear monitor (IEM), a wireless microphone, a wireless instrument receiver, a wireless speaker, or an audio recording device.

Clause 113. The system of any one of Clauses 104-112, wherein at least a portion of a first audio channel of the audio channels and at least a portion of a second audio channel of the audio channels are transmitted from the audio channel allocation device to the one or more audio transceivers in a same radio frame.

Clause 114. The system of any one of Clauses 104-113, wherein the one or more audio transceivers are further configured to: upon receiving the subsequent carrier wave, perform time and frequency synchronization of the subsequent carrier wave; demodulate the subsequent carrier wave; and, after demodulating the subsequent carrier wave, sample the subsequent carrier wave based on the allocation of audio channels indicated in the carrier wave to retrieve audio payload carried in one or more of the audio channels.

Clause 115. A wireless audio transceiver configured to support low latency audio communications in a flexible and scalable wireless multiuser audio system, the wireless audio transceiver comprising: one or more radio frequency (RF) ports configured to receive RF signals; one or more processors; and at least one memory storing instructions, wherein the at least one memory and the instructions are configured, with the one or more processors and the one or more RF ports, to cause the wireless audio transceiver to: receive an indication of audio payload subcarrier allocation for one or more audio channels of a plurality of audio channels mapped to a plurality of resource blocks in a frequency dimension in a plurality of periods of a time dimension; receive a carrier wave comprising resource blocks being carried in radio frames of the carrier wave according to the audio payload subcarrier allocation; and extract, from the resource blocks carried in the radio frames of the carrier wave, audio payload data.

Clause 116. The wireless audio transceiver of Clause 115, wherein the at least one memory and the instructions are further configured, with the one or more processors and the one or more RF ports, to cause the wireless audio transceiver to: receive, from an access point, a broadcast signal comprising the indication of the audio payload subcarrier allocation.

Clause 117. The wireless audio transceiver of any one of Clauses 115-116, wherein the at least one memory and the instructions are further configured, with the one or more processors and the one or more RF ports, to cause the wireless audio transceiver to: provide, to an access point, an indication of a bit rate requirement for the audio playback device; and receive, in response to the indication of the bit rate requirement for the audio playback device, from the access point, a response message comprising the indication of the audio payload subcarrier allocation.

Clause 118. The wireless audio transceiver of any one of Clauses 115-117, wherein the at least one memory and the instructions are further configured, with the one or more processors and the one or more RF ports, to cause the wireless audio transceiver to: provide, to an access point, an indication of a modulation and coding scheme requirement for the audio playback device; and receive, in response to the indication of the modulation and coding scheme requirement for the audio playback device, from the access point, a response message comprising the indication of the audio payload subcarrier allocation.

Clause 119. The wireless audio transceiver of any one of Clauses 115-118, wherein the indication of the audio payload subcarrier allocation is based at least upon a type of the wireless audio transceiver or an audio device associated with the wireless audio transceiver.

Clause 120. The wireless audio transceiver of any one of Clauses 115-119, wherein the at least one memory and the instructions are further configured, with the one or more processors and the one or more RF ports, to cause the wireless audio transceiver to: wirelessly receive, from an access point, with the indication of the audio payload subcarrier allocation, one or more symbols associated with the audio channels for the audio playback device.

Clause 121. The wireless audio transceiver of Clause 120, wherein the one or more symbols comprise at least one of: orthogonal frequency division multiple access (OFDMA) symbols, frequency-division multiple access (FDMA) symbols, orthogonal frequency division multiplexing (OFDM) symbols, single-carrier (SC)-FDMA symbols, linear precoded (LP)-FDMA symbols, or LP-OFDMA symbols.

Clause 122. A wireless audio transceiver configured to support low latency audio communications in a flexible and scalable audio system, the wireless audio transceiver comprising: one or more radio frequency (RF) ports configured to transmit and receive RF waves carrying audio payload; one or more processors; and at least one memory storing instructions, wherein the at least one memory and the instructions are configured, with the one or more RF ports and the one or more processors, to cause the wireless audio transceiver to: receive, using the one or more RF ports, from an access point, an allocation signal comprising one or more symbols; receive captured audio from one or more audio capture devices; and generate an audio signal comprising audio information indicative of the captured audio and at least one of the one or more symbols, the audio information being carried in one or more resource blocks mapped to one or more audio channels based upon audio payload allocation information received from the access point, wherein the one or more resource blocks are allocated orthogonally within a time dimension and a frequency dimension of the audio signal.

What is claimed is:

1. A multi-user audio system configured to support low latency audio monitoring, the audio system comprising:
an audio channel allocation device; and
a first audio device among one or more audio devices configured to be in wireless communication with the audio channel allocation device, wherein the first audio device comprises a transceiver in wired communication with one or more input devices or output devices,
wherein the audio channel allocation device is configured to:
determine an allocation of audio channels for the one or more audio devices to a plurality of resource blocks in a frequency dimension in a plurality of symbol periods of a time dimension, wherein a first subset of the audio channels is orthogonal to a second subset of the audio channels in at least one of the frequency dimension or the time dimension; and
transmit a carrier wave to the transceiver of the first audio device, the carrier wave comprising an indication of the allocation of the audio channels, and wherein the first audio device is configured to:
receive, using the transceiver, the carrier wave from the audio channel allocation device;
configure a circuit of the first audio device according to the indication of the allocation of the audio channels in the carrier wave; and
based on the allocation of the audio channels determined by the audio channel allocation device, perform communication, using the transceiver and via a subsequent carrier wave, of an audio payload.

2. The multi-user audio system of claim 1, wherein a wideband portion of the frequency dimension occupied by the resource blocks to which the audio channels are allocated has a bandwidth between 500 kHZ and 5 MHz.

3. The multi-user audio system of claim 1, wherein the allocation of the audio channels is based at least in part on one or more indications of a bit rate requirement for the first audio device.

4. The multi-user audio system of claim 1, wherein the allocation of the audio channels is based at least in part on one or more indications of a modulation and coding scheme requirement for the first audio device.

5. The multi-user audio system of claim 1, wherein the audio channel allocation device is further configured to:
wirelessly transmit, to the first audio device, in the carrier wave with the indication of the allocation of the audio channels or in the subsequent carrier wave with the audio payload, one or more of: time synchronization information, frequency synchronization information, or one or more symbols associated with the first audio device.

6. The multi-user audio system of claim 5, wherein the one or more symbols comprise one or more of: orthogonal frequency division multiple access (OFDMA) symbols, frequency-division multiple access (FDMA) symbols, orthogonal frequency division multiplexing (OFDM), single-carrier (SC)-FDMA, linear precoded (LP)-FDMA, or LP-OFDMA.

7. The multi-user audio system of claim 1, wherein a third subset of the audio channels is orthogonal to a fourth subset of the audio channels in the frequency dimension and a fifth subset of the audio channels is orthogonal to a sixth subset of the audio channels in the time dimension.

8. The multi-user audio system of claim 1, wherein the one or more audio devices comprises one or more of: a wireless microphone, a wireless instrument receiver, a wireless speaker, or an audio recording device.

9. The multi-user audio system of claim 1, wherein at least a portion of a first audio channel of the audio channels and at least a portion of a second audio channel of the audio channels are transmitted from the audio channel allocation device to the first audio device in a common radio frame.

10. The multi-user audio system of claim 1, wherein the first audio device is further configured to:

receive the subsequent carrier wave;

perform time and frequency synchronization of the subsequent carrier wave;

demodulate the subsequent carrier wave; and after demodulating the subsequent carrier wave, sample the subsequent carrier wave based on the allocation of the audio channels indicated in the carrier wave to retrieve the audio payload carried in one or more of the audio channels.

11. The multi-user audio system of claim 1, wherein the allocation of the audio channels is based at least upon one or more characteristics selected from among: a wireless audio device identifier, a wireless audio device type, a wireless audio device symbol, a latency requirement, a fidelity requirement, a transmission priority classification, an indication of a user associated with the respective wireless audio device, or a user type of the user associated with the respective wireless audio devices.

12. The multi-user audio system of claim 1, wherein the audio channel allocation device is further configured to:

transmit the subsequent carrier wave, wherein the subsequent carrier wave has a transmit power of between about 50 milliwatts and about 250 milliwatts.

13. A first audio device configured to support low latency audio monitoring, the first audio device being configured to:

receive a carrier wave from an audio channel allocation device, wherein the carrier wave comprises an indication of an allocation of audio channels for one or more audio devices, comprising the first audio device, to a plurality of resource blocks in a frequency dimension in a plurality of symbol periods of a time dimension, and wherein a first subset of the audio channels is orthogonal to a second subset of the audio channels in at least one of the frequency dimension or the time dimension, and based on the allocation of the audio channels, perform communication, via a subsequent carrier wave, of an audio payload; and wherein the first audio device comprises a circuit configured to:

based on the audio payload, generate an audio output for output via one or more output devices, or based on audio input via one or more input devices, generate the audio payload for transmission by the first audio device.

14. The first audio device of claim 13, wherein a wideband portion of the frequency dimension occupied by the resource blocks to which the audio channels are allocated has a bandwidth between 500 kHZ and 5 MHz.

15. The first audio device of claim 13, wherein the carrier wave further comprises one or more of: time synchronization information, frequency synchronization information, or one or more symbols associated with the first audio device.

16. The first audio device of claim 15, wherein the one or more symbols comprise one or more of: orthogonal frequency division multiple access (OFDMA) symbols, frequency-division multiple access (FDMA) symbols, orthogonal frequency division multiplexing (OFDM), single-carrier (SC)-FDMA, linear precoded (LP)-FDMA, or LP-OFDMA.

17. The first audio device of claim 13, wherein a third subset of the audio channels is orthogonal to a fourth subset of the audio channels in the frequency dimension and a fifth subset of the audio channels is orthogonal to a sixth subset of the audio channels in the time dimension.

18. The first audio device of claim 13, wherein the first audio device further comprises:

one or more audio drivers in wired communication with the circuit and in operable communication with the one or more output devices, the first audio device being further configured to:

upon receiving the subsequent carrier wave, use the circuit to perform time and frequency synchronization of the subsequent carrier wave;

use the circuit to demodulate the subsequent carrier wave;

after demodulating the subsequent carrier wave, use the circuit to sample the subsequent carrier wave based on the allocation of the audio channels indicated in the carrier wave to retrieve audio payload carried in one or more of the audio channels; and transmit a signal from the circuit to the one or more audio drivers to cause the one or more audio drivers to emit the audio output via the one or more output devices.

19. A method for supporting low latency audio monitoring, the method comprising:

receiving, at a first audio device among one or more audio devices, a carrier wave from an audio channel allocation device, wherein the carrier wave comprises an indication of an allocation of audio channels for the one or more audio devices to a plurality of resource blocks positioned orthogonally in a wideband portion of a frequency dimension in a plurality of symbol periods of a time dimension, and wherein a first subset of the audio channels is orthogonal to a second subset of the audio channels in at least one of the frequency dimension or the time dimension, and based on the allocation of the audio channels, performing communication, via a subsequent carrier wave, of an audio payload; and wherein the method further comprises:

based on the audio payload, generating an audio output for output via one or more output devices, or based on audio input via one or more input devices, generating the audio payload for transmission by the first audio device.

20. The multi-user audio system of claim 1, wherein the first audio device comprises one or more audio drivers, wherein performing communication of the audio payload comprises receiving the audio payload, and wherein the first audio device is further configured to:

generate, using the one or more audio drivers and based on the audio payload, an audio output.

21. The multi-user audio system of claim 1, wherein the first audio device is an in-ear monitoring (IEM) device comprising:

one or more audio drivers configured to generate an audio output, a circuit configured to control the audio output generated by the one or more audio drivers, and one or more in-ear portions configured to deliver an audio output into one or both ears of a user.

22. The multi-user audio system of claim 21, wherein the in-ear monitoring (IEM) device further comprises a body-pack receiver in wired communication with the circuit and the one or more audio drivers.

23. The first audio device of claim 13, wherein the first audio device is an in-ear monitoring (IEM) device comprising:

one or more in-ear portions configured to deliver the audio output into one or both ears of a user, and a bodypack receiver in operable communication with the one or more in-ear portions and configured to receive the carrier wave, wherein the circuit is in wired communication with the bodypack receiver and one or more in-ear portions.

24. The method of claim 19, wherein the method further comprises:

receiving the carrier wave via a bodypack receiver of an in-ear monitoring (IEM) device in wired communication with one or more audio drivers configured to generate the audio output; and delivering the audio output into one or two earpieces of the IEM device.

\* \* \* \* \*